US012594672B2

(12) United States Patent
Gavrilin et al.

(10) Patent No.: US 12,594,672 B2
(45) Date of Patent: Apr. 7, 2026

(54) METHOD AND SYSTEM FOR CONTROLLING AN ARTWORK-GENERATING ROBOT USING A ROBOT INTERFACE SYSTEM

(71) Applicants:Nikolai Pavlovich Gavrilin, Korolev (RU); Anna Victorovna Mishchenko, Korolev (RU)

(72) Inventors: Nikolai Pavlovich Gavrilin, Korolev (RU); Anna Victorovna Mishchenko, Korolev (RU)

( * ) Notice: Subject to any disclaimer, the term of this patent is extended or adjusted under 35 U.S.C. 154(b) by 85 days.

(21) Appl. No.: 18/401,897

(22) Filed: Jan. 2, 2024

(65) Prior Publication Data

US 2025/0214246 A1      Jul. 3, 2025

(51) Int. Cl.
| | |
|---|---|
| *B25J 9/16* | (2006.01) |
| *B25J 11/00* | (2006.01) |
| *B25J 13/00* | (2006.01) |
| *B25J 13/06* | (2006.01) |

(52) U.S. Cl.
CPC ......... *B25J 9/1692* (2013.01); *B25J 11/0075* (2013.01); *B25J 13/003* (2013.01); *B25J 13/06* (2013.01)

(58) Field of Classification Search
CPC .... B25J 9/1692; B25J 11/0075; B25J 13/003; B25J 13/06

USPC .......................................................... 700/254
See application file for complete search history.

(56) References Cited

U.S. PATENT DOCUMENTS

| | | | | |
|---|---|---|---|---|
| 12,189,907 | B1 * | 1/2025 | Deguine | ............... G06F 3/0425 |
| 2011/0039021 | A1 * | 2/2011 | Persson | ................ A63C 19/065 |
| | | | | 901/1 |
| 2019/0291277 | A1 * | 9/2019 | Oleynik | ................ B25J 9/1669 |
| 2022/0206597 | A1 * | 6/2022 | Abel | .................... G06F 3/03542 |
| 2023/0031545 | A1 * | 2/2023 | Oleynik | ................ B25J 11/009 |
| 2025/0010466 | A1 * | 1/2025 | Lee | .......................... B25J 13/02 |

* cited by examiner

*Primary Examiner* — Kira Nguyen
(74) *Attorney, Agent, or Firm* — Anna Vishev

(57) ABSTRACT
A method and system for controlling an artwork-generating robot using a robot interface system. The method includes generating a digital prototype of an artwork using a rendering algorithm of the robot interface system; setting a digital canvas using the robot interface system; displaying the digital prototype of the artwork on a display of the robot interface system; calibrating the robot and a robotic environment to enable the robot to generate a robot-generated artwork corresponding to the digital prototype; converting the digital prototype into a physical robot-generated artwork using the artwork-generating robot; and using the robot interface system to adjust settings and to interact with the robot while the digital prototype is being converted into the robot-generated artwork. The step of calibrating the robot is performed by using a calibrating tool of the robot interface system.

19 Claims, 55 Drawing Sheets

Devices

Control of the neural headset

| | Statistics | | | | |
|---|---|---|---|---|---|
| brush size | rendered | rendered total | painted | painted total | % painted |
| 9 | 2710 | 2710 | 2710 | 2710 | 100 |
| 5 | 500 | 3210 | 100 | 2810 | 20 |
| 3 | 500 | 3710 | 0 | 0 | 0 |
| Total | 3710 | 3710 | 2810 | 2810 | 75 |

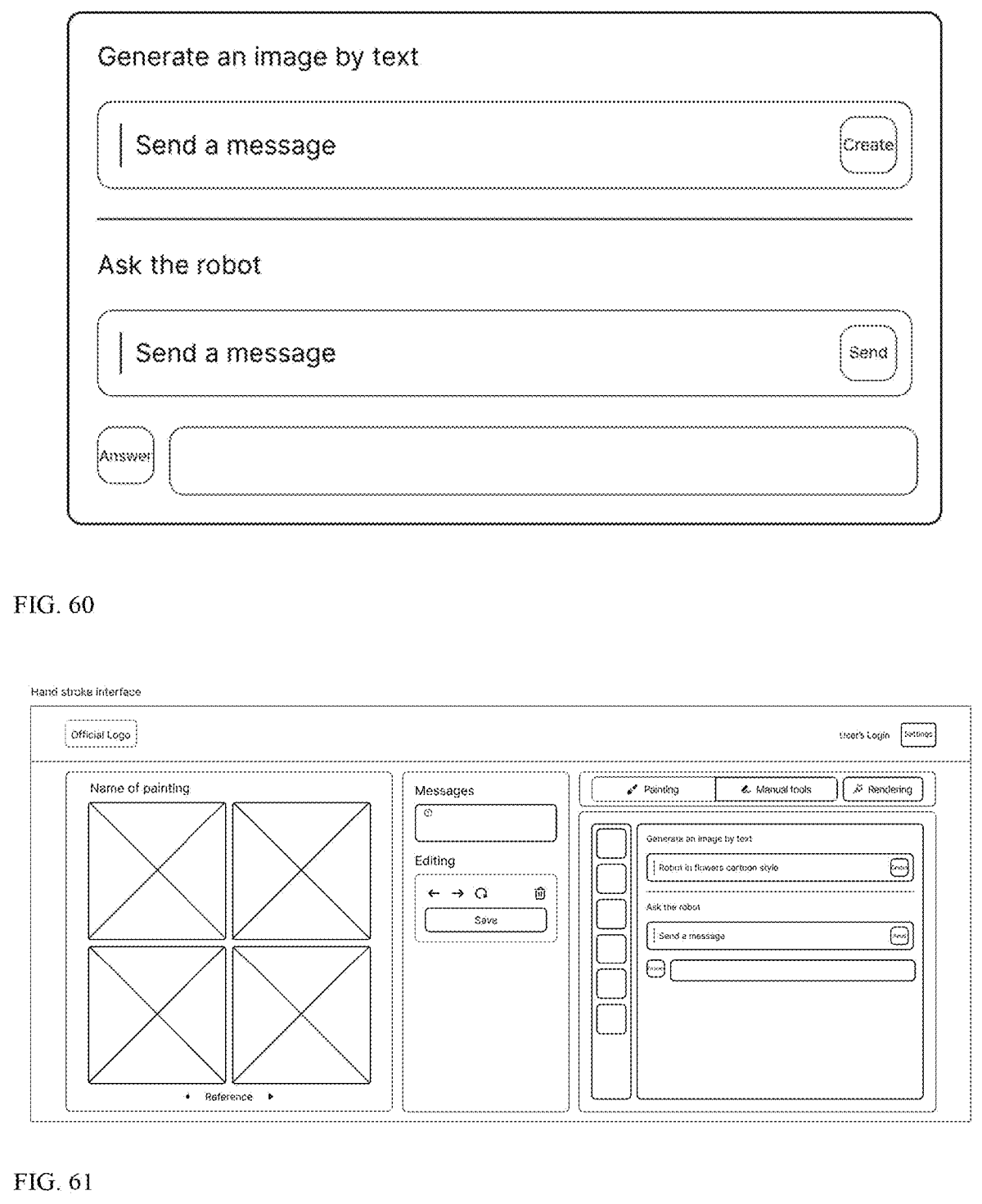

Generate an image by text

| Send a message | Create |

Ask the robot

| Send a message | Send |

| Answer | |

FIG. 60

Hand stroke interface

| Official Logo | | User's Login | Settings |

Name of painting

Messages

⊙

Editing

← → ↻      🗑

Save

Painting      Manual tools      Rendering

Generate an image by text

Robot in flowers cartoon style | Send

Ask the robot

Send a message | Send

◄ Reference ►

FIG. 61

Hand stroke interface

Hand stroke interface

METHOD AND SYSTEM FOR CONTROLLING AN ARTWORK-GENERATING ROBOT USING A ROBOT INTERFACE SYSTEM

FIELD OF THE INVENTION

The invention generally relates to the fields of robotics, computer vision, artificial intelligence and user interfaces. The technical field also includes the development of methods for automatically or semi-automatically generating digital images from user input, as well as methods for implementing these images using robotic systems.

BACKGROUND

In all systems that contain interactions between humans and machines, the element that accomplishes this interaction is known as the human/machine interface. There are currently several existing robotic systems with their own user interfaces. For example, ABB's Robot Studio (https://new-.abb.com/products/robotics/robotstudio) provides a robot modeling and programming software. This system gives its users the ability to create and edit robot models, as well as program and optimize their operation. However, the Robot-Studio system does not have the functionality of causing the robot to draw using a user interface. Rather, it allows a designer to create applications for robots utilized for various purposes.

Another existing system is Scribit (https://create.scribit.design). Scribit is a robot that can draw on vertical surfaces. It has its own application for managing and downloading images. However, Scribit does not provide a user interface-based drawing or cloud-based drawing capabilities.

A further known system is Line-us (https://www.line-us.com/). Line-us is a robot that can draw on a flat surface. It has its own application that allows users to upload images and to draw their own drawings. However, Line-us does not provide functionality for working with the cloud or for drawing using the user interface.

Finally, there is an AxiDraw (https://www.axidraw.com/) robot, which can also draw on a flat surface. It has its own software that allows users to upload images and create their own drawings. However, similarly to Line-us, AxiDraw does not provide functionality for working with the cloud or drawing using the user interface.

These analogs and prototypes offer various solutions in the field of robotics and drawing, but none of them fully corresponds to the functionality and capabilities disclosed in the present application for the invention. There is a need in the art for a system allowing users the ability to interact with the robot, to draw using a user interface and to work with the cloud.

SUMMARY

The system and method of the present invention is a unique robotic artist control system designed to provide users with the ability to create images using an artwork-generating robot. The interface system offers an intuitive and user-friendly flow that allows users to easily manage the drawing process, from loading an image and selecting settings to the final stage of creating the artwork.

In its most general aspect, the invention is a method and system for controlling an artwork-generating robot using a robot interface system. The method includes a step of generating a digital prototype of an artwork using a rendering algorithm of the robot interface system; a step of setting a digital canvas using the robot interface system; a step of displaying the digital prototype of the artwork on a display of the robot interface system; a step of calibrating the robot and its robotic environment to enable the robot to generate a robot-generated artwork corresponding to the digital prototype; a step of converting the digital prototype into a physical robot-generated artwork using the artwork-generating robot; and a step of using the robot interface system to adjust settings and to interact with the robot while the digital prototype is being converted into the robot-generated artwork. The step of calibrating the robot is performed by using a calibrating tool of the robot interface system.

One of the main purposes of the present system is to make the process of drawing with a robot accessible and understandable to any user, regardless of his/her technical level of training and experience with similar systems. The system allows the user to customize the entire technological part of creating the artwork with the robot in accordance with user's preferences and requirements. The built-in control system of the robot-artist ensures the implementation of user-specified settings and control of the drawing process. Once the setup is complete, the user can activate the robot's drawing process, and also has the ability to interrupt, pause, or change the drawing process.

Additionally, the system offers drawing scenarios without a starting image, giving the user a choice of different image options. This broadens the use of the invention, making it applicable to various scenarios and contexts.

Further, the interface and sequence of actions for controlling the robot artist are based on the principles of usability and intuitiveness. This ensures ease of use for people with different levels of technical training, including people with disabilities (special needs). The invention can be integrated with various types of robots, which makes it a universal solution for controlling the drawing process.

BRIEF DESCRIPTION OF THE DRAWINGS

The invention is illustrated by way of examples which are not a limitation, and the figures of the accompanying drawings in which references denote corresponding parts, and in which.

3

Figure 11:
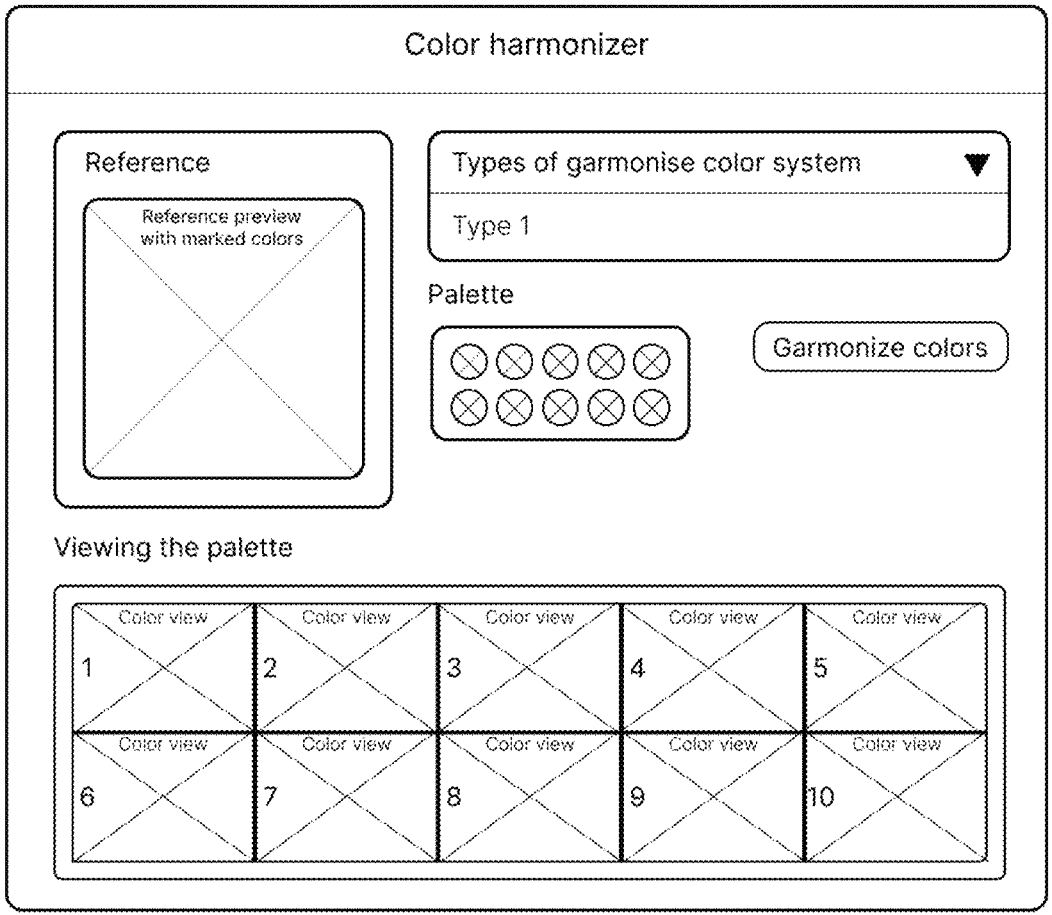
Figure 12:
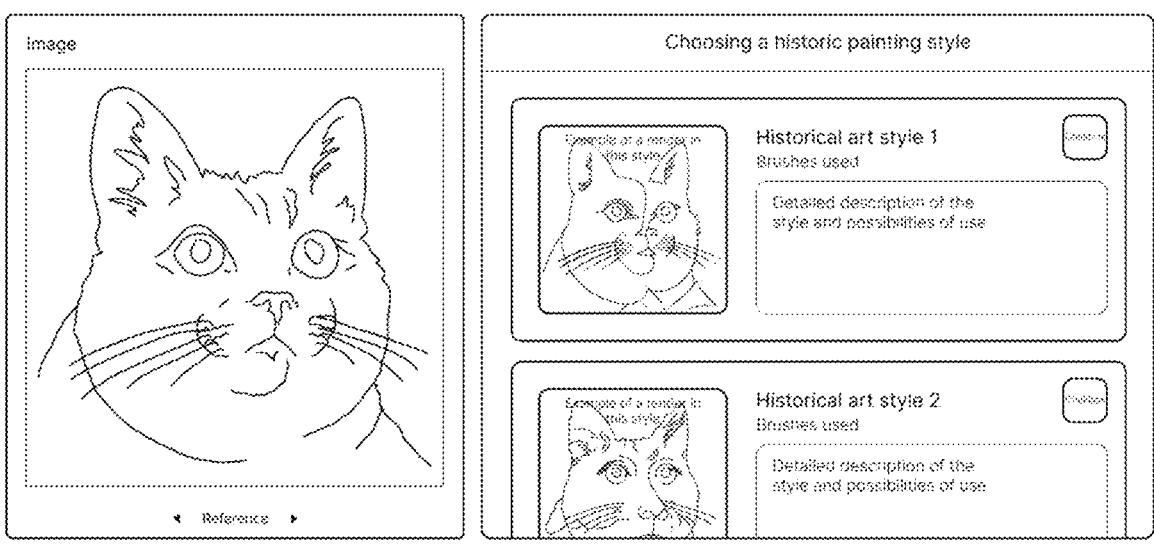
Figure 13:
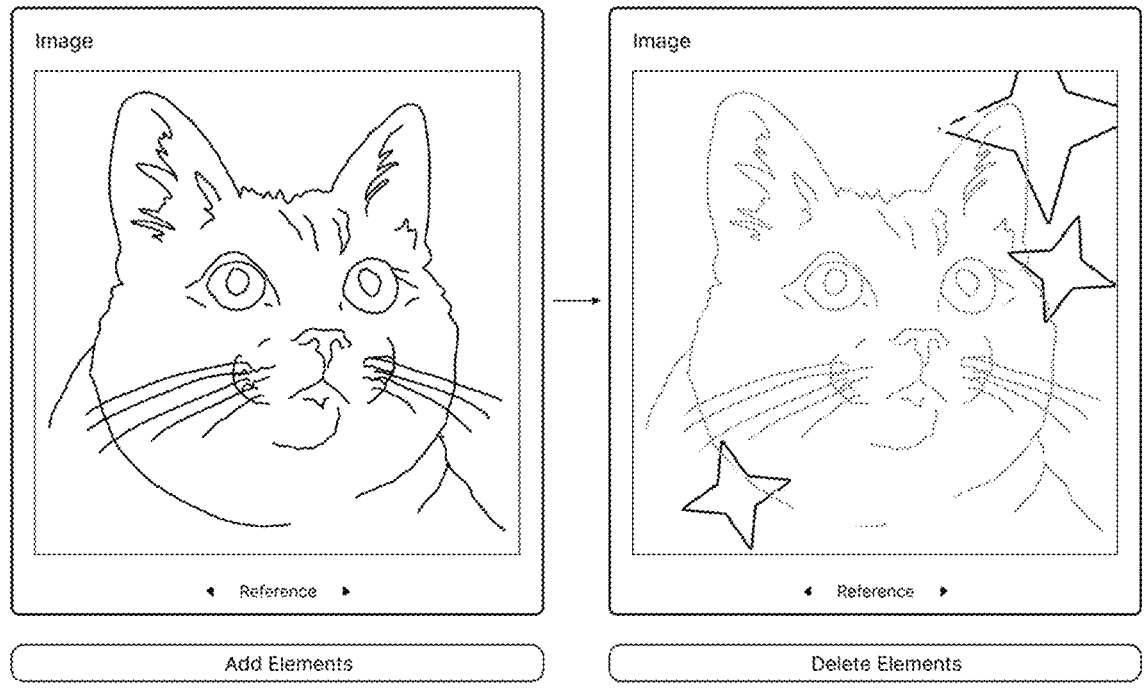
Figure 14:
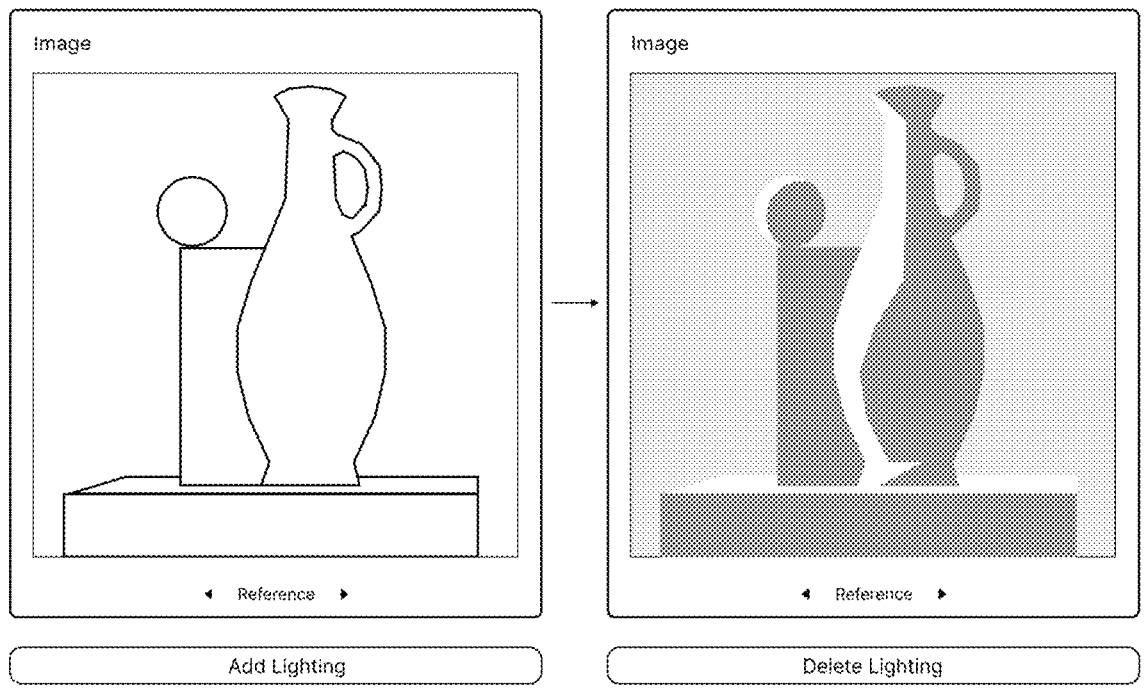
Figure 15:
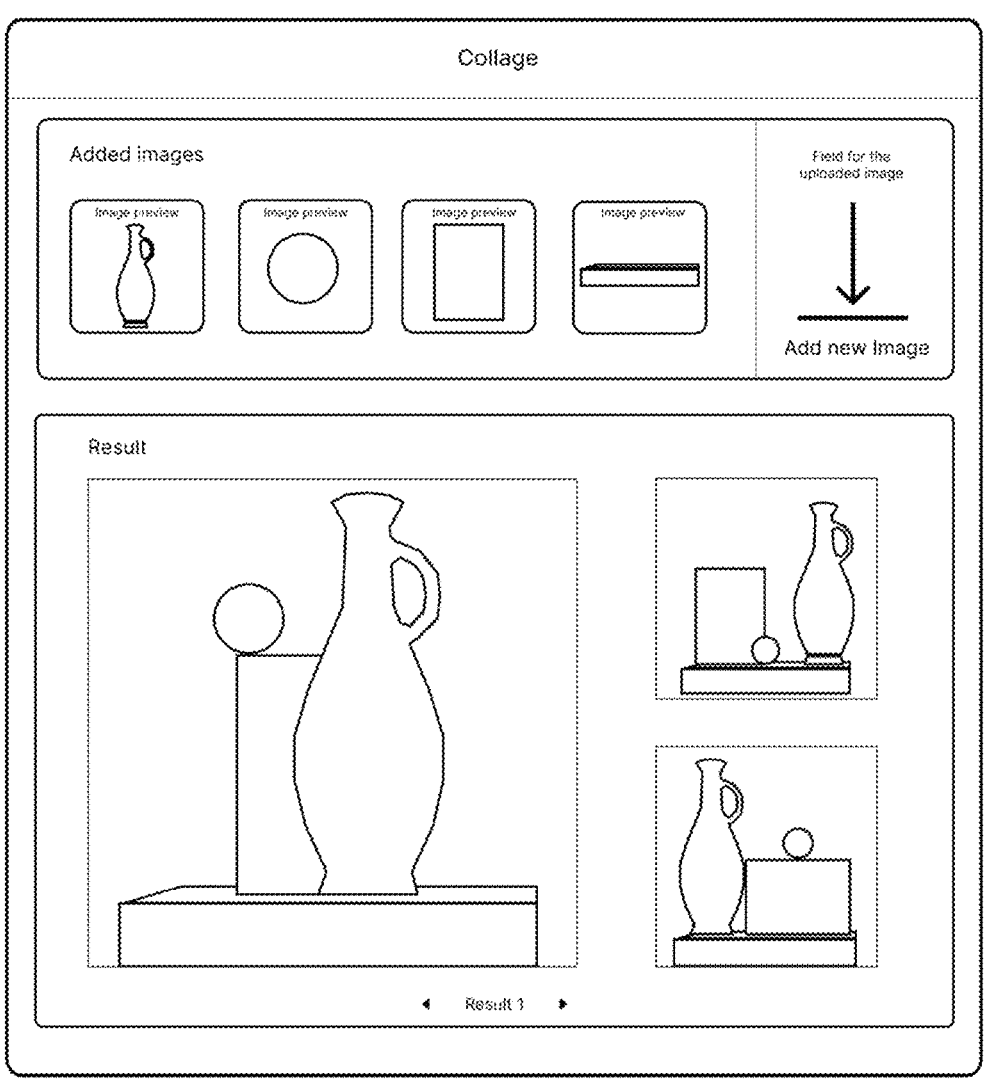
Figure 16:
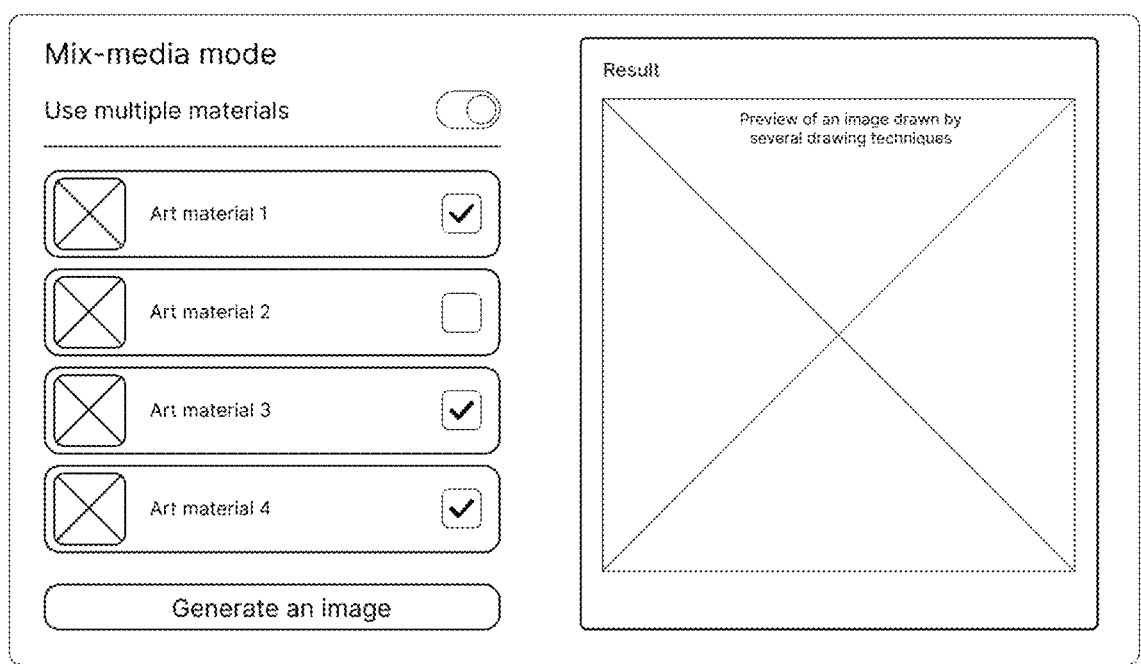
Figure 17:
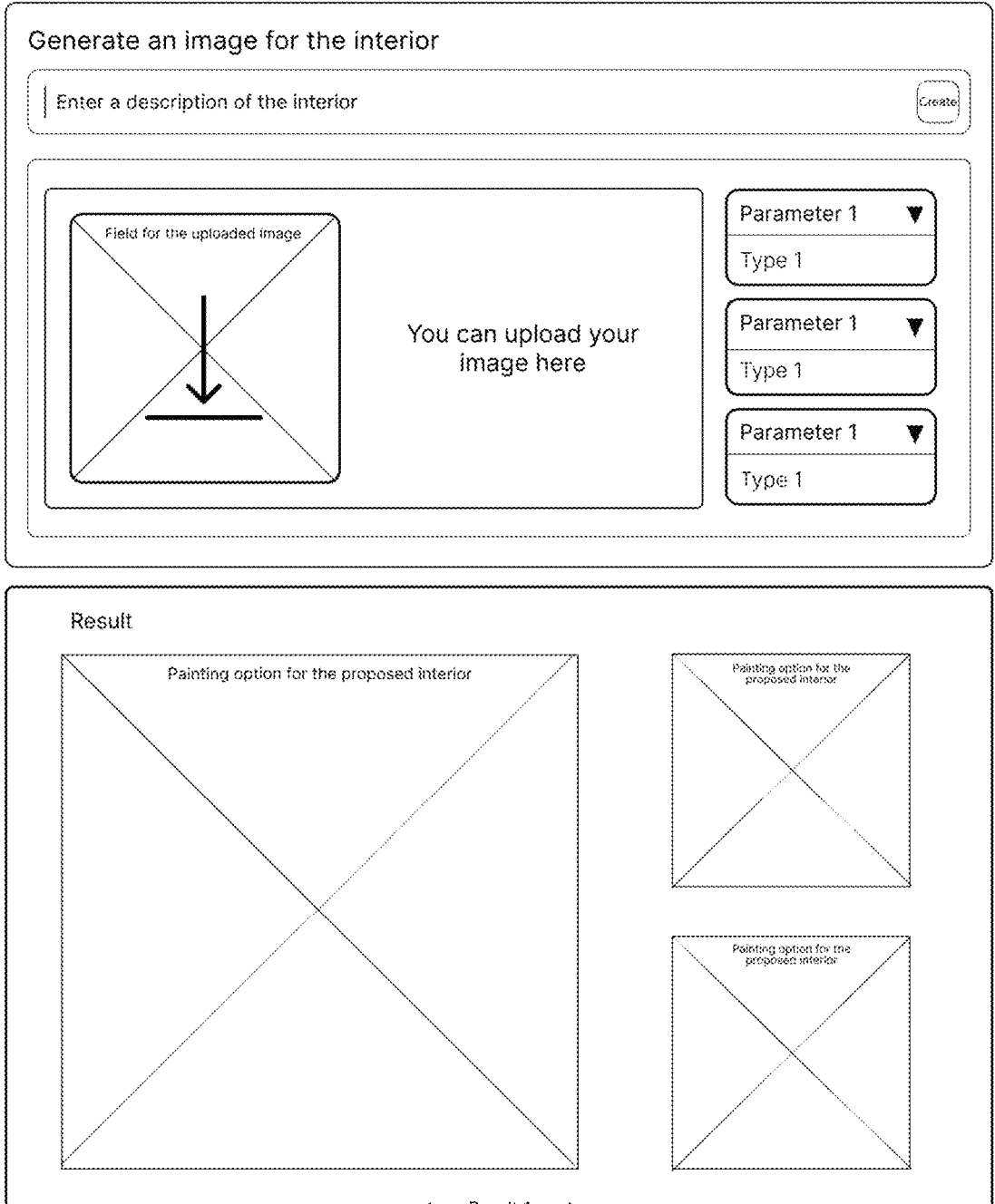
Figure 18:
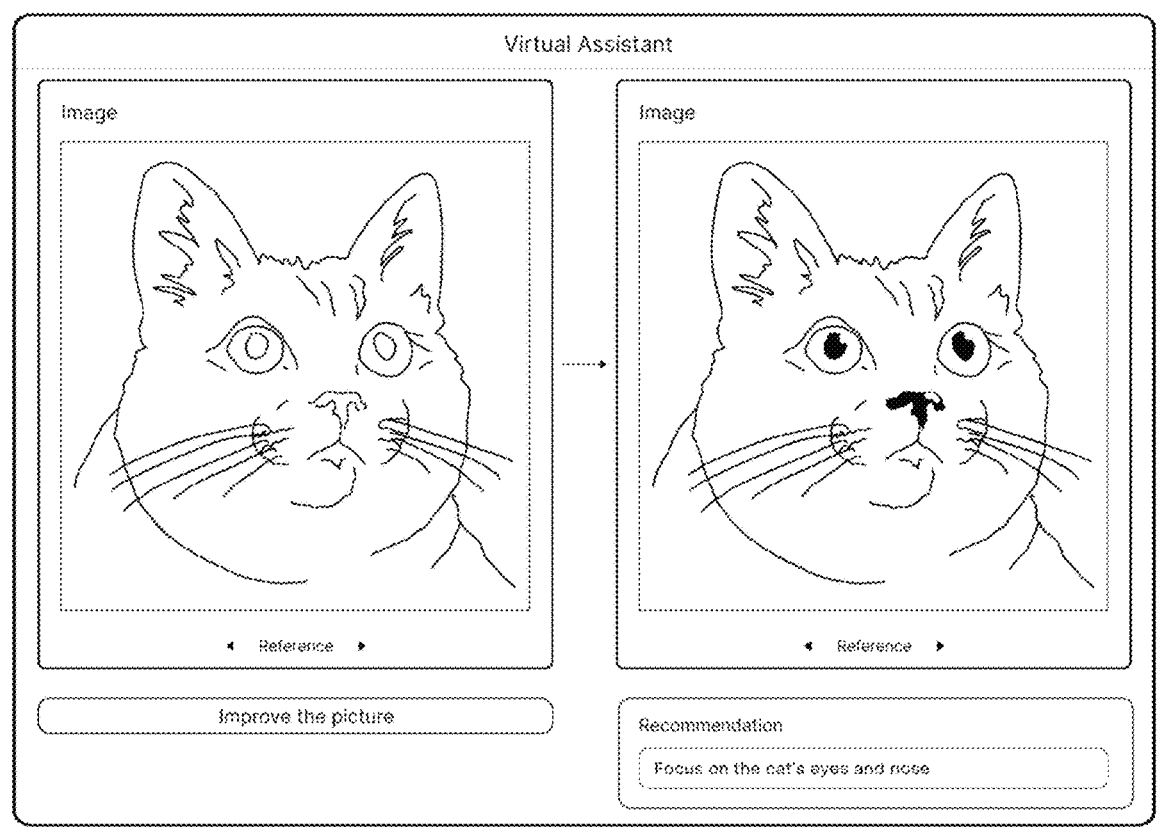
Figure 19:
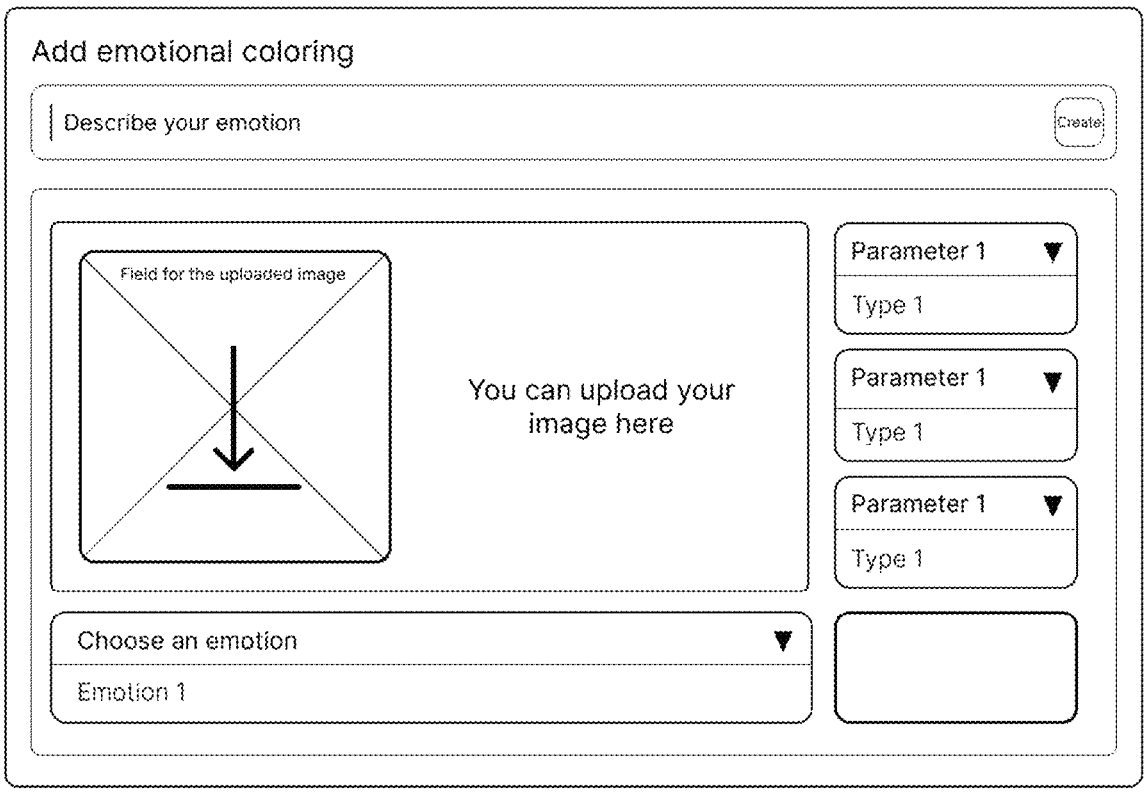
Figure 20:
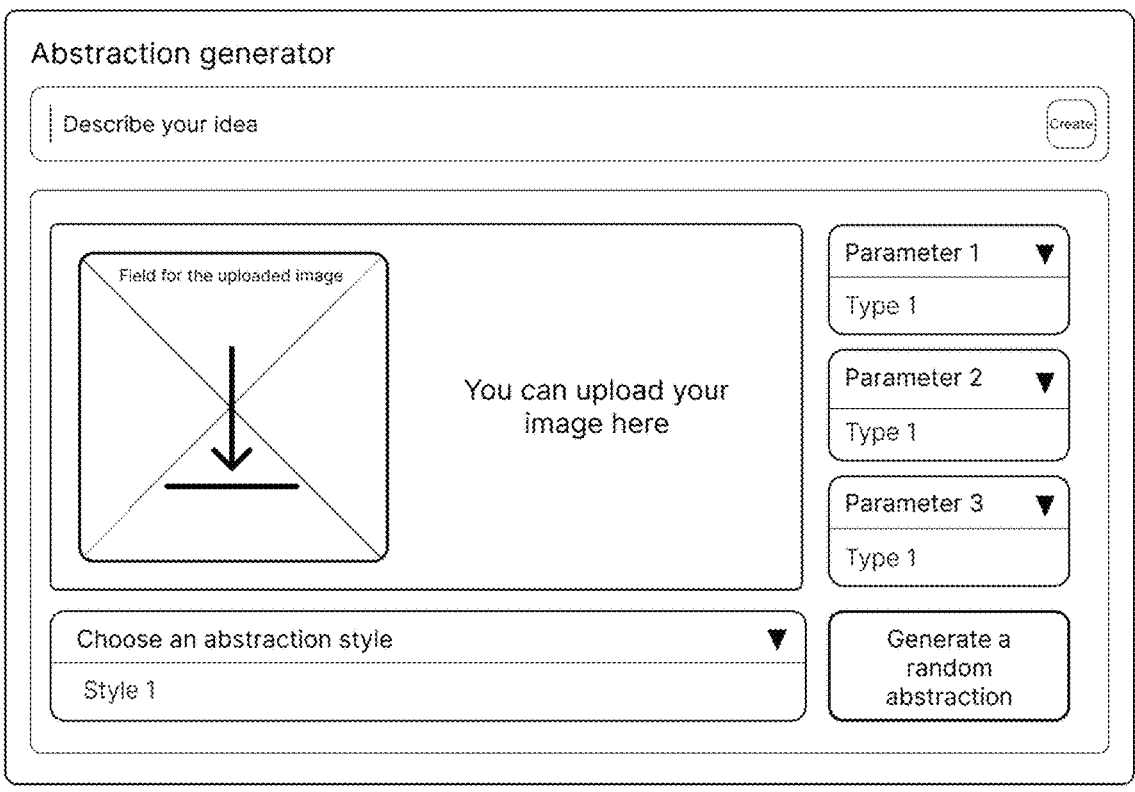
Figure 21:
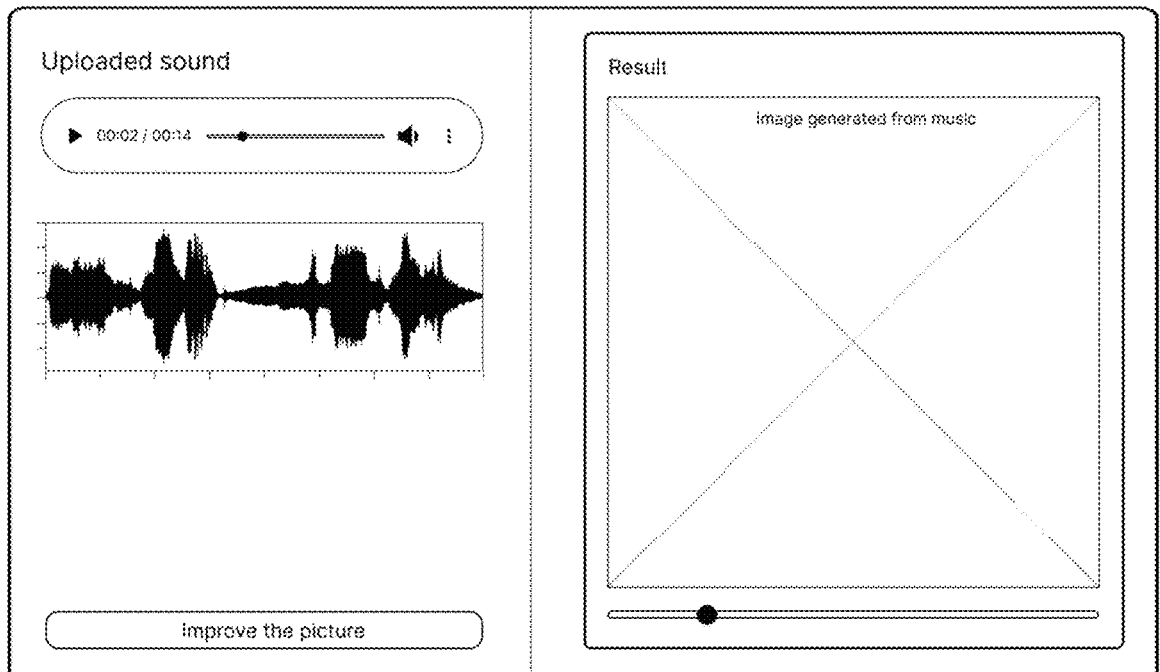
Figure 22:
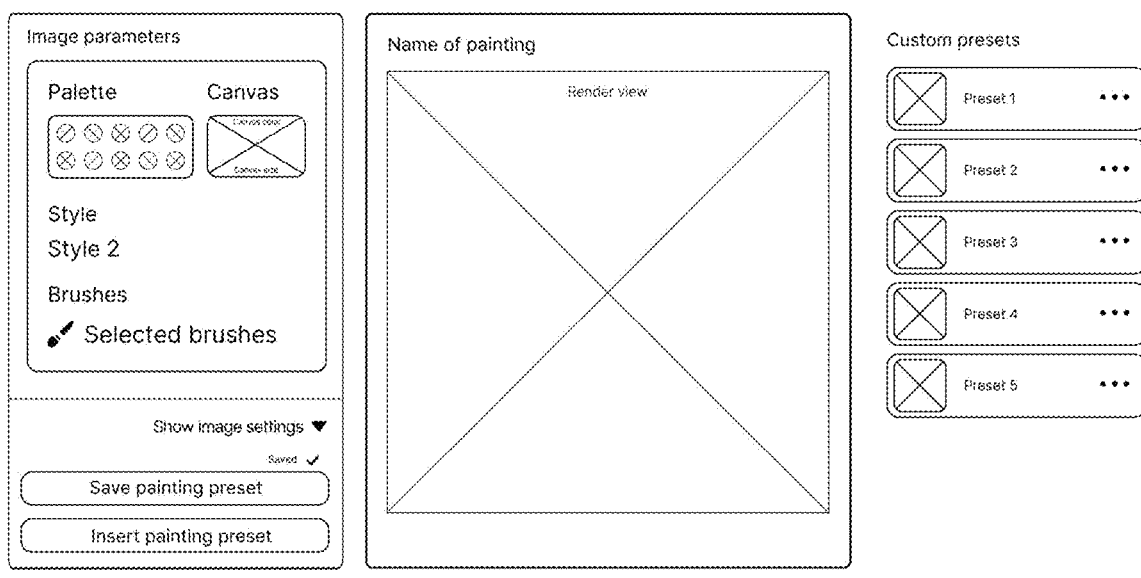
Figure 23:
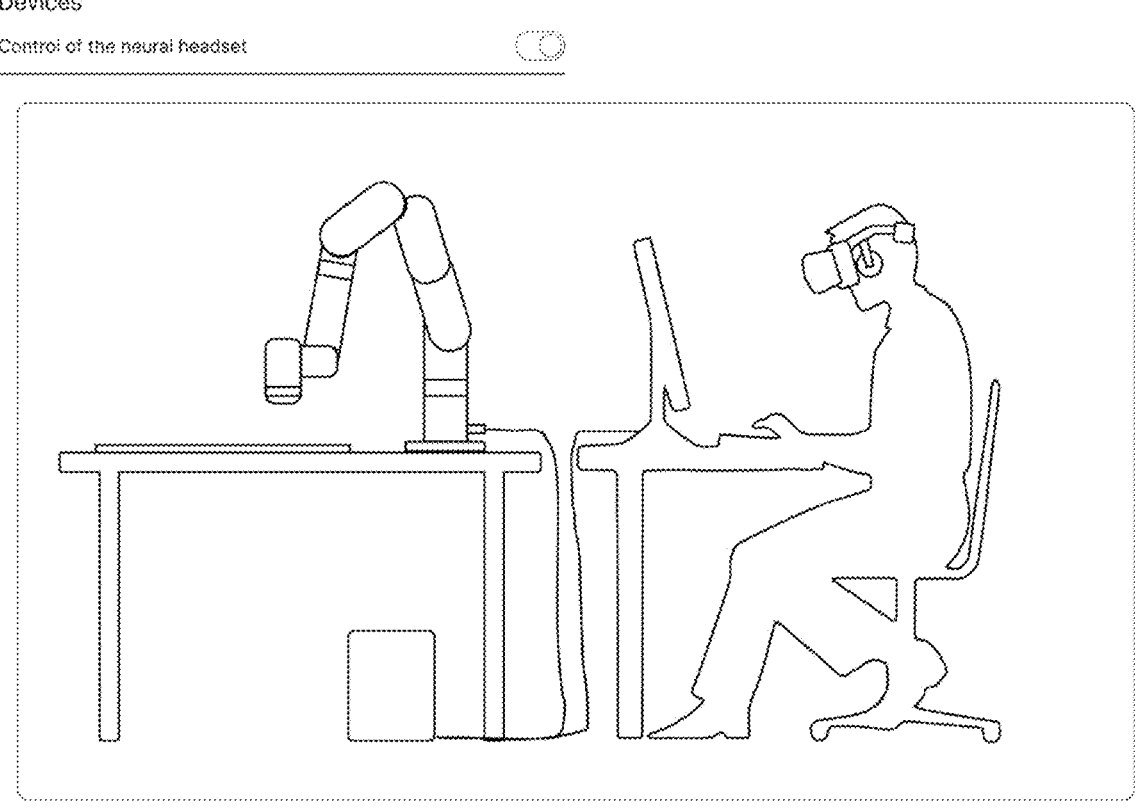
Figure 24:
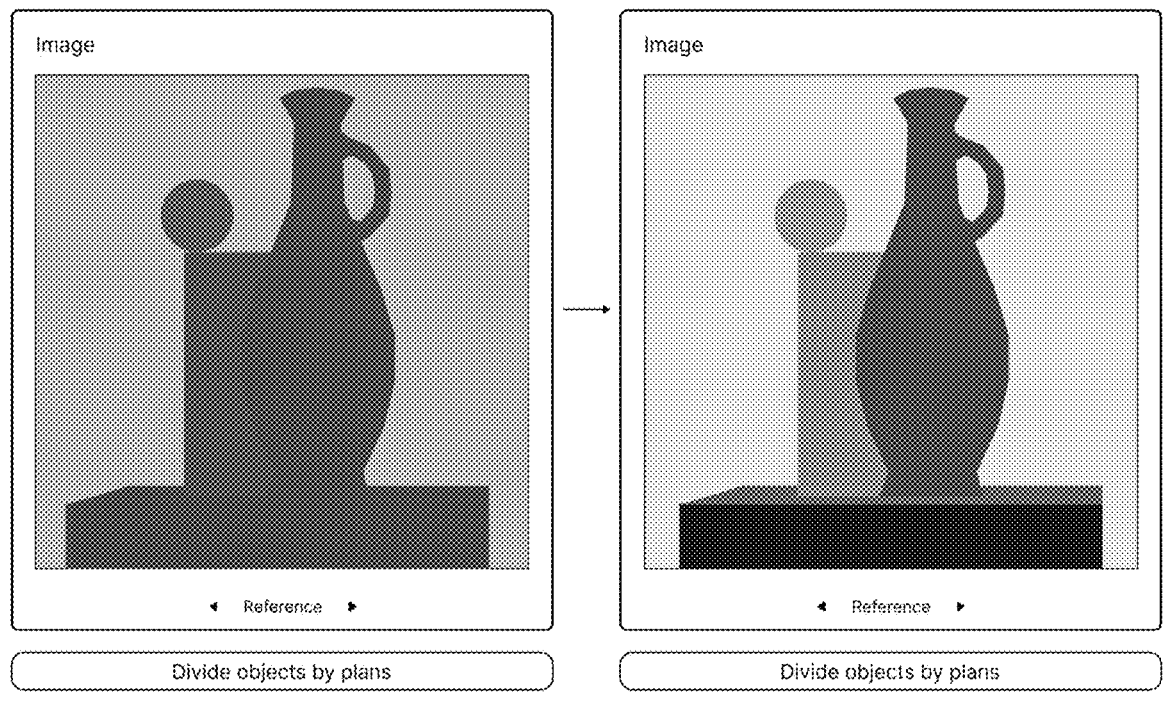
Figure 25:
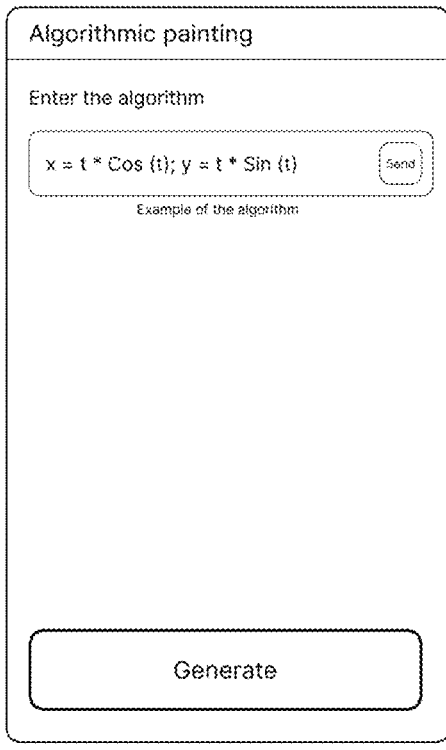
Figure 25:
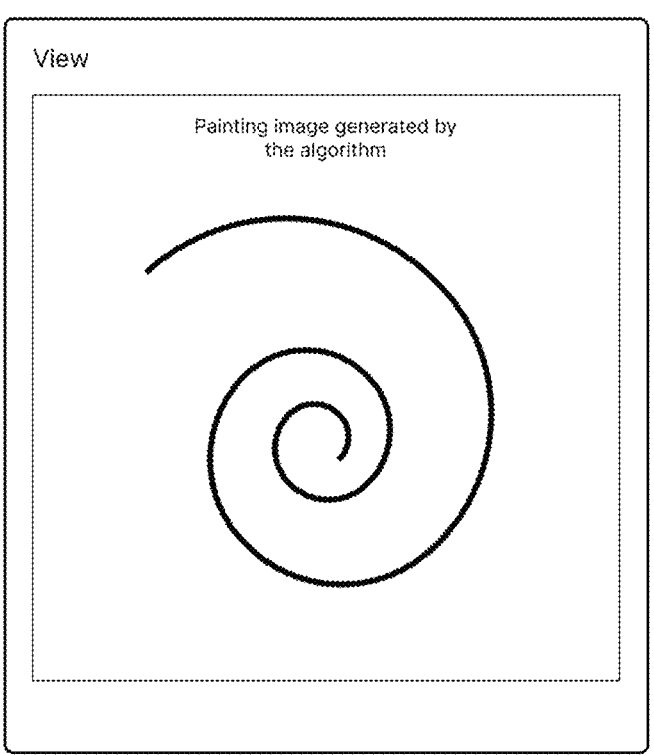
Figure 26:
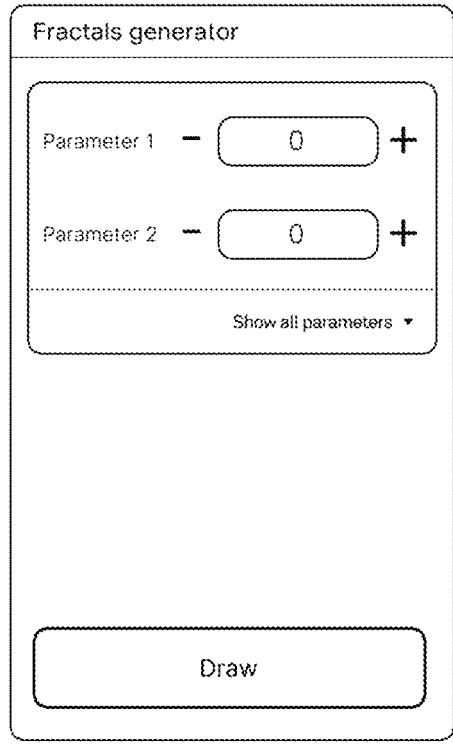
Figure 26:
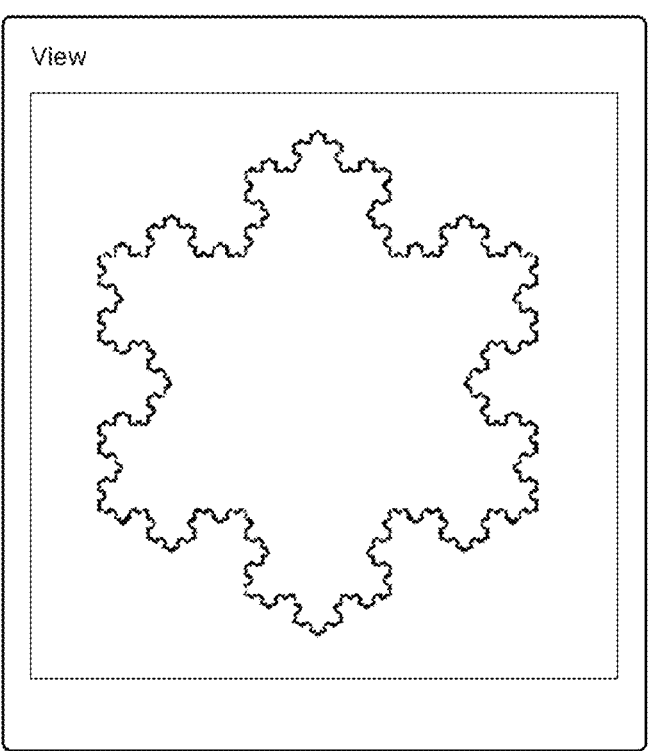
Figure 27:
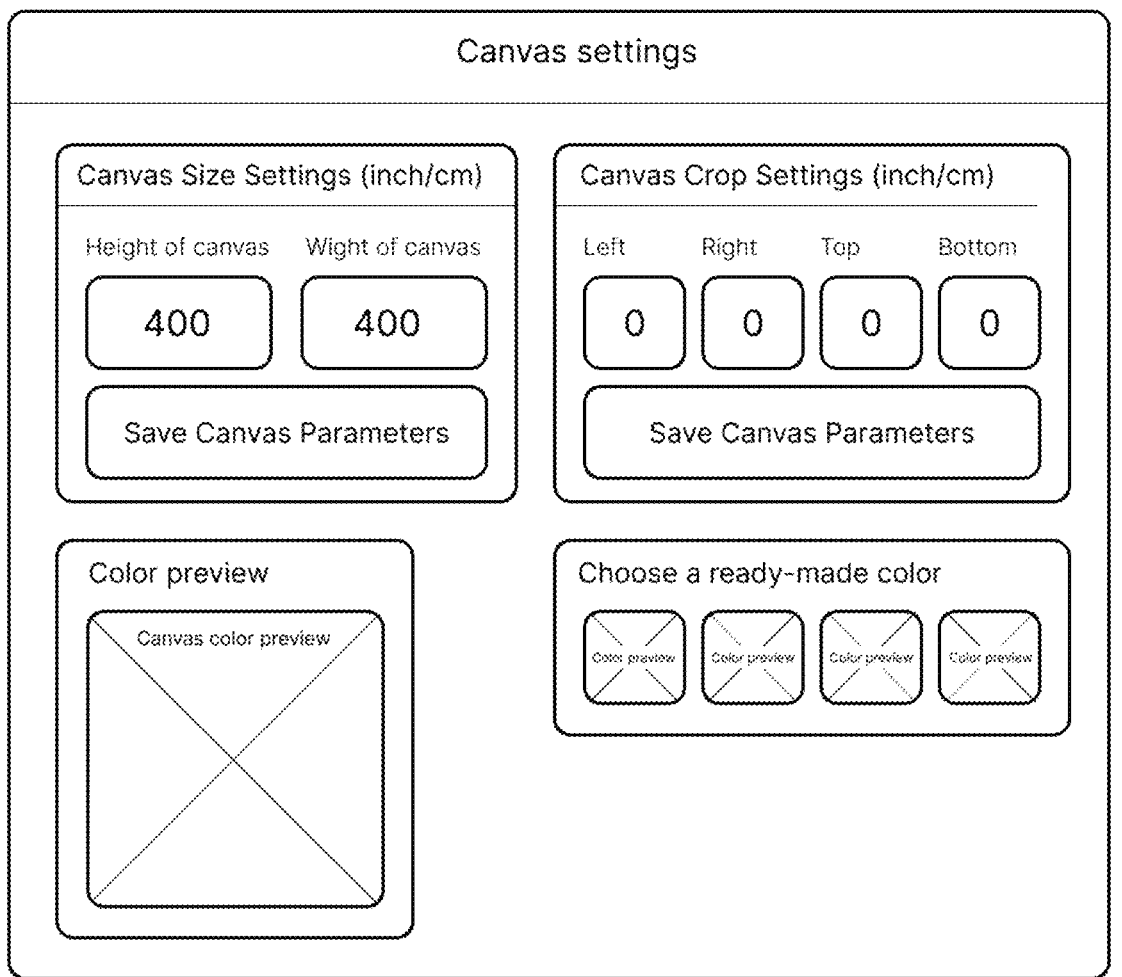
Figure 28:
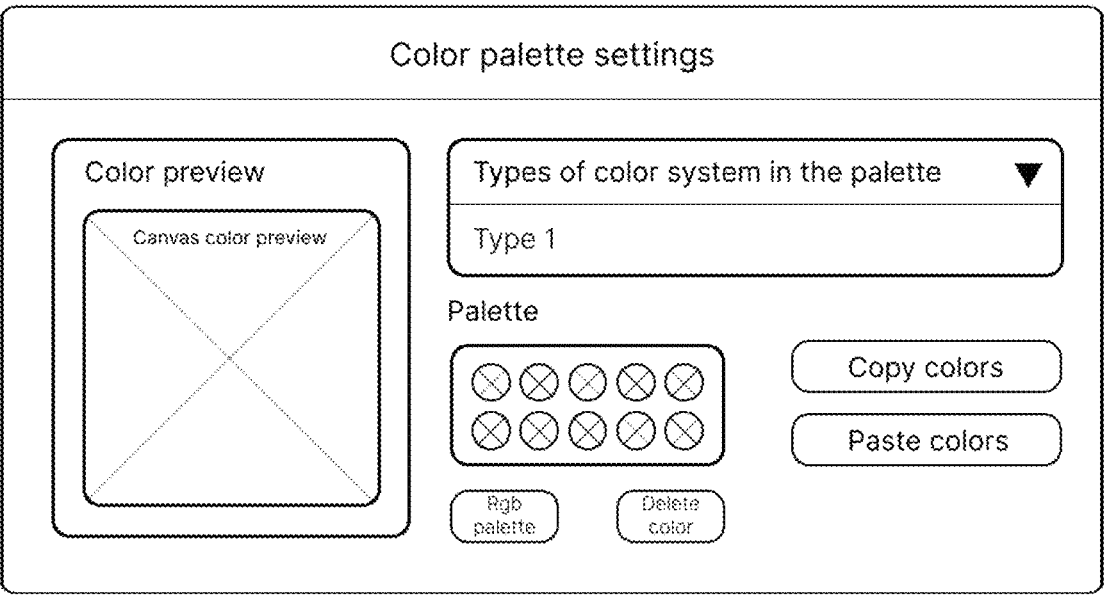
Figure 29:
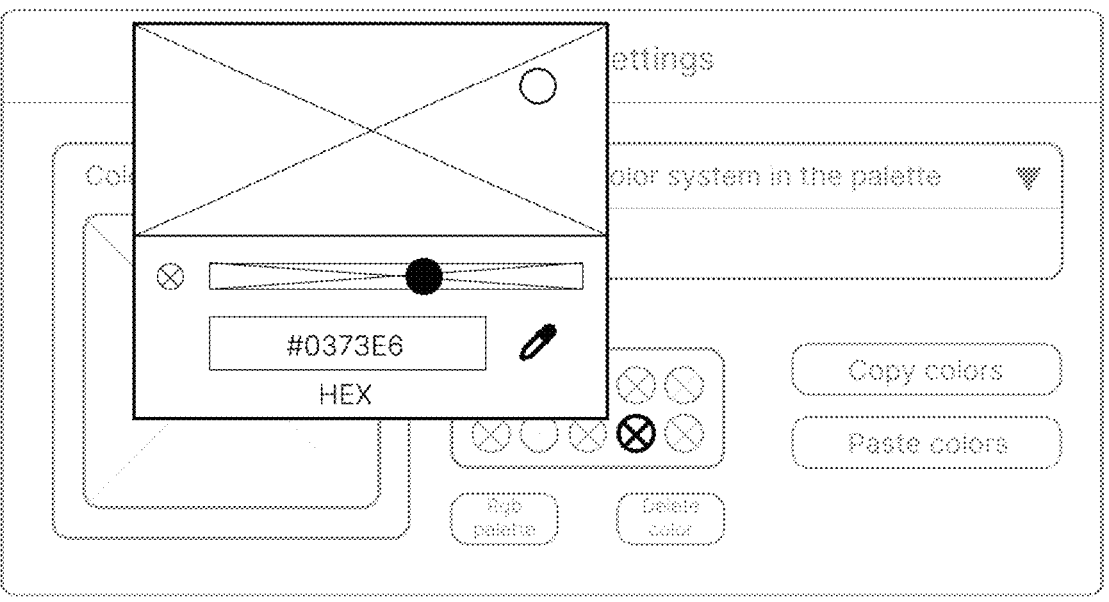
Figure 30:
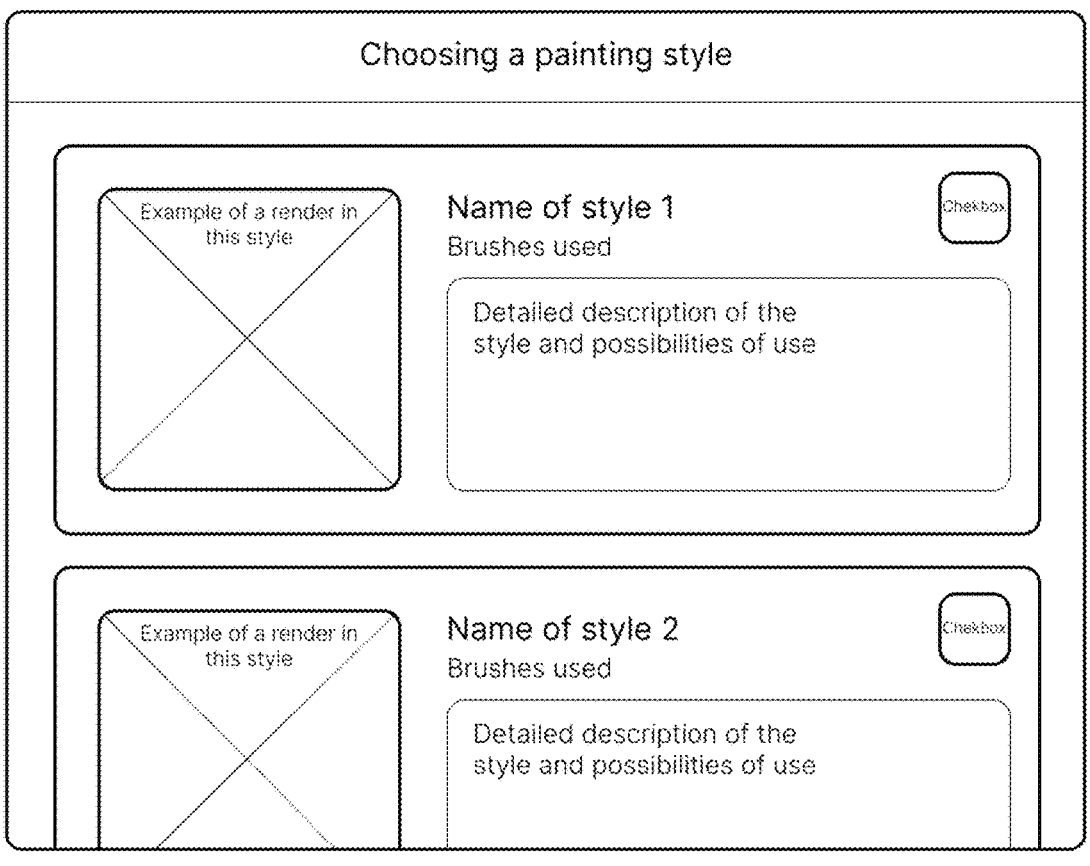
Figure 31:
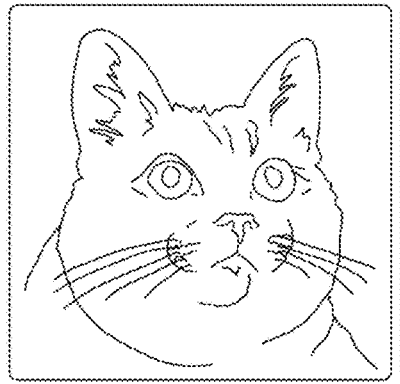
Figure 31:
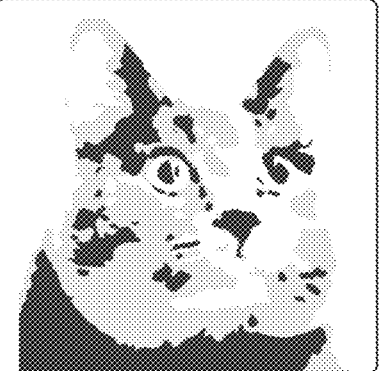
Figure 31:
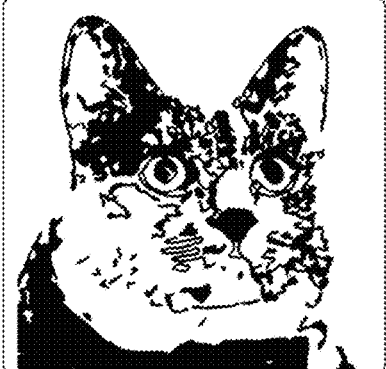
Figures 32, 33:
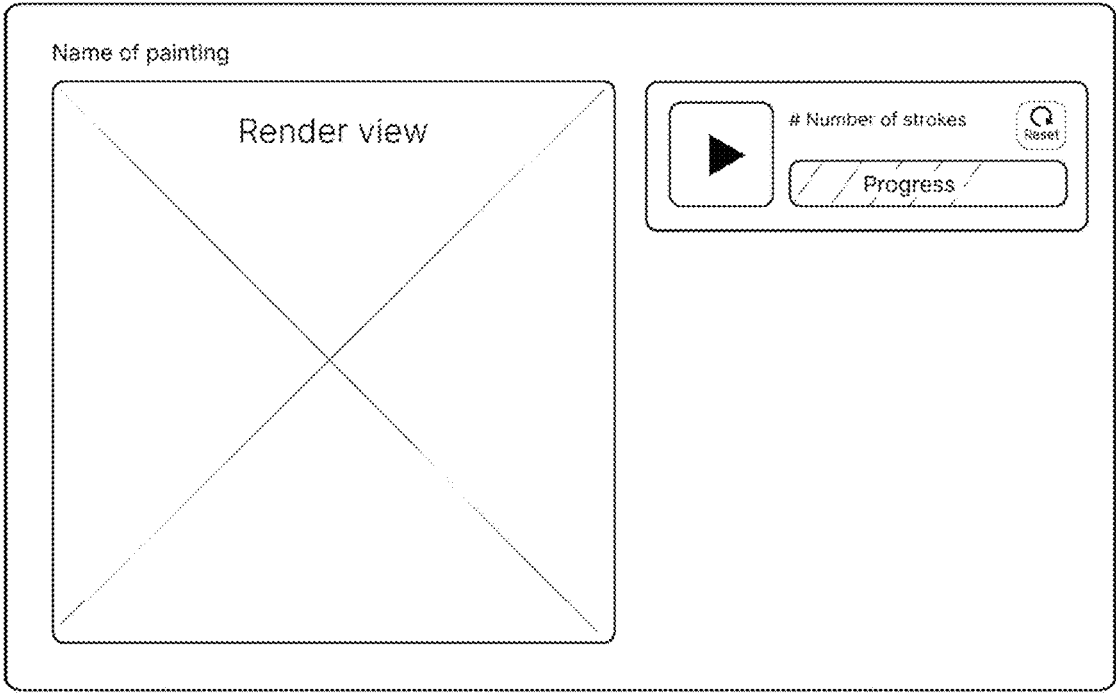
Figure 34:
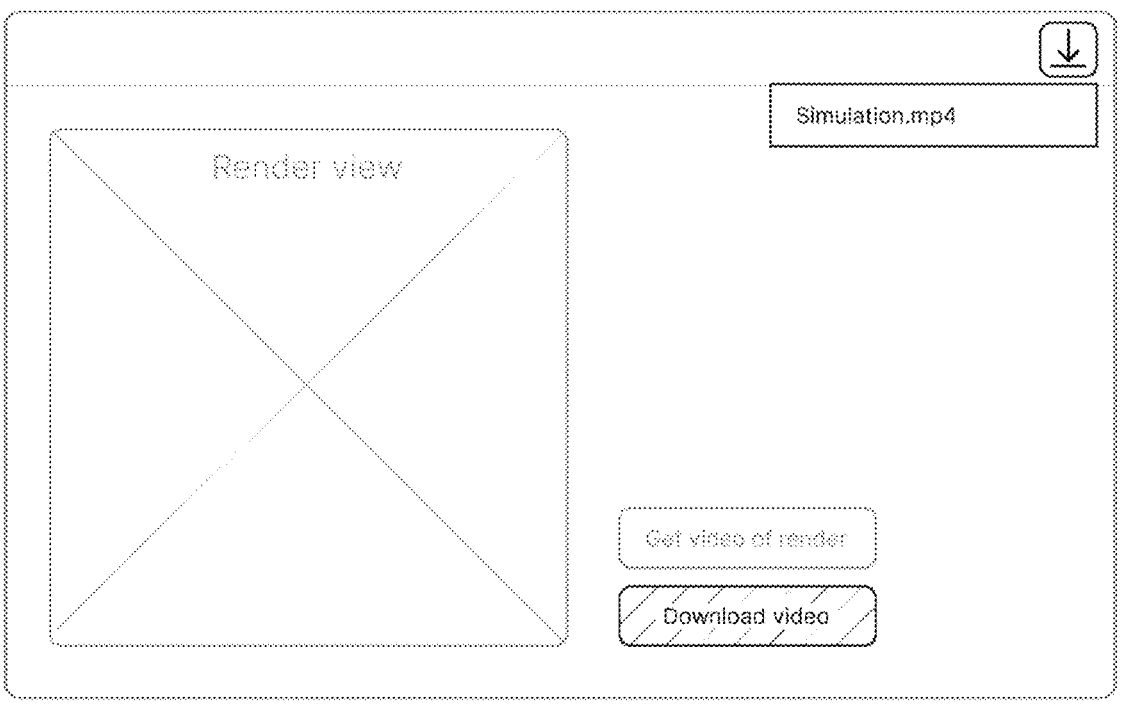
Figure 35:
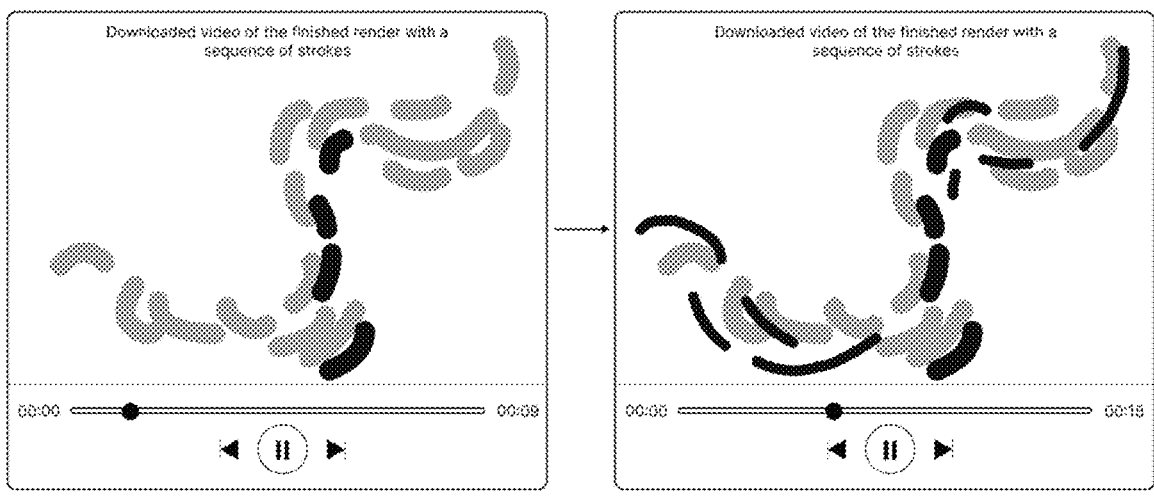
Figure 36:
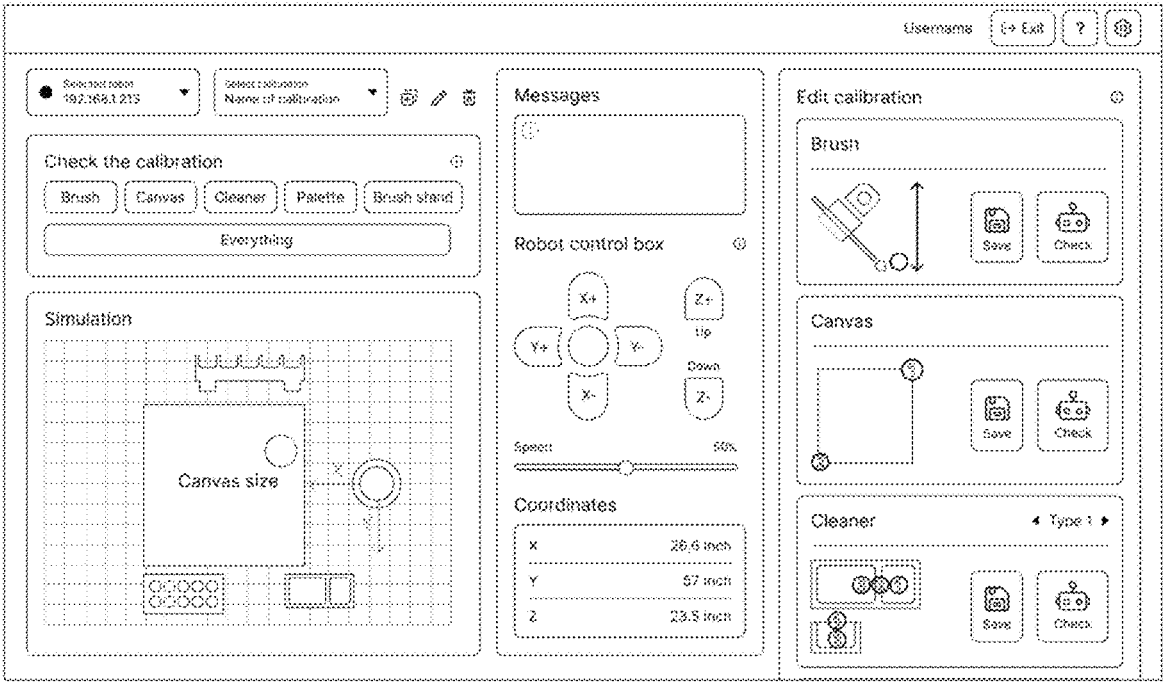
Figure 37:
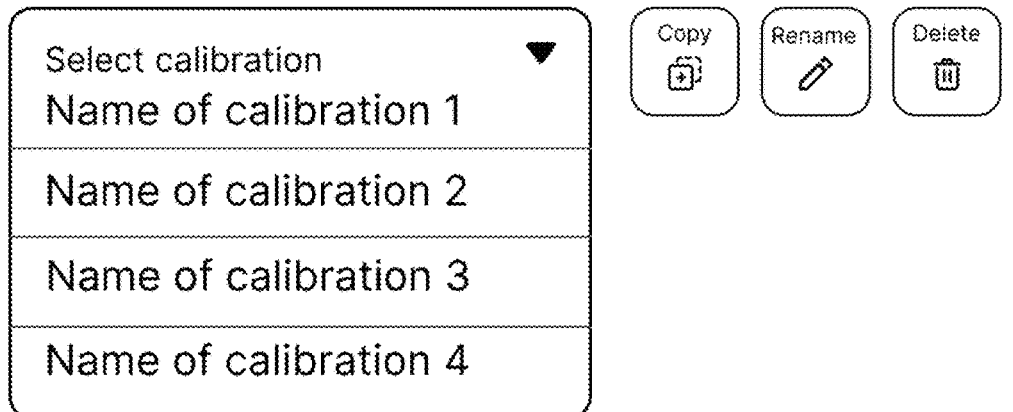
Figure 38:
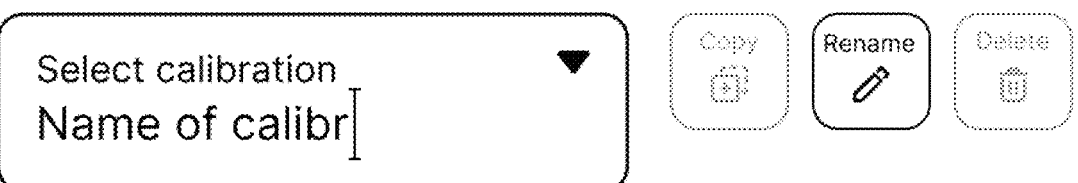
Figure 39:
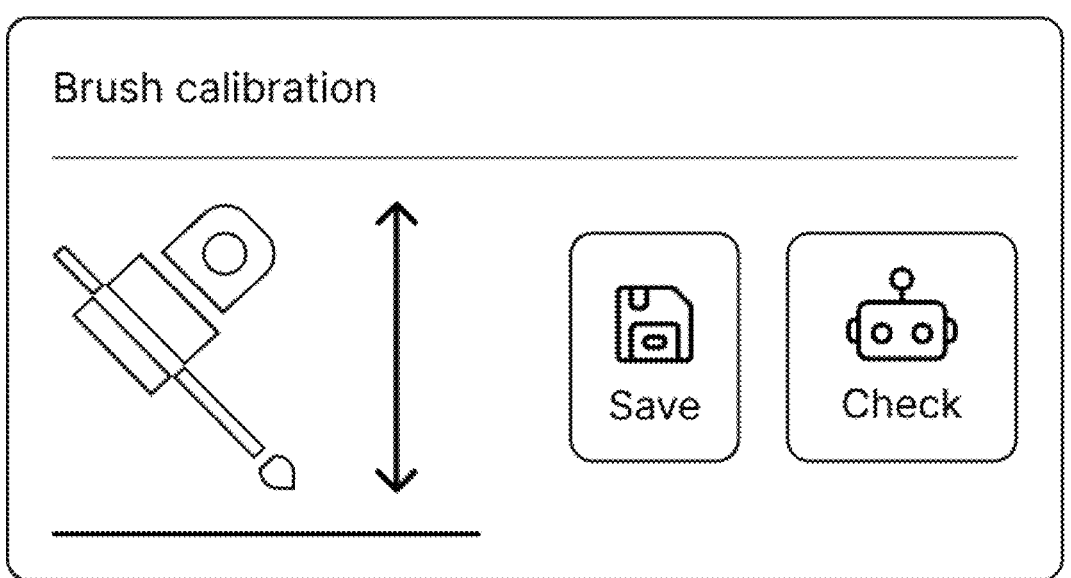
Figure 40:
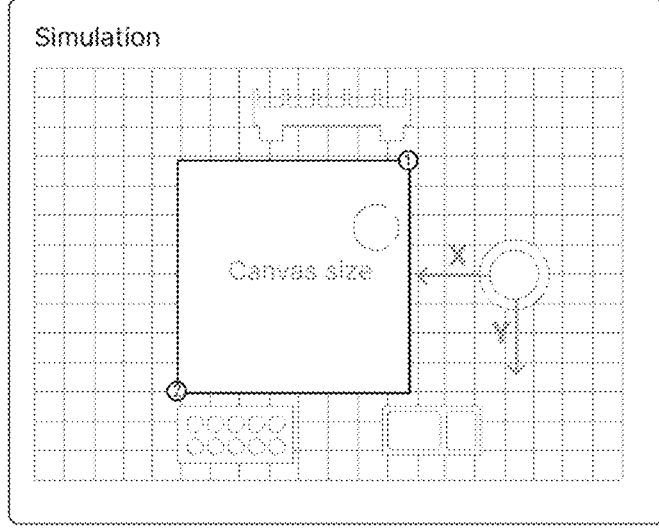
Figure 40:
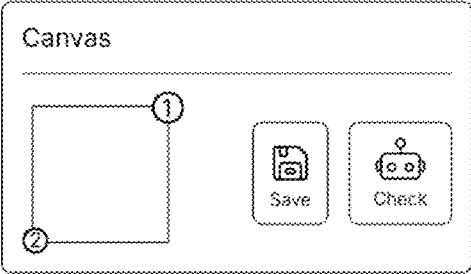
Figure 41:
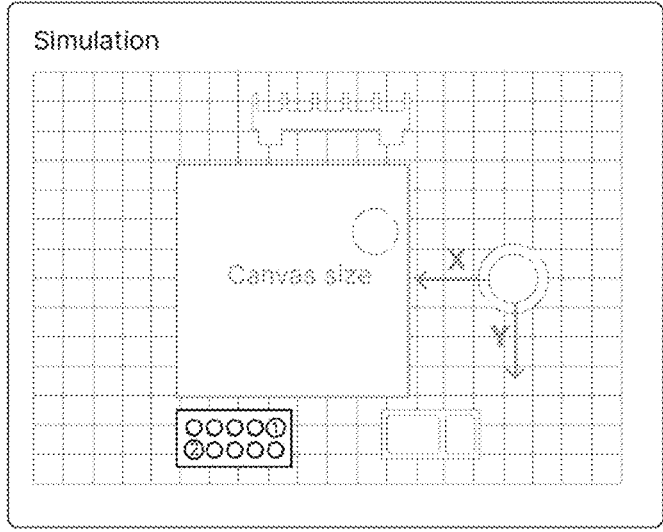
Figure 41:
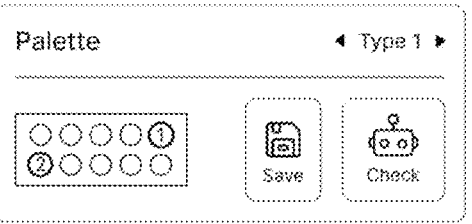
Figure 42:
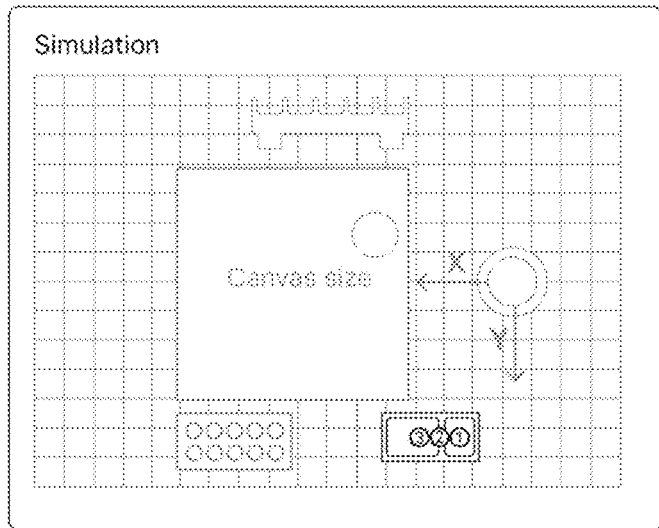
Figure 42:
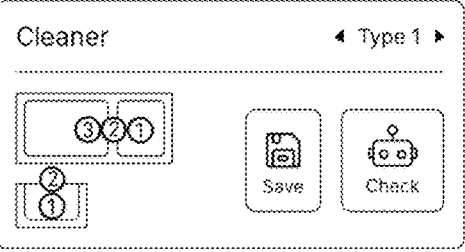

FIG. 11 shows a representative screen of the robot interface system for setting color harmonization;

FIG. 12 shows a representative screen of the robot interface system for setting a "Historical styles" feature;

FIG. 13 shows a representative screen of the robot interface system for setting a "Random element generator" feature;

FIG. 14 shows a representative screen of the robot interface system for setting a "Lighting effects" feature;

FIG. 15 shows a representative screen of the robot interface system for setting a "Collage" feature;

FIG. 16 shows a representative screen of the robot interface system for setting a "Mixed Media" feature;

FIG. 17 shows a representative screen of the robot interface system for setting an "Interior" feature;

FIG. 18 shows a representative screen of the robot interface system for setting a "Virtual Art Assistant" feature;

FIG. 19 shows a representative screen of the robot interface system for setting an "Emotional coloring" feature;

FIG. 20 shows a representative screen of the robot interface system for setting an "Abstraction generator" feature;

FIG. 21 shows a representative screen of the robot interface system for setting a "Musical Inspiration" feature;

FIG. 22 shows a representative screen of the robot interface system for setting a "Personalized templates" feature;

FIG. 23 shows a schematic diagram illustrating system integration with a virtual reality device;

FIG. 24 shows a representative screen of the robot interface system for setting a "Split into plans" feature;

FIG. 25 shows a representative screen of the robot interface system for setting an "Algorithmic drawing" feature;

FIG. 26 shows a representative screen of the robot interface system for setting a "Fractal generator" feature;

FIG. 27 shows a representative screen of the robot interface system for setting up a digital canvas;

FIG. 28 shows a representative screen of the robot interface system for selecting a palette type;

FIG. 29 shows a representative screen of the robot interface system for selecting palette colors;

FIG. 30 shows a representative screen of the robot interface system for choosing a drawing style;

FIG. 31 shows examples of digital prototypes of artworks made in different styles;

FIG. 32 shows a representative screen of the robot interface system for a "Start rendering" feature;

FIG. 33 shows an example of statistical information of a digital prototype of an artwork;

FIG. 34 shows a representative screen of the robot interface system for setting a video download of a digital prototype of the artwork;

FIG. 35 shows an example of an uploaded video digital prototype of the artwork;

FIG. 36 shows a representative screen of the robot interface system for performing calibration;

FIG. 37 shows a representative screen of the robot interface system for selecting a calibration from the list;

FIG. 38 shows a representative screen of the robot interface system for editing the name of a selected calibration;

FIG. 39 shows a representative screen of the robot interface system for performing brush calibration;

FIG. 40 shows a representative screen of the robot interface system for calibrating the location of the art surface (for example, canvas);

FIG. 41 shows a representative screen of the robot interface system for performing a palette layout calibration;

FIG. 42 shows a representative screen of the robot interface system for calibrating a brush wiping system;

4

Figure 43:
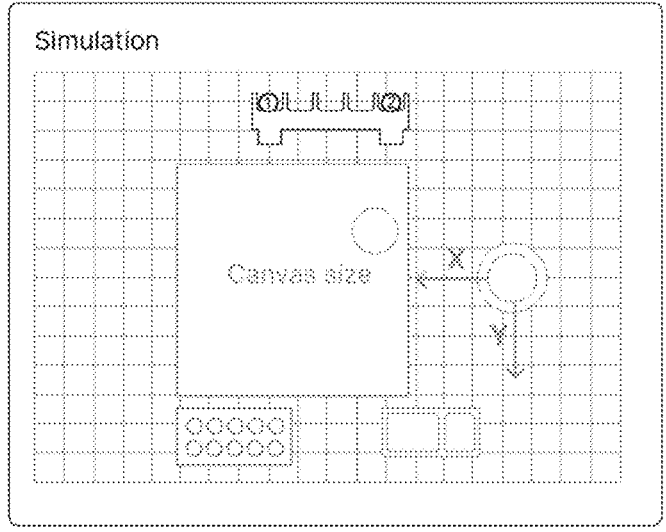
Figure 43:
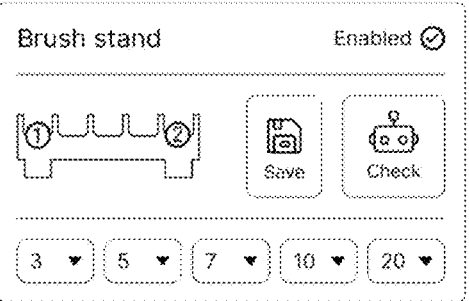
Figure 44:
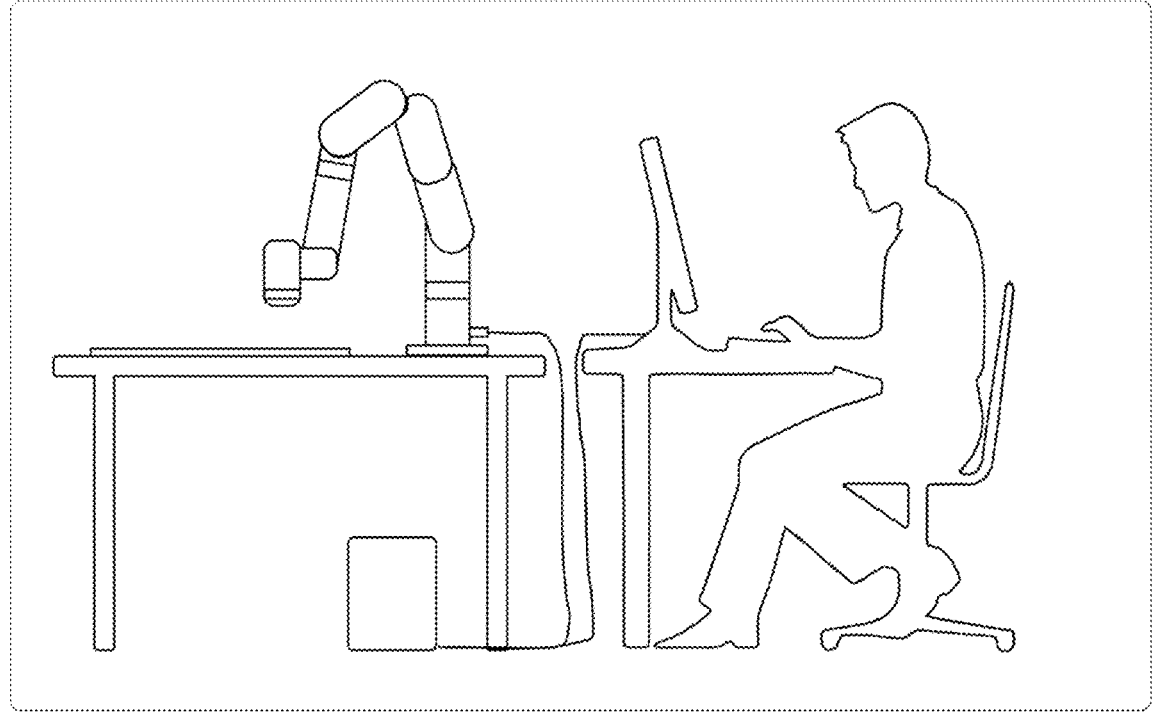
Figure 45:
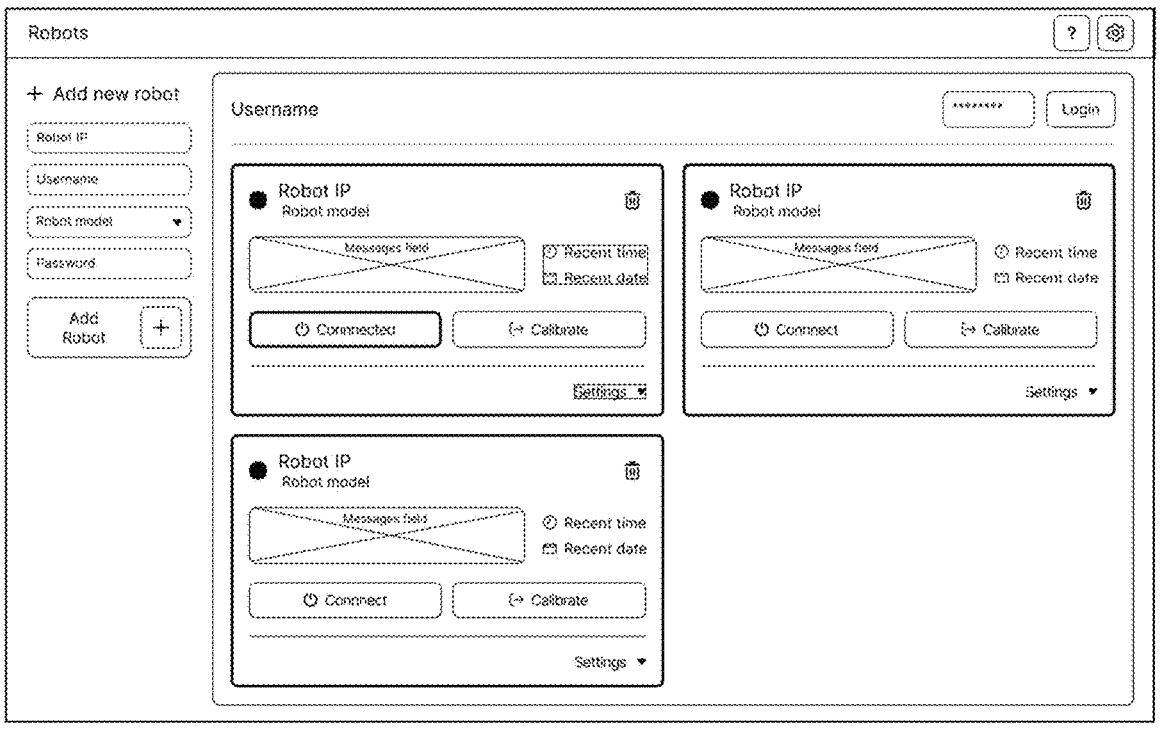
Figure 46:
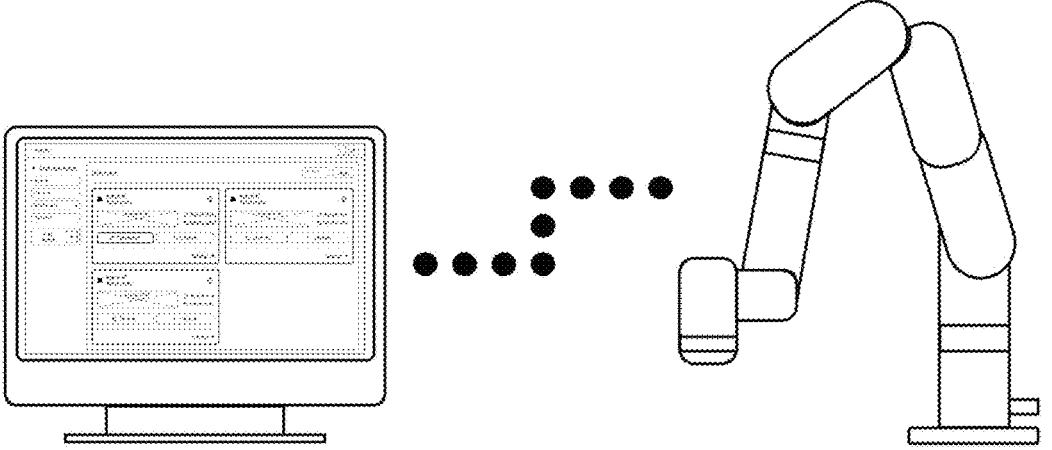
Figure 47:
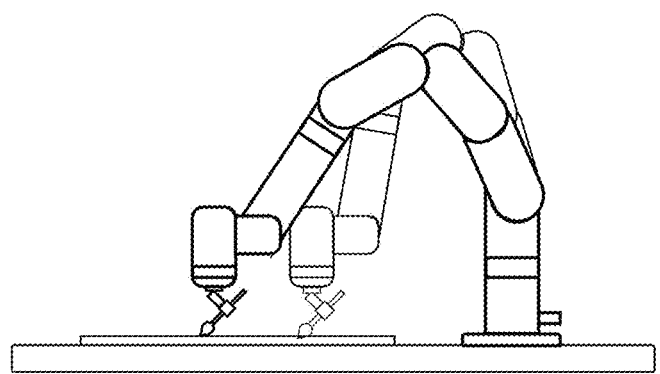
Figure 47:
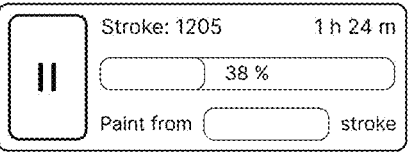
Figure 48:
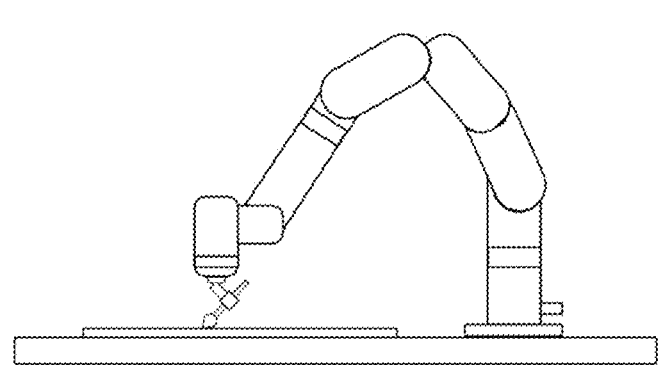
Figure 48:
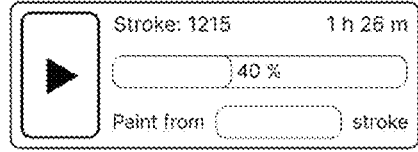
Figure 49:
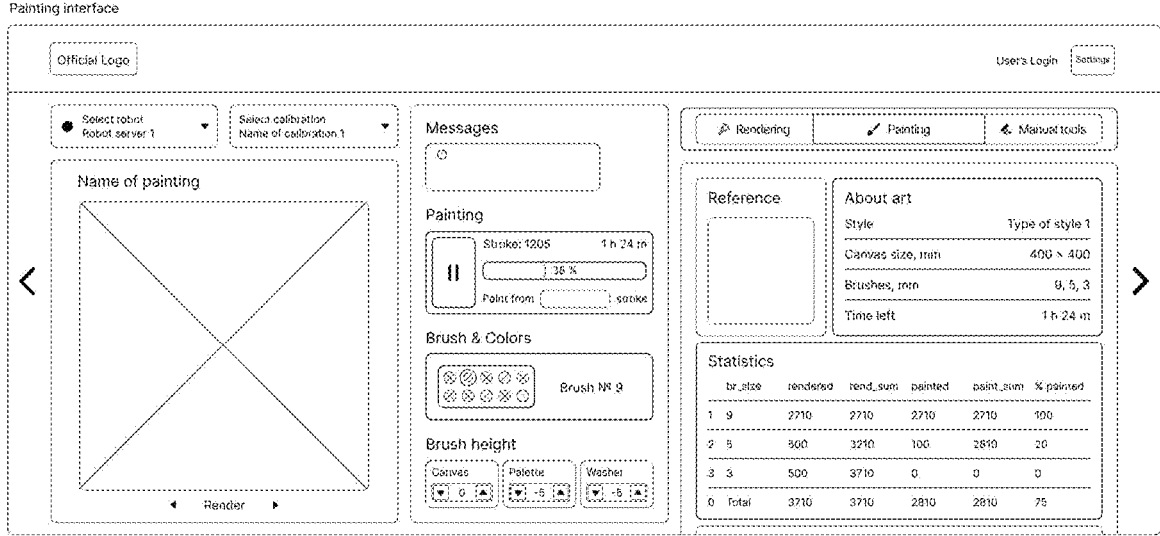
Figure 50:
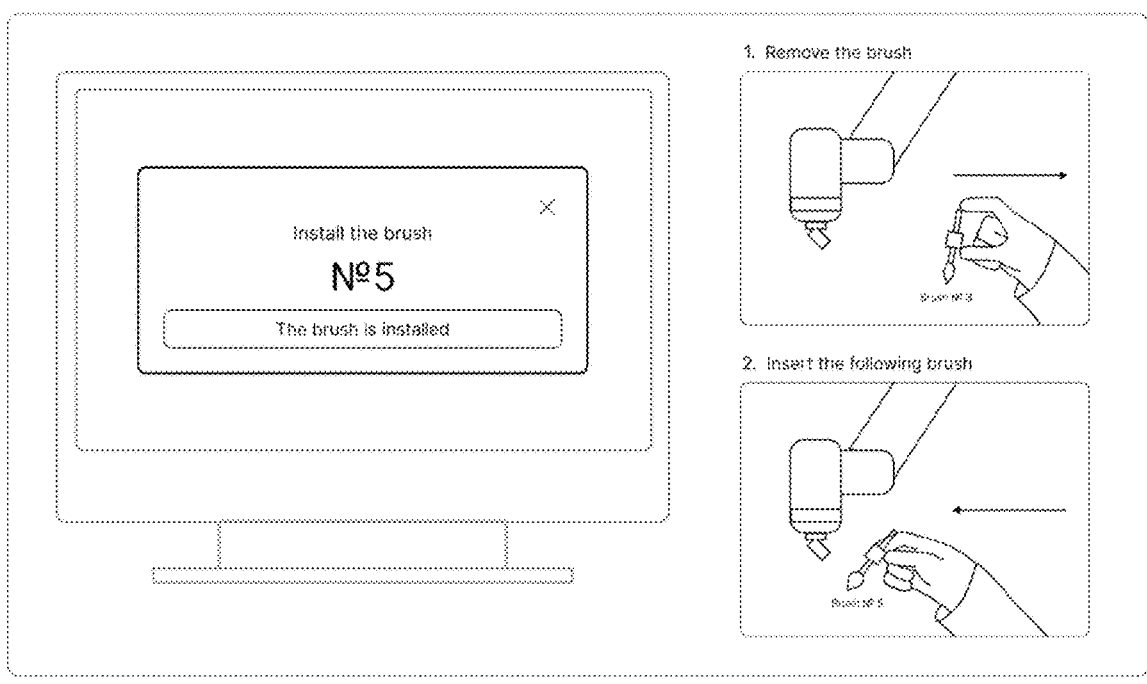
Figure 51:
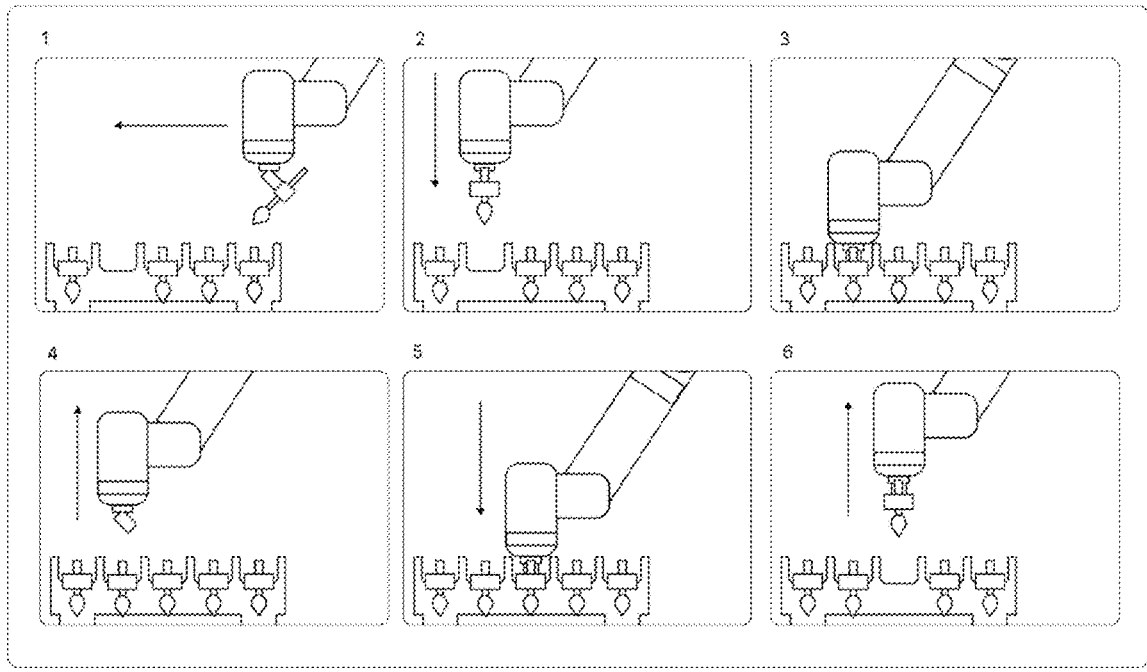
Figure 52:
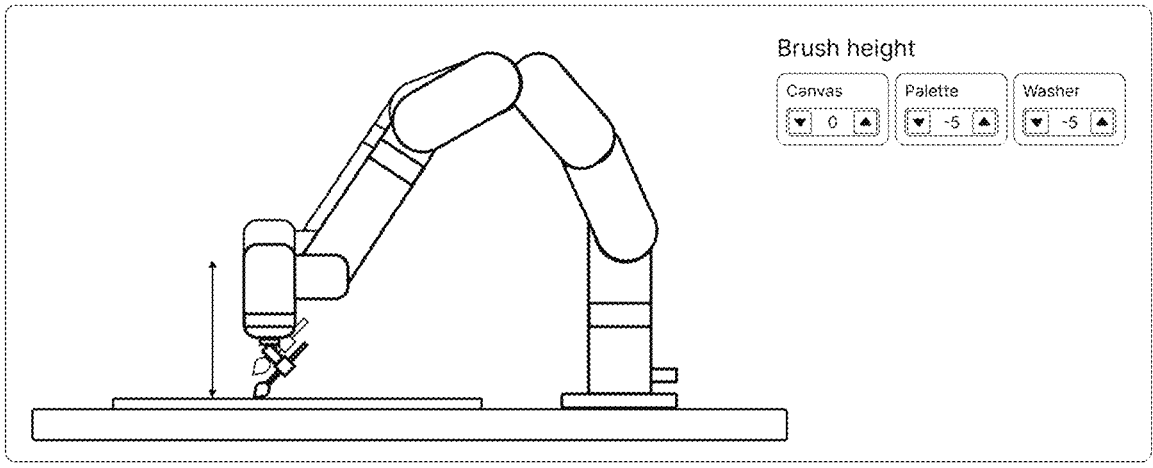
Figure 53:
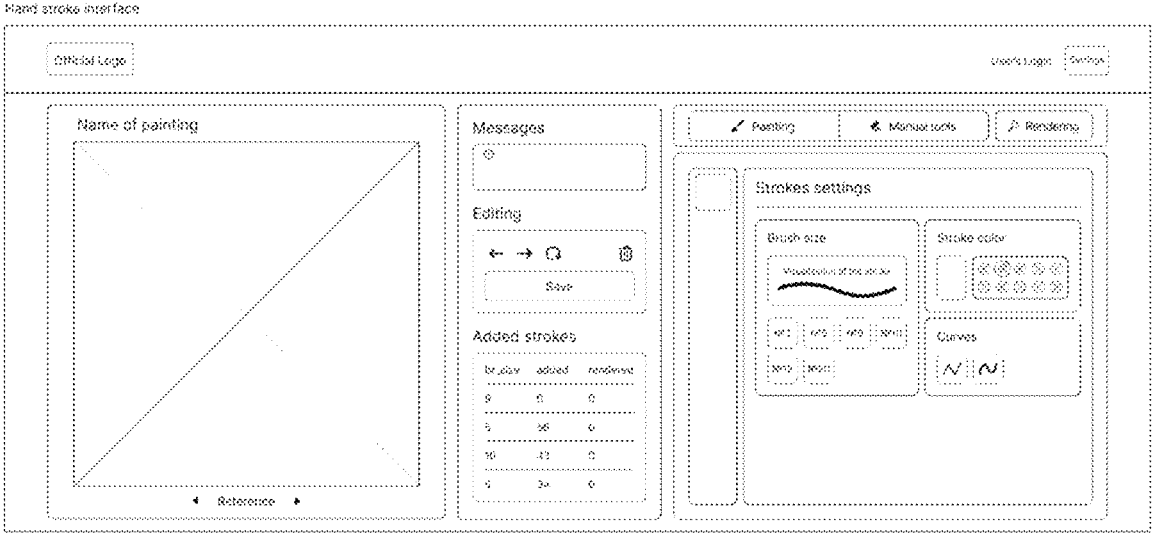
Figure 54:
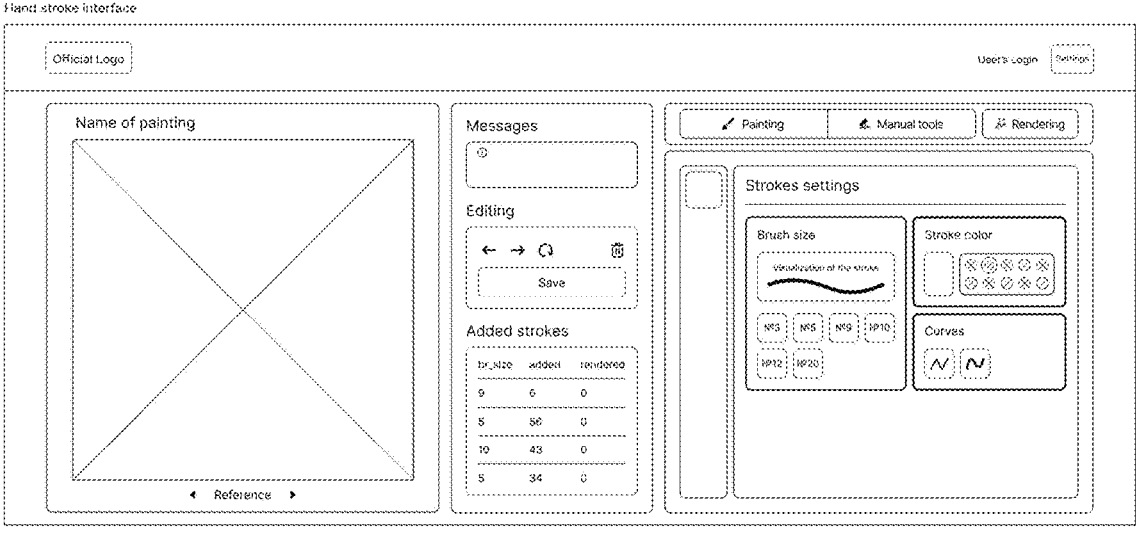
Figure 55:
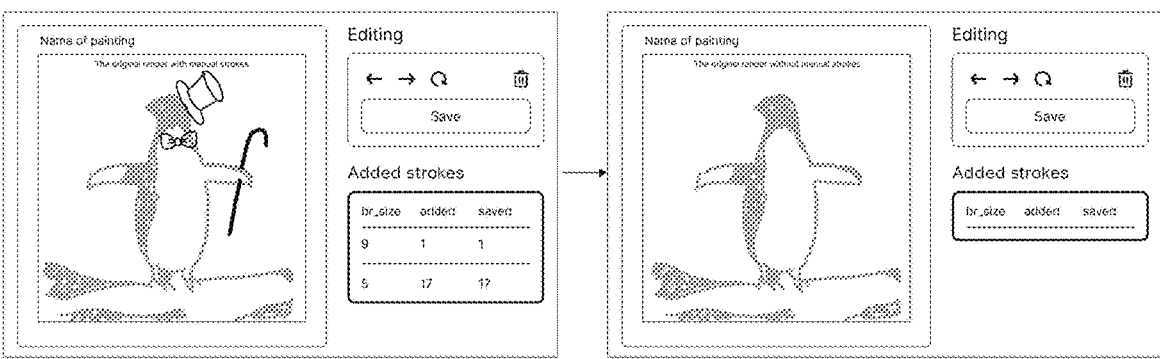
Figure 56:
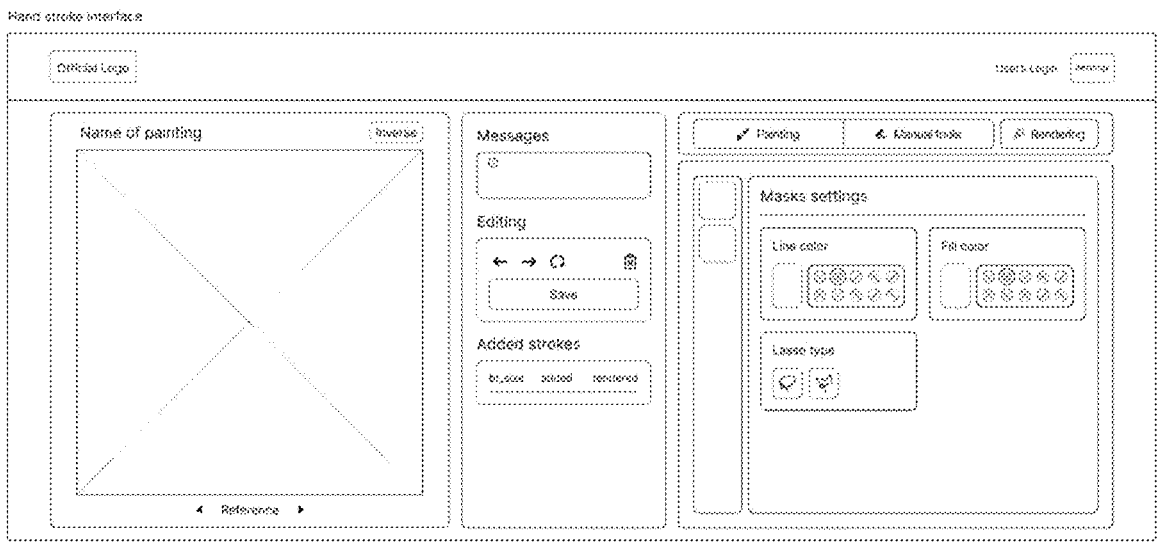
Figure 57:
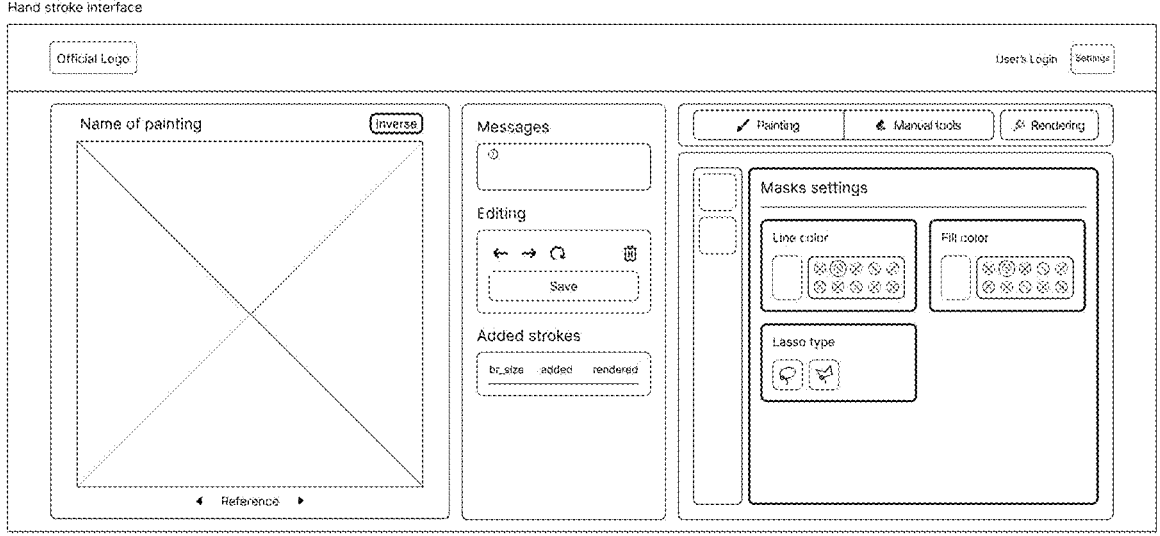
Figure 58:
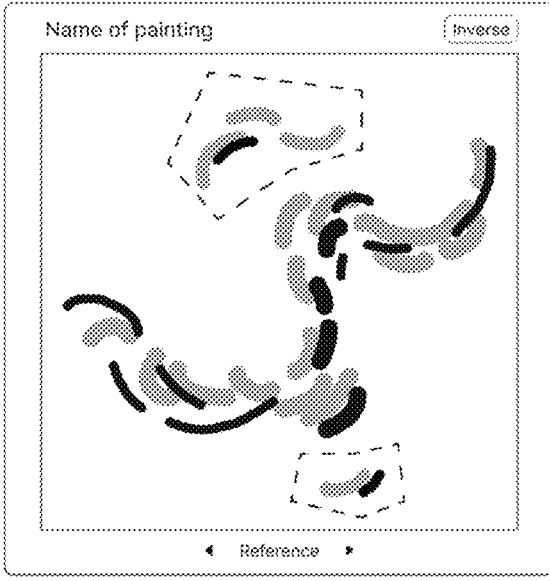
Figure 58:
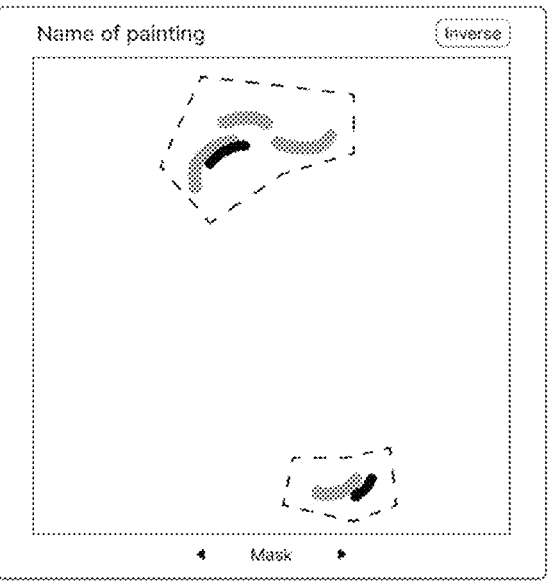
Figure 59:
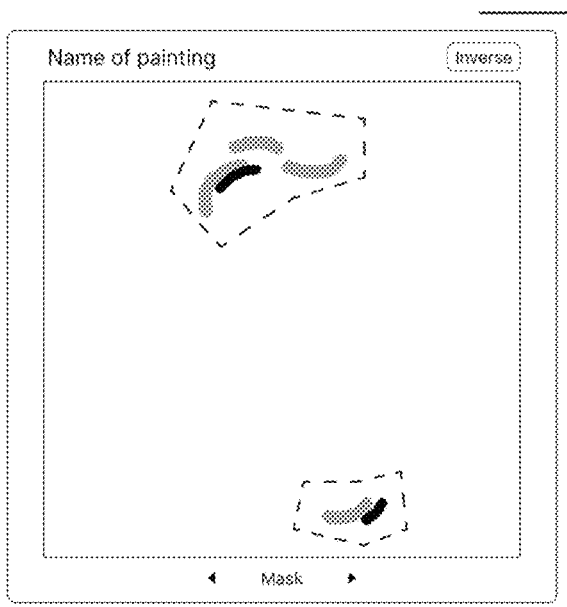
Figure 59:
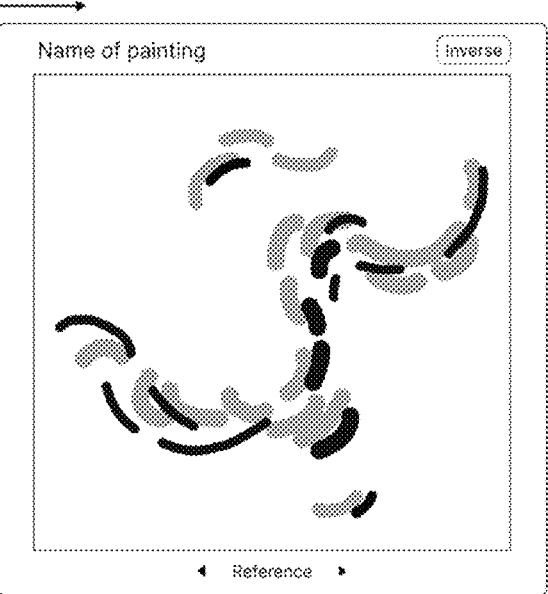
Figures 62, 63:
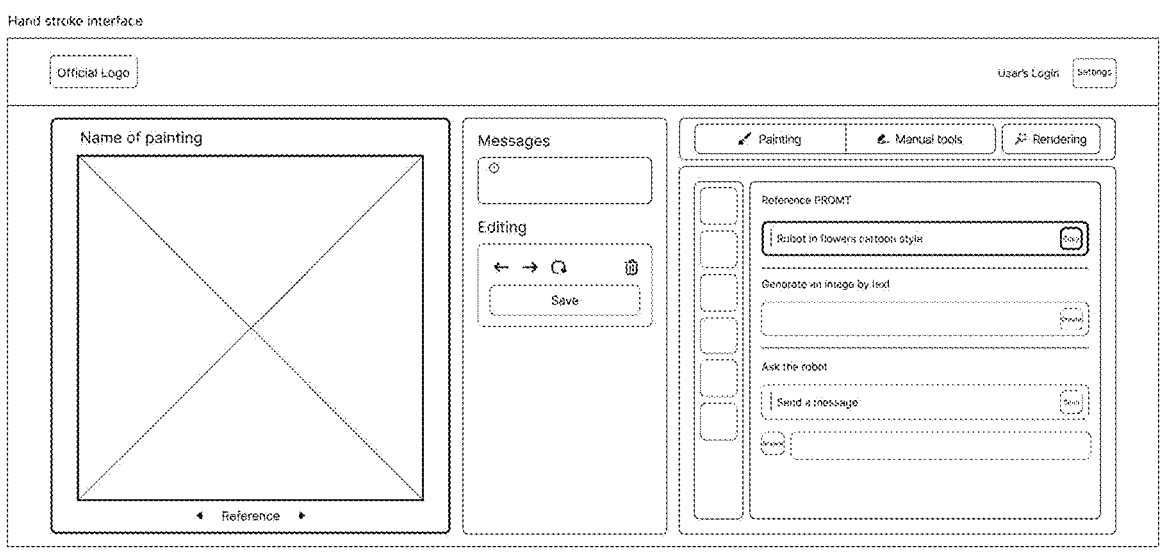
Figure 64:
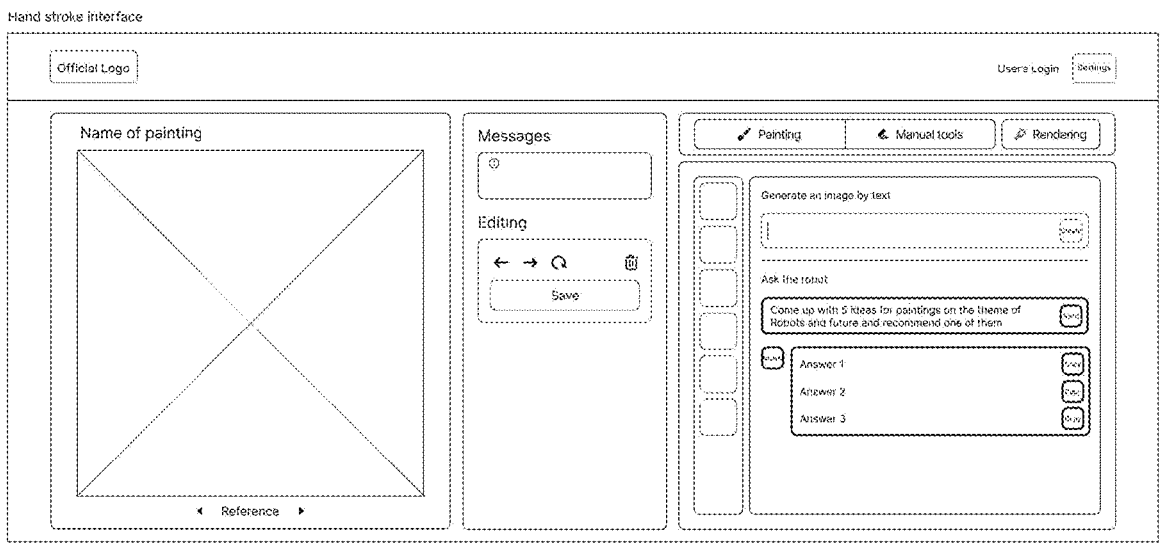
Figure 65:
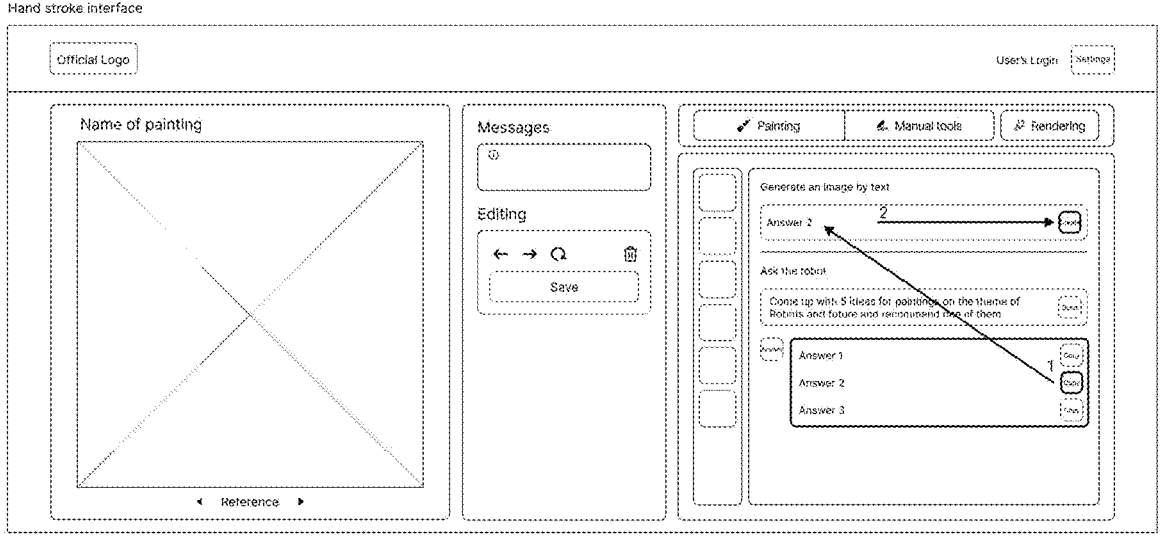
Figure 66:
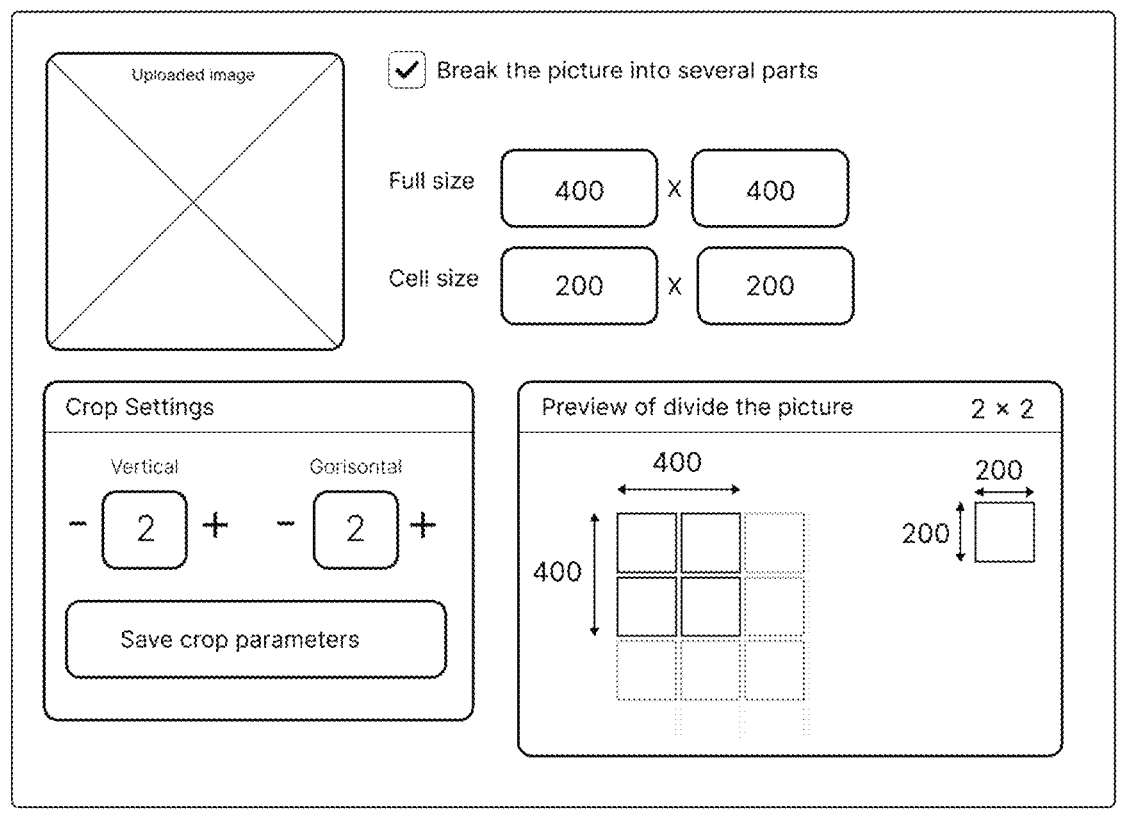
Figure 67:
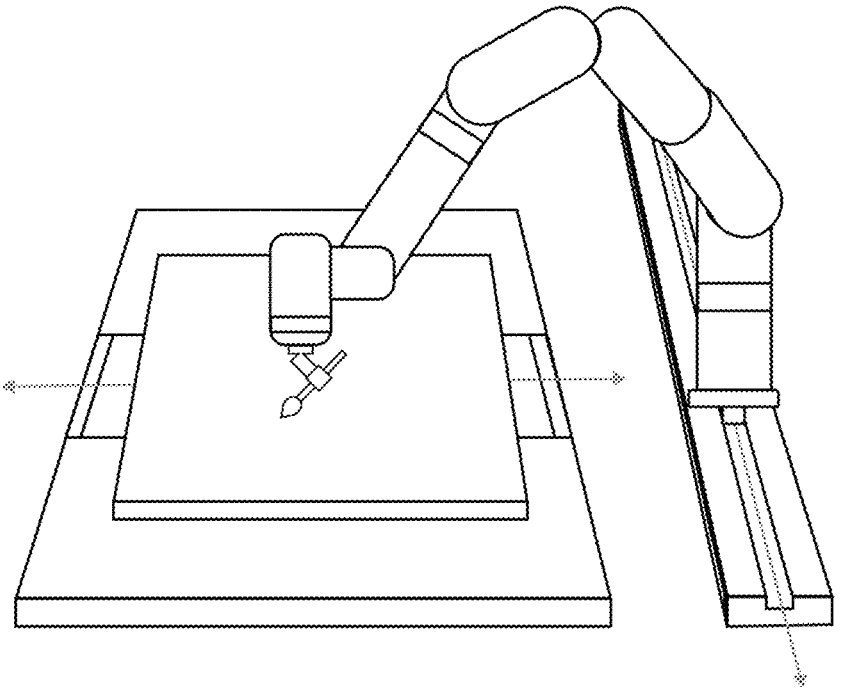
Figure 68:
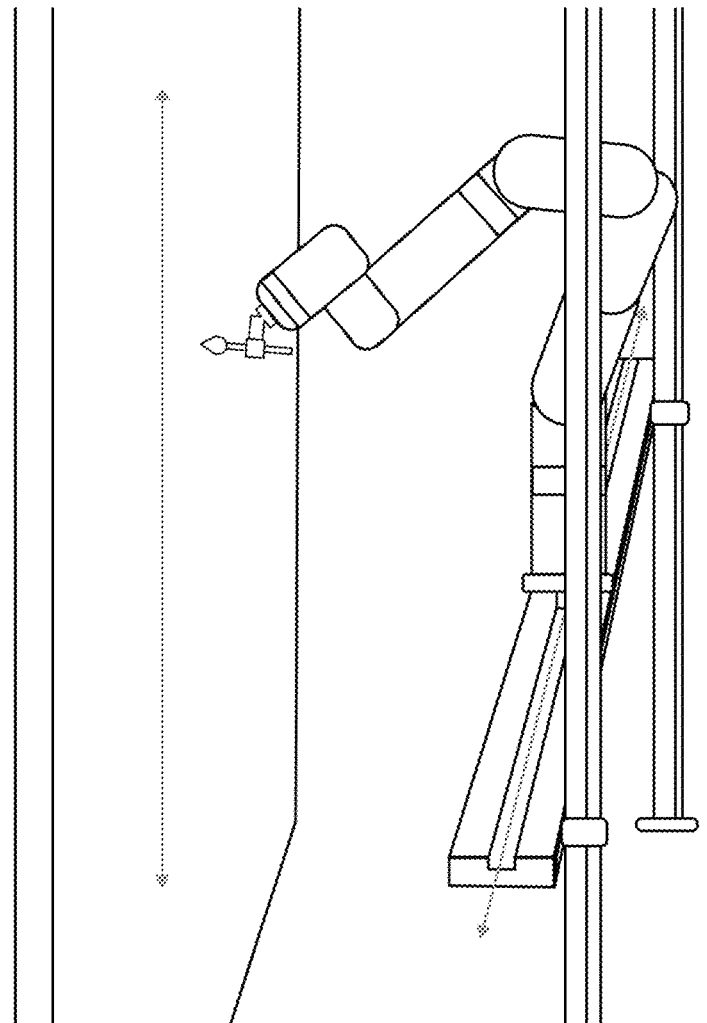
Figure 69:
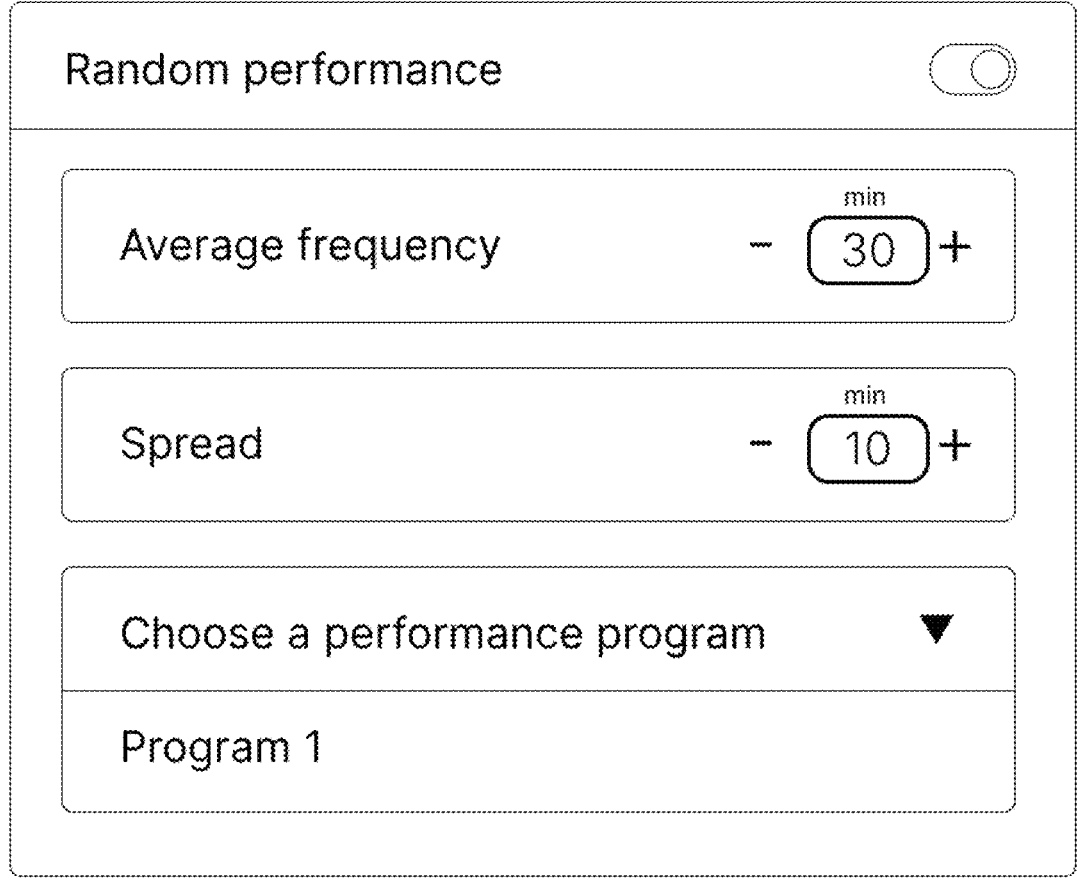
Figure 70:
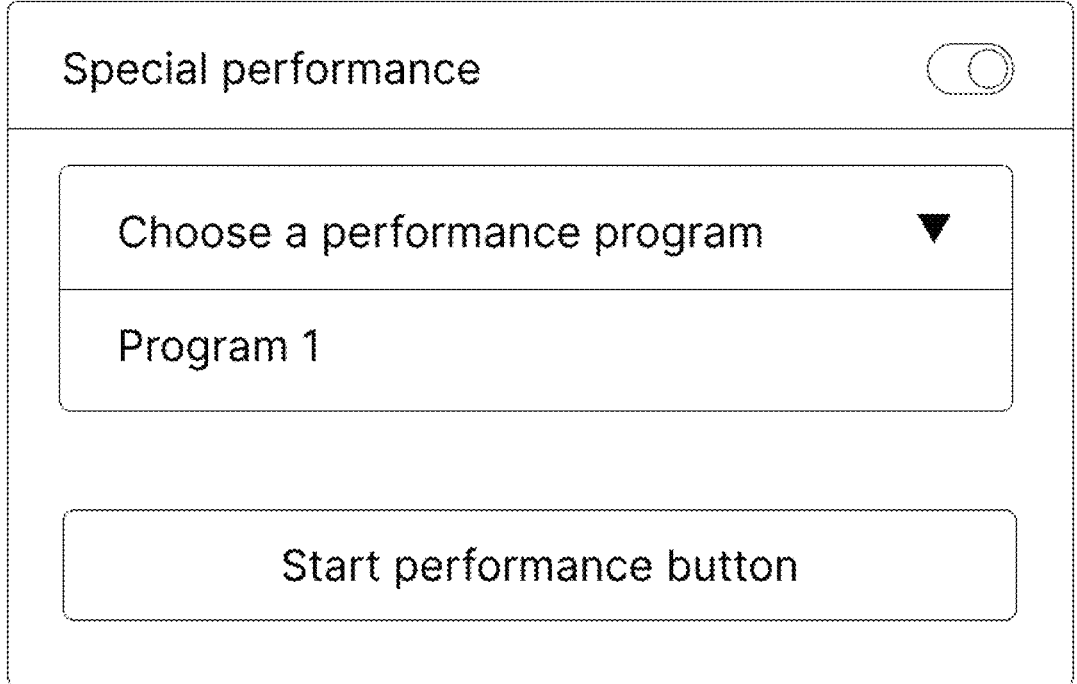
Figure 71:
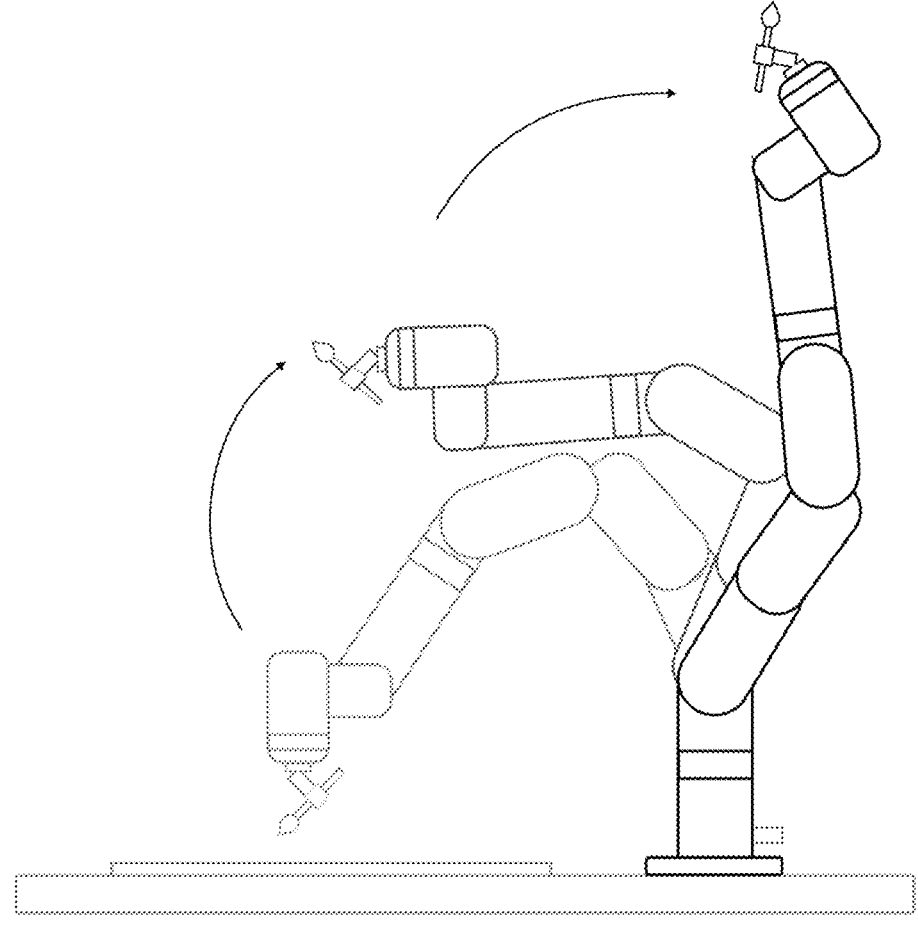

FIG. 43 shows a representative screen of the robot interface system for calibrating an automatic brush changing system;

FIG. 44 shows a schematic diagram illustrating a user's interaction with the robot interface system;

FIG. 45 shows a representative screen of the robot interface system for selecting a specific robot to connect to the control system;

FIG. 46 shows a schematic diagram illustrating robot's connection via the robot interface system;

FIG. 47 shows a schematic diagram illustrating the beginning of the drawing/art creating process;

FIG. 48 shows a schematic diagram illustrating a pause during the drawing/art creating process;

FIG. 49 shows a representative screen of the robot interface system displaying statistical information related to the drawing/art creating process;

FIG. 50 shows a schematic diagram illustrating a manual brush change;

FIG. 51 shows a schematic diagram illustrating an automatic brush change;

FIG. 52 shows a schematic diagram illustrating an adjustment of the height of the brush using the robot interface system;

FIG. 53 shows a representative screen of the robot interface system for setting up manual strokes;

FIG. 54 shows another representative screen of the robot interface system for setting up manual strokes;

FIG. 55 shows a representative screen of the robot interface system for removing manual strokes;

FIG. 56 shows a representative screen of the robot interface system for selecting and applying a mask;

FIG. 57 shows a representative screen of the robot interface system for setting mask interface features;

FIG. 58 shows a representative screen of the robot interface system for selecting areas using a mask;

FIG. 59 shows a representative screen of the robot interface system for resetting a mask;

FIG. 60 shows a representative screen of the robot interface system for generating images using text;

FIG. 61 shows a representative screen of the robot interface system for generating 1-4 images using text description;

FIG. 62 shows a representative screen of the robot interface system for selecting a generated image based on a text description;

FIG. 63 shows a representative screen of the robot interface system for generating themes for the artwork;

FIG. 64 shows another representative screen of the robot interface system for generating themes for the artwork;

FIG. 65 shows a representative screen of the robot interface system for entering a suggested artwork topic into the field for generating an image based on a text description;

FIG. 66 shows a representative screen of the robot interface system for splitting a large image into parts;

FIG. 67 shows a schematic diagram of the horizontal mounting system for artistic surfaces;

FIG. 68 shows a schematic diagram of the vertical mounting system for artistic surfaces;

FIG. 69 shows a representative screen of the robot interface system for enabling a random performance;

FIG. 70 shows a representative screen of the robot interface system for enabling a special performance;

FIG. 71 shows an example of a robot performing a "performance;"

Figure 72:
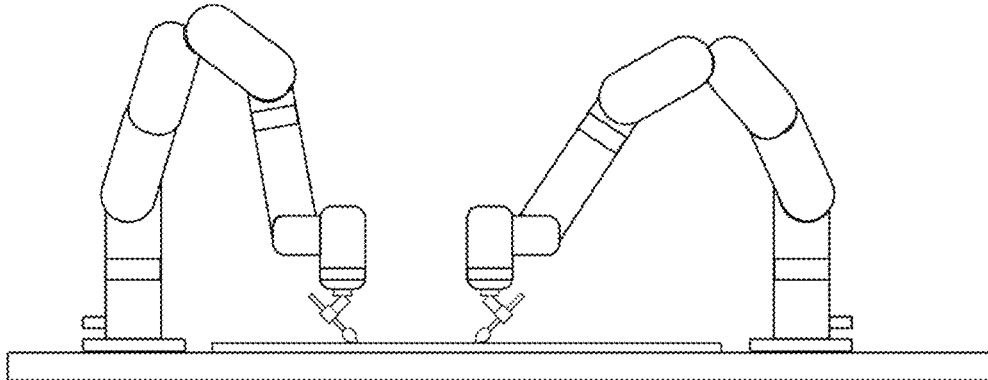
Figure 73:
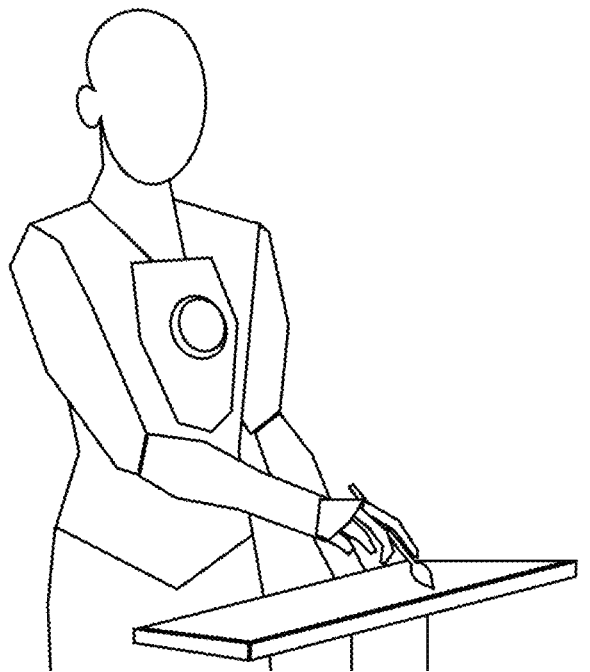
Figure 74:
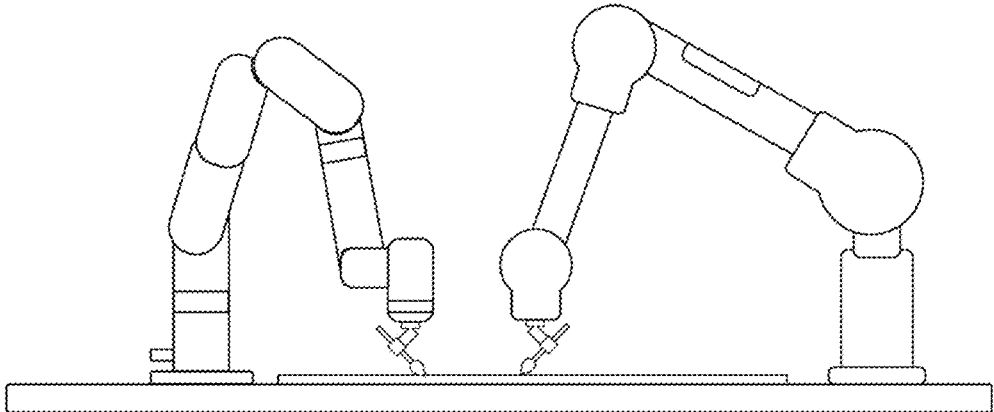
Figure 75:
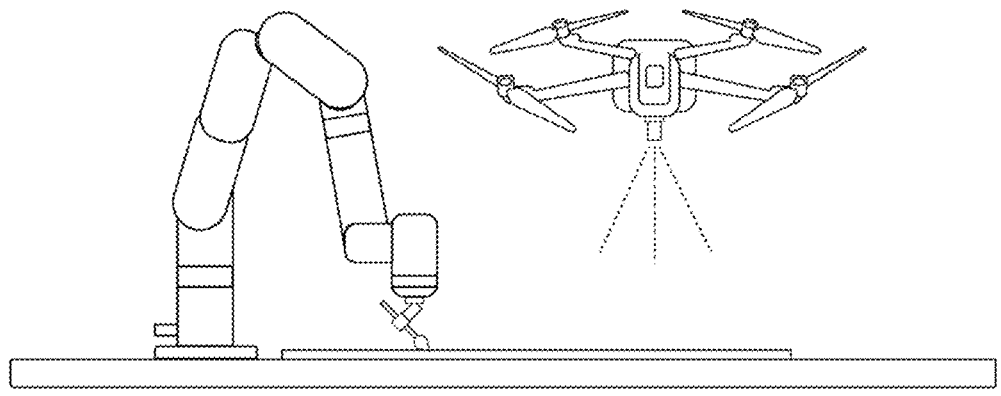
Figure 76:
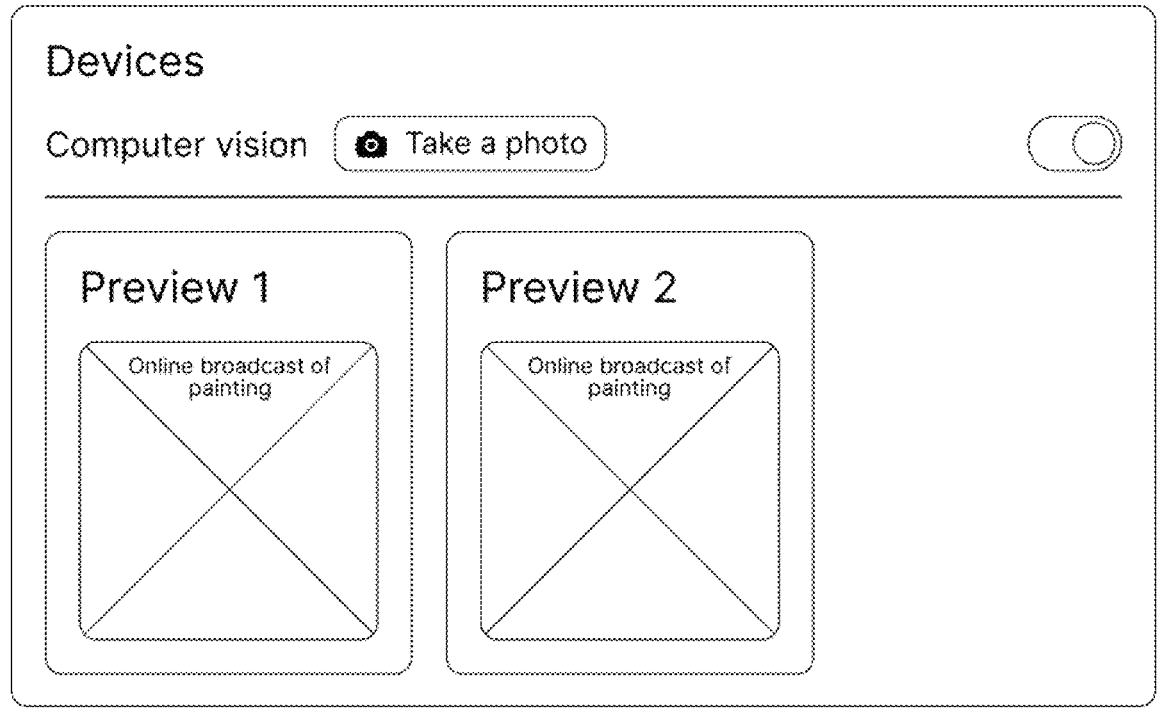
Figure 77:
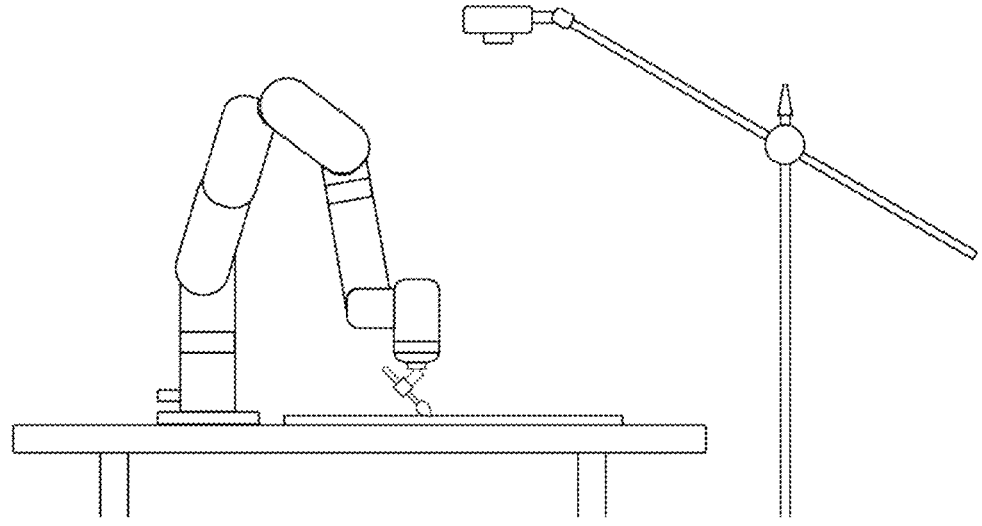
Figure 78:
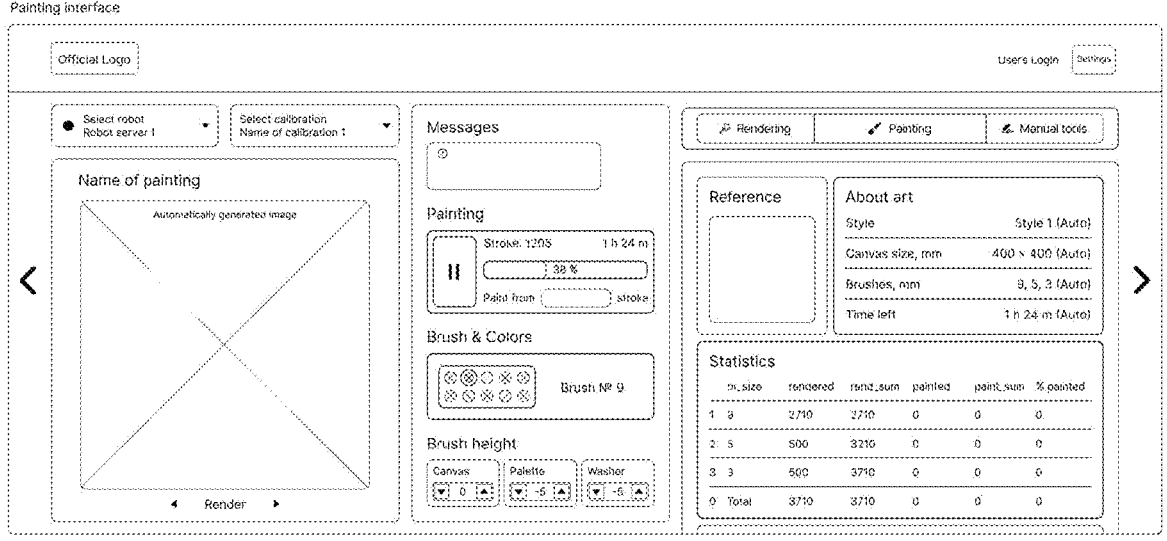
Figure 79:
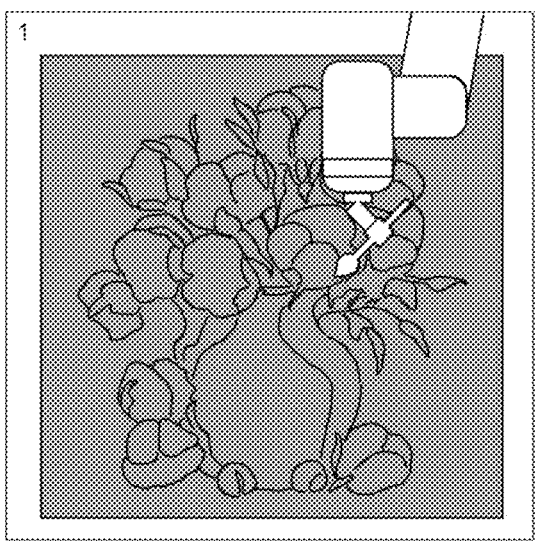
Figure 79:
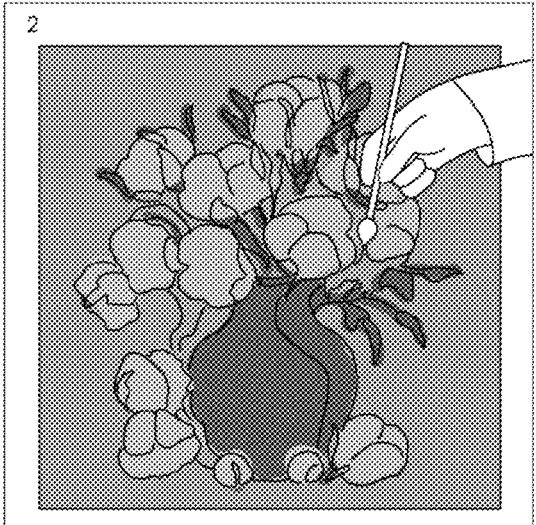
Figure 80:
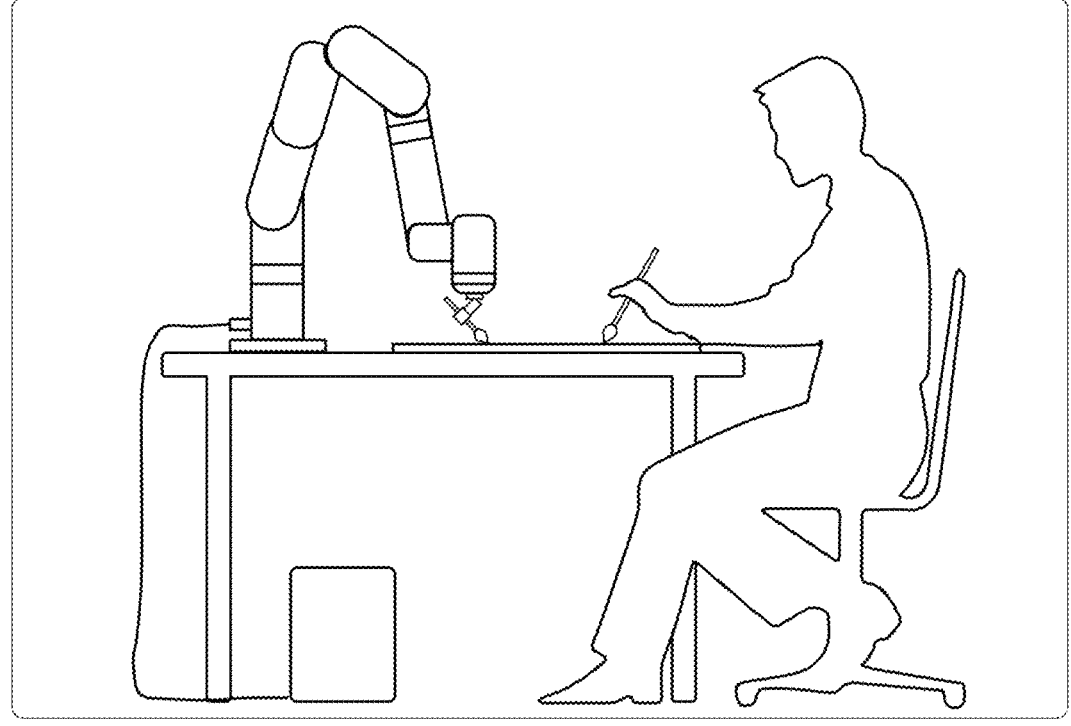
Figure 81:
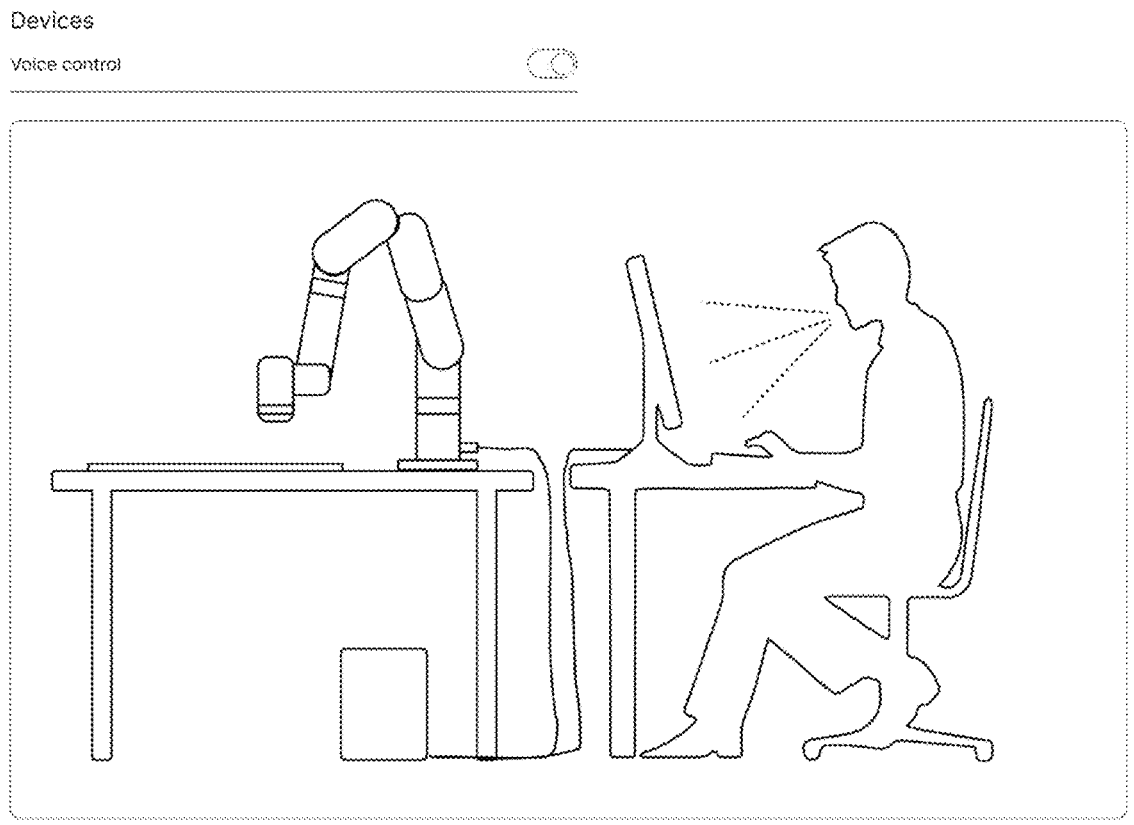
Figure 82:
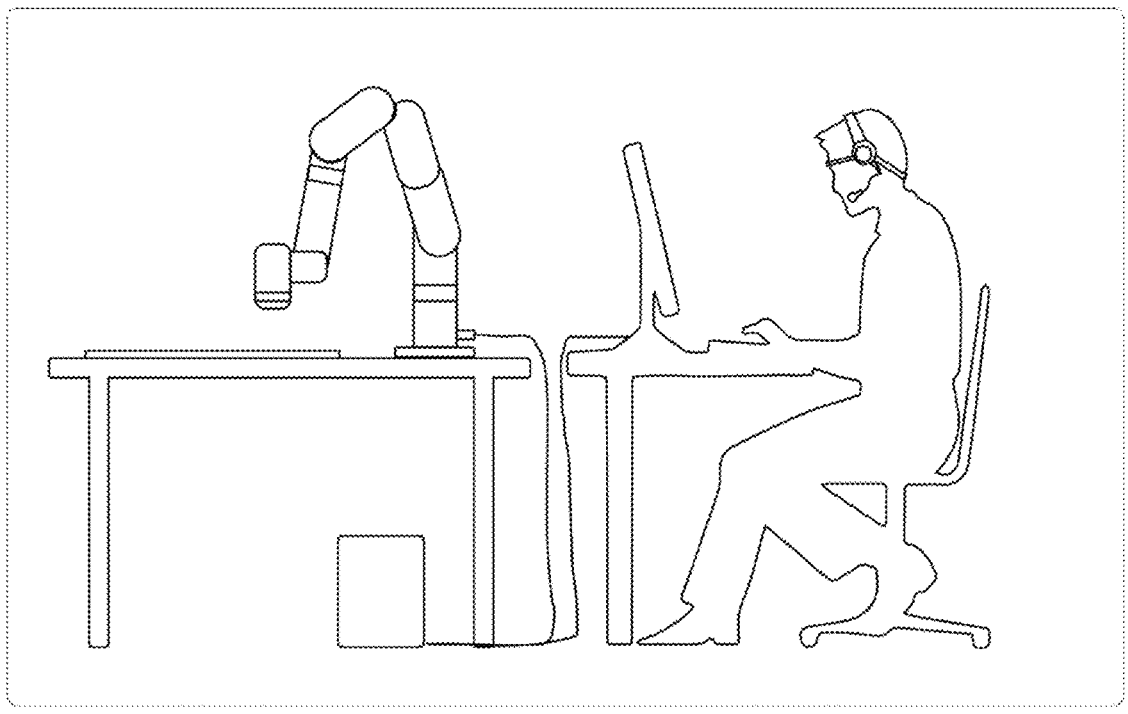
Figure 83:
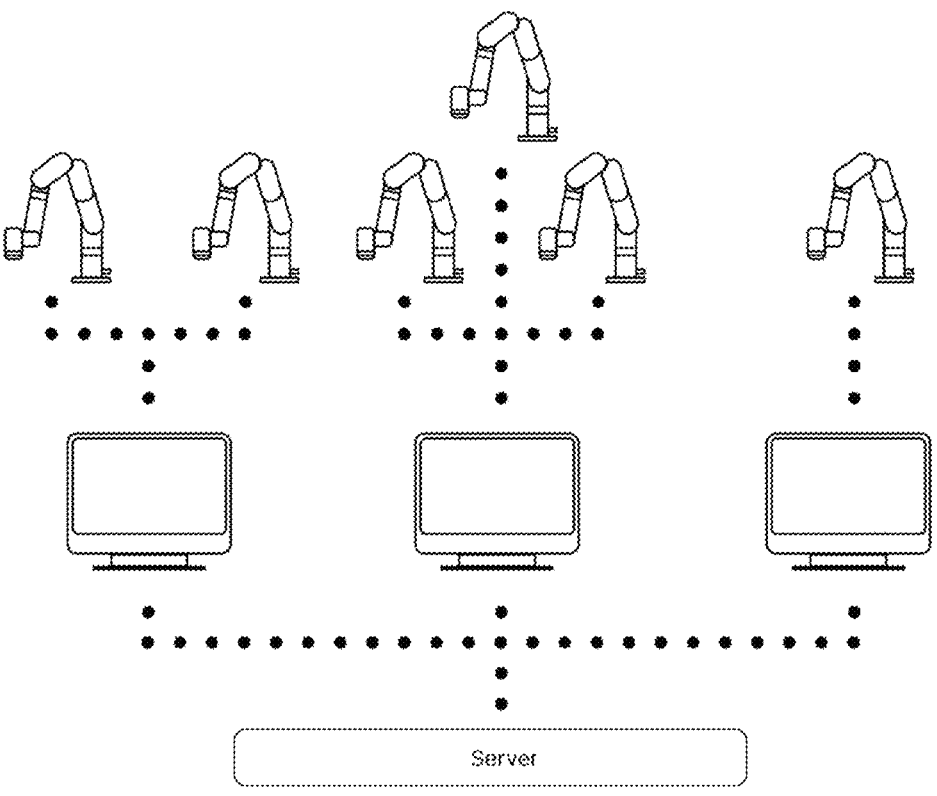

FIG. 72 shows a schematic diagram of several identical models of robotic manipulators working on a single artwork;

FIG. 73 shows a schematic diagram of a different type of robot generating an artwork;

FIG. 74 shows a schematic diagram illustrating a combined use of various types of robotic manipulators in creating an artwork;

FIG. 75 shows a schematic diagram illustrating a combined use of different types of robots in creating an artwork;

FIG. 76 shows a representative screen of the robot interface system for a computer vision interface feature;

FIG. 77 shows a schematic diagram illustrating the use of computer vision in creating an artwork;

FIG. 78 shows a representative screen of the robot interface system for a one-click drawing;

FIG. 79 shows an example of collaborative two-step art creation process;

FIG. 80 shows a schematic diagram illustrating a parallel art creation by a robot and a person;

FIG. 81 shows a schematic diagram illustrating an option for user interaction with the interface using voice control;

FIG. 82 shows a schematic diagram illustrating an option for user interaction with the interface using a neuroheadset; and FIG. 83 shows a schematic diagram illustrating a parallel control of robots.

DETAILED DESCRIPTION

The following terms are used in the foregoing description:

"Robot-Assisted Drawing Algorithm" is a sequence of actions that involves the process of converting a user's creative vision expressed in the form of a digital image, or a spoken or written idea or story, into a visual artwork using a robot artist. This process involves selecting the desired style, color scheme, and other settings to create the final artwork. The drawing algorithm determines how the robot interprets and translates the user's creative intent into a physical artwork.

A "digital prototype of the artwork" is a virtual representation of an artistic image that is desired to be created using a robot. It is generated using software, and is based on specified parameters such as colors, style, stroke directions, and so on. This prototype then becomes a stroke table and a set of coordinates that determines how the robot will move when creating a real artwork.

The "digital prototype of the artwork" also allows the user to visualize the final result of the robot's work before the robot begins creating. This gives the user an opportunity to adjust and optimize the image, and also allows him/her to preview what the final artwork will look like. The user can then adjust and refine the parameters until the result is satisfactory, after which these parameters are transferred to the robot to create a physical artwork. Thus, the digital prototype serves as an important tool for planning, controlling and visualizing the process of creating an artwork using a robot.

To summarize, the "digital prototype of the artwork" is a virtual visualization of a future artwork, evaluated and adjusted by the user, and represents a set of coordinates that determines the subsequent movements of the robot.

Once the digital prototype is finalized, the painting algorithm converts this virtual data into a physical image, transforming the "digital prototype of the artwork" into a "robotic image," such as a real-life artwork. "Robotic images" may include classical paintings, namely, portraits, landscapes, etc.; oil on canvas; illustrations and drawings on any surfaces such as physical objects, canvases or clothes; unfinished paintings, e.g., sketches, outlines and drafts;

teaching sketches, which are used for purposes of teaching art; abstract paintings created as part of educational programs, for example, to visualize mathematical formulas or as a result of the work of an educational algorithm; decorative images that can be used for interior decoration or to create a desired atmosphere or environment, including murals, wall art or upholstery designs; commercial images such as logos, brands or other types of advertising images; and/or industrial designs such as painting on glass, tiles, porcelain, etc. Thus, "robotic images" can represent a wide range of forms and genres, reflecting the diversity of art and its applications.

One of the most typical scenarios of using the method and system of the present invention is described herein with respect to a single user. It should be apparent from the description that this scenario can be scaled to any desired number of users. Further, some of these scaled scenarios are described in more detail later in the description.

User interaction with the interface includes the following main steps: rendering or applying a drawing algorithm; calibration of the robot and the robotic environment, for example, drawing equipment; and interacting with the robot during the creation of the physical artwork. Further, the step of rendering or applying the drawing algorithm includes additional sub-steps of reference settings; advanced custom settings; and digital canvas settings.

Rendering a drawing algorithm refers to the process of converting a digital image into a complete set of commands for the robot sufficient for the robot to create a complete physical artwork, for example, but not limited to, an oil painting on canvas. Rendering also includes displaying the resulting digital prototype of the artwork on a computer screen or any other utilized device with a screen.

Figures 1, 2:
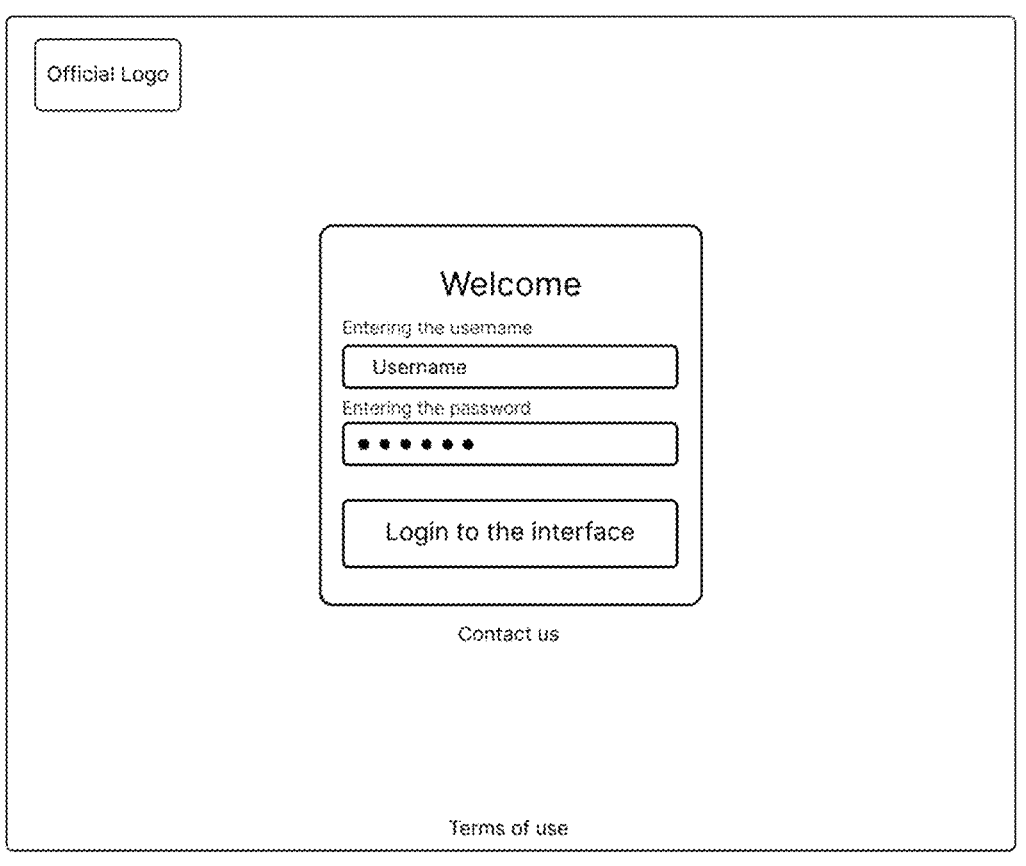
FIG. 1 shows a representative user authorization screen of the robot interface system.
FIG. 2 shows a representative screen of the robot interface system for naming the digital prototype of the artwork.

During the rendering process, the user preferably first launches the rendering interface by opening the rendering interface in any standard browser on his computer or another device and going through the authorization process illustrated in FIG. 1.

Figure 3:
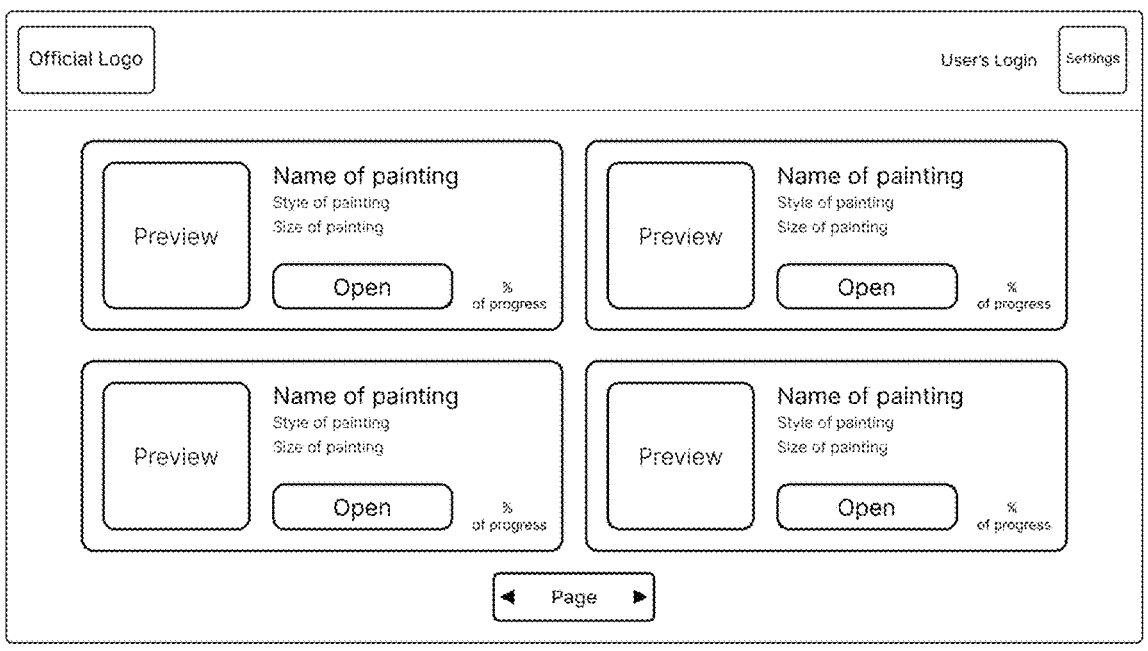
FIG. 3 shows a representative screen of the robot interface system for selecting a digital prototype of an artwork from a provided list.

To create a digital prototype of an artwork, the user first assigns it a unique name, thus creating and reserving a memory space in the associated database of the drawing algorithm, where the digital prototype of the artwork, as well as all accompanying files, will be located. FIG. 2. Alternatively, the user can select one of the previously created digital prototypes of artworks from a list previously stored in the database. FIG. 3.

Figure 4:
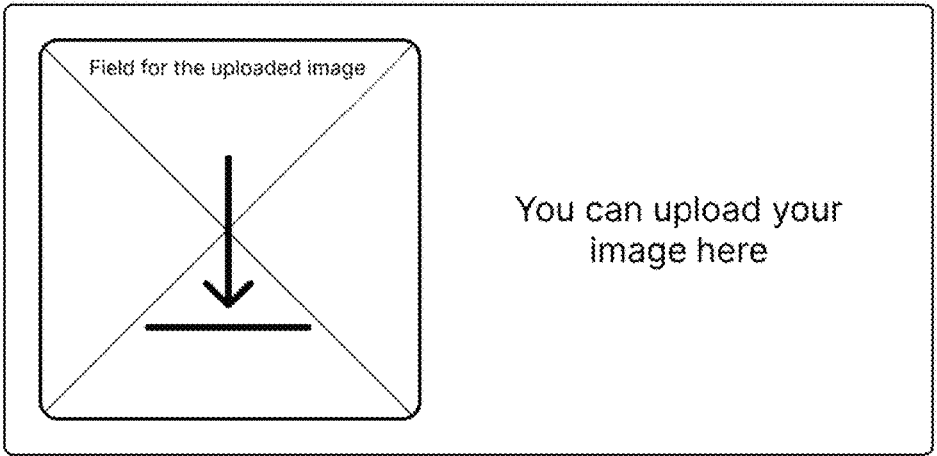
FIG. 4 shows a representative screen of the robot interface system for uploading a reference image.

One of the most common ways of creating the digital prototype of the artwork is by uploading a digital image that serves as a reference. For example, the user can upload a picture in jpg, png or any other format. The digital image can be replaced or deleted at the user's request. FIG. 4.

Figure 5:
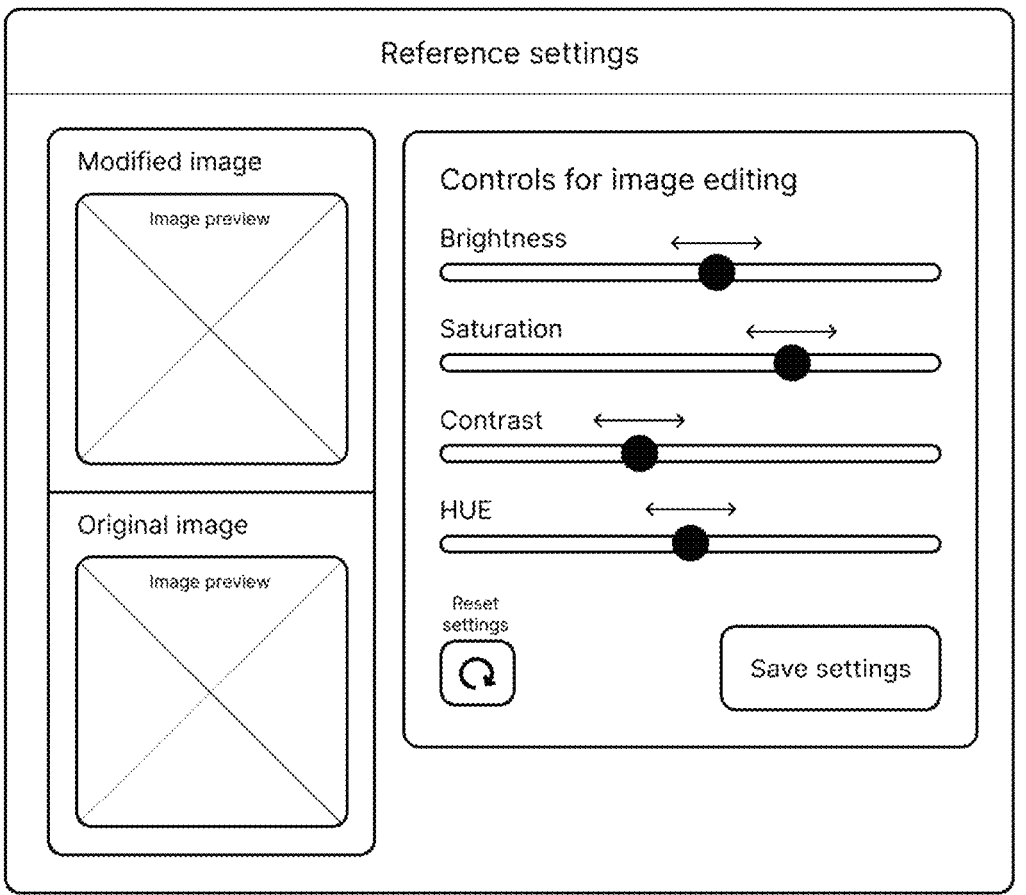
FIG. 5 shows a representative screen of the robot interface system for controlling reference settings.

The user then applies a series of desired settings to the loaded image, conditionally divided into reference settings, advanced specialized settings and digital canvas settings. Reference settings preferably include brightness adjustment, contrast adjustment, change in color saturation, and color shift. Brightness adjustment refers to the ability to make the reference image darker or lighter. Contrast adjustment refers to the ability to enhance or reduce the transition from one color to another. Changing color saturation refers to the ability to make the colors on the reference brighter or more muted. Color shift refers to a change in all colors in the reference relative to the color wheel (to the left-counterclockwise, to the right-clockwise). For example, the green color in the reference image can be shifted to blue, blue to red, and so on. For user convenience, the interface preferably displays two images-one before the settings were applied, and one after applying the settings. FIG. 5. After performing the reference settings, the user can save the reference settings or reset them.

In the preferred embodiment, the interface system also includes advanced custom settings comprising a number of tools for deeper and more detailed adjustments of the images. In these settings, users can find specialized functions that are designed to solve some specific user problems (such as artistic, design, marketing, etc.) when working together with the drawing algorithm and the robot, making the robot artist an intelligent and multifunctional assistant.

A number of settings are additionally provided for educational purposes-both analytical and creative. Also, some settings are additionally used for the purposes of art therapy and/or rehabilitation, for example, for people with disabilities.

Figure 6:
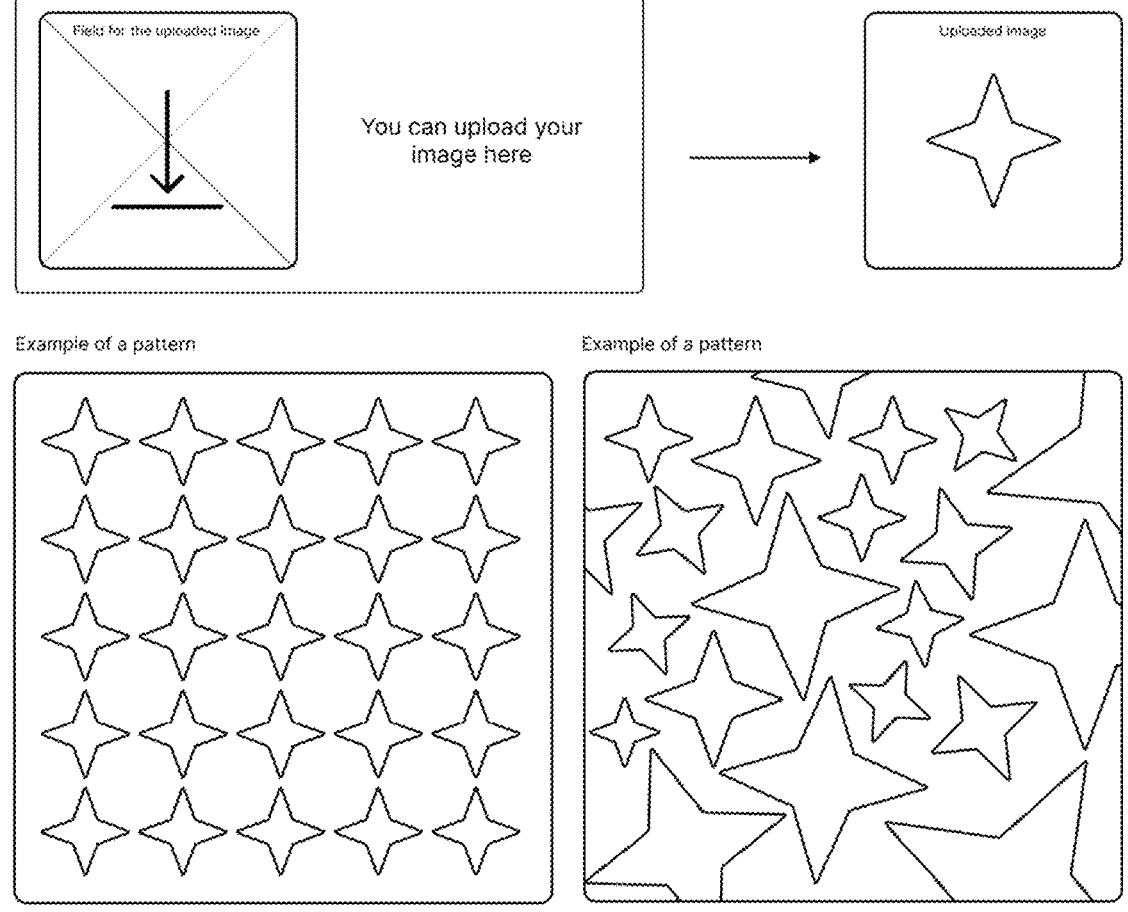
FIG. 6 shows a representative screen of the robot interface system for uploading an image which becomes a part of a pattern.
Figure 7:
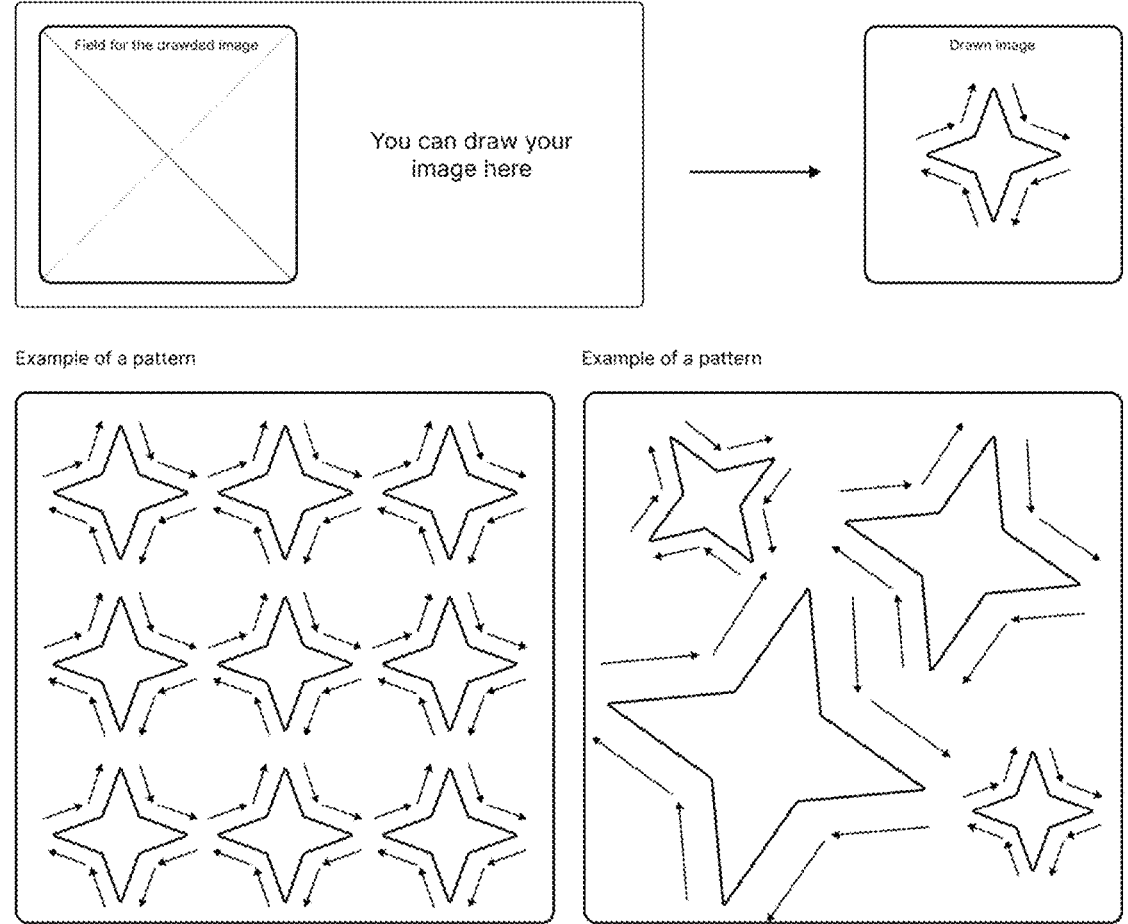
FIG. 7 shows a representative screen of the robot interface system for drawing an image which becomes a part of a pattern.

One of the features of the interface system is pattern setting. This feature provides the ability to create or load patterns, such as repeating patterns or shapes that can then be used by the robot to create or populate images. For example, the user can draw a star in the graphics field or upload a star image, after which the drawing algorithm will automatically populate the drawing area with a pattern of stars, repeating the uploaded or drawn star image in accordance with a pre-determined variety of parameters. FIGS. 6-7.

Figure 8:
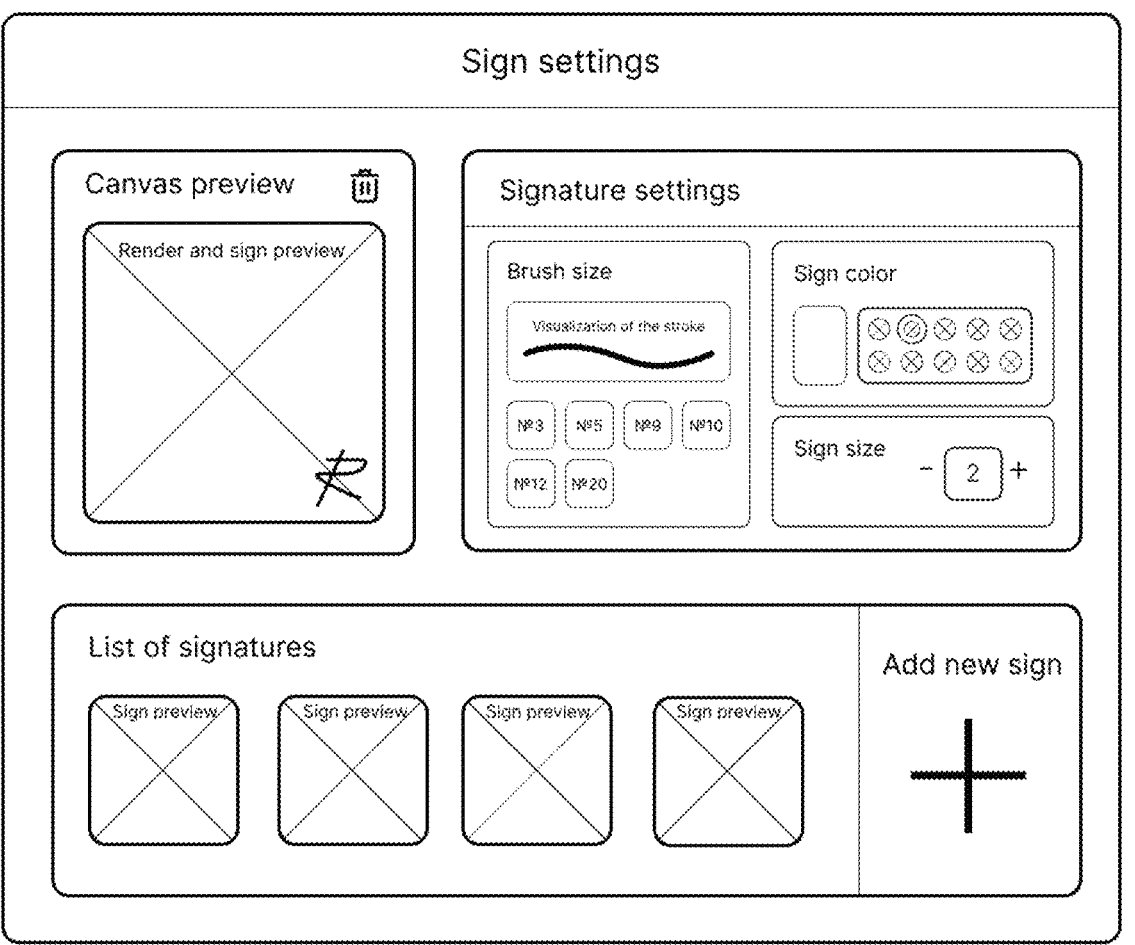
FIG. 8 shows a representative screen of the robot interface system for setting a signature.

The user can further customize the process by creating a customized signature using the interface system. This tool allows the user to personalize digital prototype paintings by including the user's signature into the digital prototype. The user can upload a digital image of his signature or use the graphic field to create it directly in the interface, after which the robot will reproduce the signature on real image at the chosen location color selected by the user or selected automatically. FIG. 8

Figure 9:
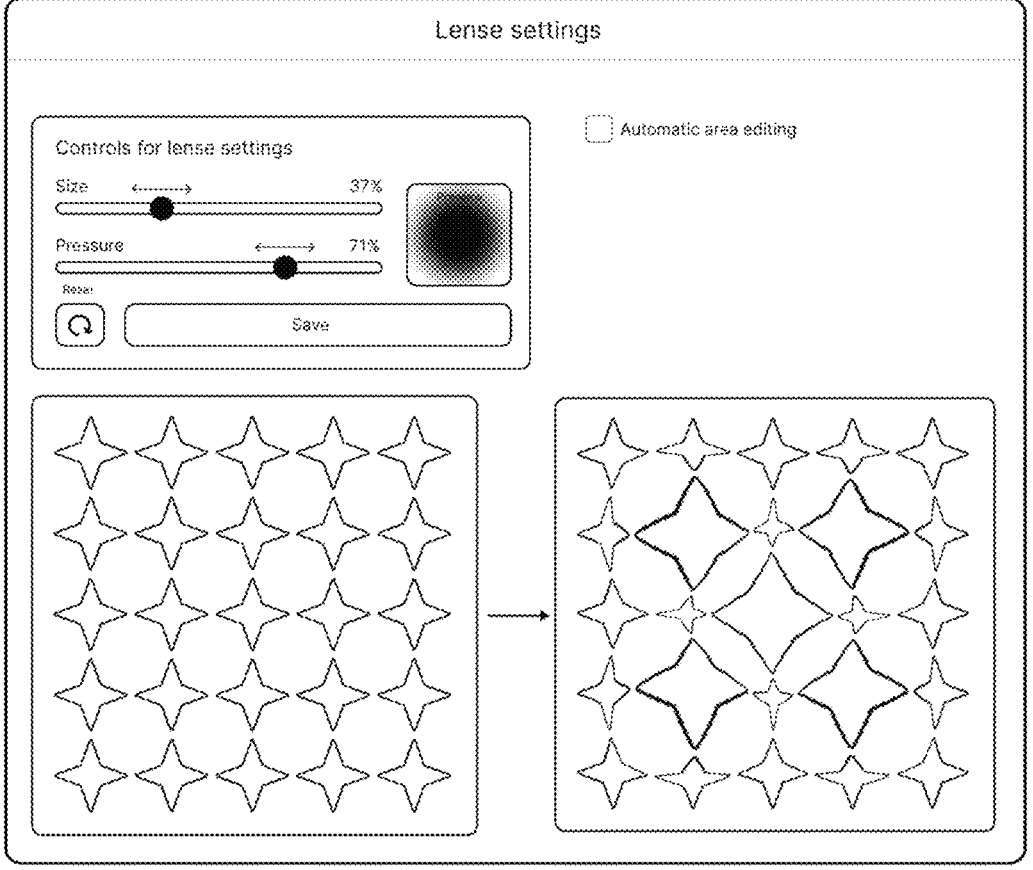
FIG. 9 shows a representative screen of the robot interface system for setting a "Lense" feature.
Figure 10:
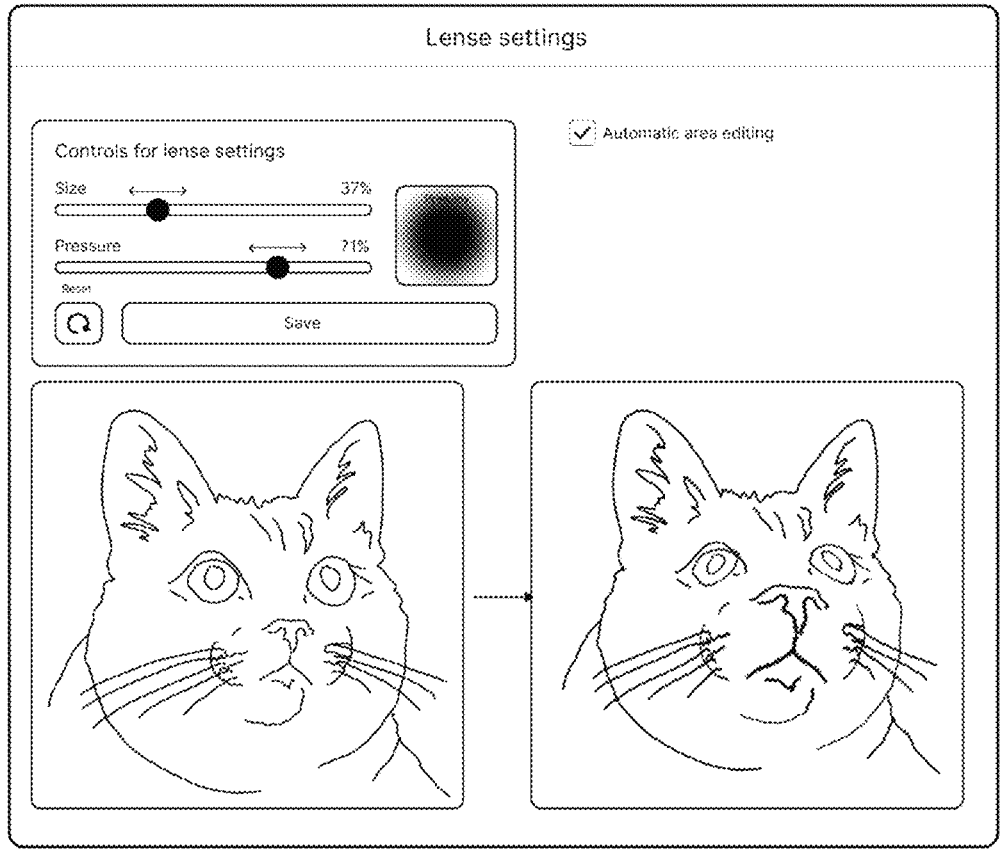
FIG. 10 shows another representative screen of the robot interface system for setting the "Lense" feature.

Another feature of the interface system allows the user to customize lenses. Using lenses allows the user to add different optical effects to regular photographs/images. For example, a selected part of the image can be deformed using the proposed tools. FIG. 9 As shown in FIG. 10, for example, a photograph of a cat may be distorted so that its face appears longer.

The interface system further preferably includes a tool for setting color harmonizer. This tool analyzes the primary colors in the uploaded image and offers the user a harmonious color palette for digital prototype paintings. This can be useful for creating aesthetically pleasing color combinations that will reflect the mood or atmosphere of the original image. The tool analyzes colors reference and edits them until they are harmonious, automatically selecting the necessary palette for drawing. FIG. 11.

The interface system further preferably includes a tool for setting historical styles. This tool allows the user to select a style from various historical art styles such as impressionism, cubism, surrealism and apply them to reference. For example, a user can upload a modern photo and the drawing algorithm will create a digital prototype of the painting in the style of Van Gogh or Picasso. FIG. 12.

The interface system also preferably includes a tool for setting a random element generator. This tool adds on digital prototype paintings have random elements or textures, making each piece unique. This could be randomly distributing drops of paint, creating background textures, or introducing unexpected images into a composition. FIG. 13.

The interface system further preferably includes a tool for customize lighting effects. This tool allows the user to create realistic lighting effects on digital prototype paintings such as reflections from the sun, soft glow or shadows. This gives the original image depth and volume, making it more vibrant and dynamic. FIG. 14

The interface system also preferably includes a tool for collage setting. By utilizing this tool, users can create collages by combining different images into a single reference. Drawing algorithm can analyze photos uploaded by the user, cutting out individual elements and placing them on digital canvas in accordance with the user's instructions. This allows the user to create a composition that combines different scenes, objects or characters into one cohesive image. FIG. 15.

The interface system further preferably includes a tool for a mixed media mode setup. This tool allows for a simultaneous use of a variety of materials and artistic techniques, such as a combination of watercolor, oil painting and pencil drawing. The robot will consistently apply different painting styles, creating complex and multi-layered textures on one drawing surfaces. FIG. 16.

The interface system also preferably includes a tool for an under-design setup. This feature allows the user to upload photos of the interior in which the resulting artwork will be displayed. The rendering algorithm can then adapt the color scheme and the style of the rendered prototype (and subsequently the resulting artwork) in such a way that the resulting artwork will fit harmoniously into the surrounding space. The algorithm analyzes the shades and design features of the room, and then suggests the optimal settings for creating the digital prototype that will become integral part of the interior design. FIG. 17.

The interface system further preferably includes a tool for a virtual artistic assistant. This tool of the interface system offers the user recommendations and advice based on the current state of the image, helping to improve the composition or color palette. For example, the assistant may suggest adding accents (bright and/or rich details) in certain areas of an image to draw attention to focal points. FIG. 18.

The interface system further preferably includes a tool for emotional coloring. This tool analyzes the emotional content of an uploaded image (or the user's emotions via a webcam) and suggests color and texture settings that reflect a given emotional tone. FIG. 19.

The interface system also preferably includes a tool for abstraction generator. This tool allows you to create abstract works of art using algorithms that randomize shapes, lines and colors. This allows users to experiment with abstract art without having the necessary skills to create such works by hand. FIG. 20.

Finally, the interface system further preferably includes a tool for setting a musical inspiration. By using this tool, the drawing algorithm analyzes the selected music and creates an image that visually reflects the rhythm, melody and mood of the musical piece. This allows users to translate what they hear into a painting. FIG. 21.

In the preferred embodiment of the interface system, users can create and save their own personalized drawing templates including the palette, style and other settings. These personalized templates can later be used to quickly start new projects or share them with other users. FIG. 22.

Users can utilize a virtual reality (VR) headset to interact with the robot artist and its virtual reality interface, drawing in 3D space, or watching the creation process of the digital prototype artwork in complete immersion. FIG. 23

Another tool of the preferred embodiment of the interface system allows the user to create visual effects of depth and perspective in an image by dividing it into foreground, middle ground and background. The robot artist draws objects in each plane with different artistic characteristics, creating impressive and attractive images, for example, with a three-dimensional effect. FIG. 24.

The interface system also preferably includes an algorithmic drawing tool, primarily utilized for educational purposes. This tool allows the user to set images through software commands or mathematical formulas. For example, for educational purposes, the user can enter the equation of the Archimedes spiral, and the robot will draw the corresponding geometric shape. FIG. 25.

Similarly, a fractal generator tool creates images based on repeating mathematical patterns (fractals). For example, for educational purposes, the user can experiment with different parameters to create a fractal that the robot will then draw. FIG. 26.

All of the listed tools and panels can be modified, improved and supplemented with new types of instruments using "Advanced Specialized Settings" tool.

In order to enable the robot to create an artwork on a canvas, the system includes a set of tools for digital canvas settings. These tools are preferably divided into basic setting tools and artistic setting tools. Basic setting tools preferably include identifying the size of the digital canvas, e.g., by entering the canvas' width and height values; trimming digital canvas, e.g., by reducing the size on one or more of its sides; and selecting a background color for the digital canvas chosen from several predefined colors taking into account which the rendering will be launched. The user can then save the chosen digital canvas settings. FIG. 27.

Artistic settings tools preferably include tools for choosing a palette type, choosing colors for a palette, and choosing an artistic style. The tool for choosing the palette type provides the user with the ability to select a palette type from a variety of preset options. For example, by default, a standard palette is offered, consisting of six primary colors: white, gray, black, red, blue and yellow. There is also a type of palette "for portraits", in which black is replaced by dark warm and dark cool shades. There is also a palette type where the palette colors are generated based on the colors extracted from the image. The number of colors in the palette can vary from one to multiple. For user convenience, the interface displays all the colors of the palette next to each other. Additionally, by clicking on each individual color in the palette, the user can see the selected color in an enlarged view. The user can add colors to the palette and remove colors from the palette or use the selected palette without changes. FIG. 28.

The tool for selecting colors for the palette allows the user to adjust the hue of each color segment of the palette using the color picker, activated by clicking on the corresponding cell. The user can add new colors to the palette, remove existing ones, or use the selected palette without changes. The interface system preferably includes tips that give recommendations on choosing a specific paint for the desired artwork. FIG. 29.

The tool for selecting a drawing style includes a fairly large number of items available for drawing by a robot artist including various styles built into the drawing algorithm. By choosing a particular style, user automatically activates certain corresponding segments of the drawing algorithm. Style is understood as a set of parameters that define certain characteristics of the drawing process by a robot artist. This includes, but not limited to, such parameters as the number of layers, brush sizes, length of strokes on each layer, model of mixing paints on the canvas and others. FIG. 30-31.

After the above steps of setting all parameters is completed, the user can initiate the rendering process. In this process, the algorithm converts the reference image into a digital prototype of the artwork and generates set of commands for the robot to complete the process of creating the real-life physical artwork. FIG. 32.

After rendering is complete, digital prototype of the artwork is preferably saved in the cloud. The saved digital prototype of the artwork can be used for drawing, deleting or later editing. Also, for user convenience, the interface system may display useful statistics, for example, the number of strokes already drawn, drawing speed, number of layers and brushes required for drawing, etc. FIG. 33. The user can also be provided with a video displaying a step-by-step process of creating the digital prototype of the artwork. FIG. 34-35.

Calibration of the robot and its environment is an important step in the process of user interaction with the interface system. This process is carried out using a specialized calibration feature of the interface system, which is designed to fine-tune the parameters of the robot and its environment. FIG. 36. The purpose of calibration is to establish such robot operating parameters that will allow it to correctly perceive and interpret the surrounding space and objects in it. The calibration feature of the interface system provides the user with ample opportunities to configure and manage the calibration process of the robot and its environment. FIG. 37.

In the preferred embodiment, the user can create a new calibration option by customizing all parameters to suit specific conditions and requirements. This allows the robot to be adapted to specific working conditions as accurately as possible. Alternatively, the user may choose to edit an existing calibration option. This option allows the user to change the parameters of an already created calibration option at any time, clarifying or adjusting them in accordance with changing conditions or requirements. Further, if a particular calibration option is no longer required, the user can delete it, thereby freeing up space to create new options. Finally, the user may choose to use a pre-made calibration option, that is one of the already created and saved calibration options, which can significantly speed up the preparation process and reduce the time for calibration. FIG. 38. Thus, the calibration feature of the interface system provides the ability not only to fine-tune the robot and its environment, but also to manage the created calibration options, which provides high flexibility and ease of use of the system.

A number of calibration tools is preferably included in the present system. Specifically, the interface system preferably includes a brush calibration tool. An important step in the calibration process is setting a correct brush angle. Using the brush calibration tool allows the user to precisely control the pressure and angle of the brush utilized by the robot, which affects the thickness and character of the line strokes when drawing. FIG. 39.

Robot must know the exact location and dimensions of the surfaces, on which the drawing process will take place. FIG. 40. To set these parameters, the user is provided with a drawing surface calibration tool.

The system further includes a palette calibration tool that allows the robot to identify the location of the palette with paints that will be used in the drawing process. Once the location is identified, the robot has the ability to autonomously select and change colors during operation. FIG. 41.

The system also preferably includes a wiping system calibration tool. An important element of the environment is the wiping system, the location of which must also be precisely determined during the calibration process. This allows the robot to independently clean the brush from paint during the drawing/painting process, which increases its autonomy and the quality of the resulting image. FIG. 42. Optionally, an automatic brush change system can be calibrated. This allows the robot to independently change brushes during the drawing process, which expands its functionality. FIG. 43.

The above process of calibrating the robot and its environment includes a number of important steps that ensure the correct and autonomous operation of the robot during the drawing/painting process.

In the present system, the user can also interact with the robot during the drawing/painting process. To accomplish this interaction, the user preferably accesses the interface system through any standard browser on his/her computer or another communication device. This could be a scenario where the user is close to a computer connected to the robot, or a scenario where the user is far away from the robot and rendering remotely. In the latter case, the user can create digital painting prototype and start drawing at any convenient time or give a command to another person (operator) to start drawing. FIG. 44.

Interaction with the robot during the drawing/painting process is a set of actions that the user performs using the control tool of the interface system. This process includes the steps of selecting and connecting to the robot; starting the drawing/painting process; pausing the drawing/painting process and viewing the statistical information. The user selects a robot from the list of available devices and connects it to the control tool of the interface system. This allows the user to customize the interaction between the interface and a specific robot. FIG. 45-46. After connecting the robot and setting all the necessary parameters, the user can start the drawing process. The robot begins to perform the specified actions, following the drawing algorithm. FIG. 47. At any point during the drawing process, the user can pause it. This allows the user, if necessary, to make adjustments to the drawing process or change the robot's operating parameters. FIG. 48. The interface also provides the user with the ability to view drawing statistics in real time. The user can track the progress of the work: drawing time, amount of materials used and other parameters. FIG. 49.

The interface system allows the user to choose between automatic and manual change of brushes during the drawing process. In the automatic mode, the system independently determines the moment to change the brush, based on the specified parameters of the digital prototype of the artwork, and completely autonomously changes one brush for another. In the manual mode the user, together with the interface system, controls the process of changing brushes, which allows him to more finely manage the drawing process and achieve the desired result. FIG. 50-51.

The user can adjust the height of the brush in real time relative to the drawing surface. This allows the user to control the thickness and intensity of the lines in the real image. The user can also adjust the depth of immersion of the brush into the paint, which allows him/her to control the amount of paint drawn and, accordingly, the color saturation in the resulting image. Further, the user can adjust the height of the brush when wiping, which allows him/her to control how much paint is cleared from the brush. FIG. 52. Thus, interaction with the robot during the drawing process is a set of control actions that provide a high degree of control over the drawing process and allow the user to obtain the desired result.

Additional options for user interaction with the interface system to achieve better artistic results include the steps of user adding manual strokes to digital painting prototype and applying masks before the rendering process. The system allows the user to add manual strokes by using a mouse or touchscreen. The robot will then repeat the user-added strokes in the real image in the same order and in the same direction as they were added by a human hand (or an alternative signal) to the digital prototype of the artwork through an interface using a computer screen or another device. Such hand strokes can be used to completely create a digital prototype of the painting using hand strokes; to correct shortcomings of the digital prototype of the painting after rendering or, if desired, to add additional author's strokes to the digital prototype of the painting. Custom scripts for adding manual strokes include the following options: adding hand strokes before the basic scenario image loading stage; adding hand strokes after the basic scenario image loading step; and adding hand strokes after the rendering stage of the basic scenario.

While adding hand strokes, the user interacts with the interface system by first opening the digital prototype paintings from the list. The user preferably selects the desired digital prototype paintings from the list using any standard browser on the user's computer or another suitable device. Next, the user opens the manual strokes tool of the interface system and selects a number of settings for manual strokes before creating the manual strokes. FIG. 53. These settings preferably include: the size of the line of the future stroke, the color of the line of the future stroke from the palette, the type of line (for example, a smooth curve or straight), and the background color selection. FIG. 54. After selecting the desired settings, the user uses the mouse or touchscreen to add strokes to the digital painting prototype. The user can also erase hand strokes individually or completely if they do not visually match the intended goals and artistic vision. The user can also return manual strokes after erasing them, if necessary. After adding manual strokes to the digital painting prototype, the user can save hand strokes. After saving, manual strokes are loaded into the table of strokes of the selected digital prototype pictures and the user can start utilizing them. User can delete manual strokes from the digital prototype of the painting after saving them. FIG. 55. Next, the user returns to the basic scenario in accordance with the option of using manual strokes.

Sometimes, it is desirable to accentuate or clarify a particular detail of the digital prototype. This can be accomplished by applying masks before the rendering process. The use of masks refers to the process of selecting an area with an accent detail in the original image, displaying the result of the selection on the user's computer screen; displaying the area of application of the mask on the user's screen; and selectively adding additional layers of brush strokes during the rendering process to selected areas to increase the visual impact of the image.

Masks can also be applied by the user before the basic scenario rendering stage. While applying masks, the user interacts with the interface system by opening the digital prototype painting from the list; then opening the mask tool of the interface system; and using this mask tool to add a mask to the selected digital prototype painting. FIG. 56. To set up the mask tool, the user selects a number of settings. Such settings preferably include: a stroke type (straight line or free line), a stroke color, a fill color inside the selection area, and an invert button. FIG. 57. After selecting the settings, the user selects the area within the original image to which the changes will be applied and exits the detail selection mode. It is important to note that in the original image the user can highlight as many accent details as he or she considers necessary. For user convenience, the interface system preferably displays an area with highlighted details as a separate image. FIG. 58. After exiting the accent feature selection mode, the user can apply a mask. The user can also reset the mask if they need to make changes to the selection area or want to undo the mask entirely. FIG. 59. After applying the mask to the original image, the user can start the rendering process based on the described above basic scenario. During the rendering process, additional strokes will be added to the selected areas to highlight the accent details.

As indicated above, the inventive system can perform the drawing script without an initial image by asking the interface system to generate an image using a text description. In this scenario, the user interacts with the interface in a manner similar to the basic scenario above, with the exception of the image loading stage. FIG. 60. During the process of generating images using text description, the user interacts with the interface first accessing the image generation tool of the interface system and entering an image description. FIG. 61. The user enters a text description of the image he/she would like to receive, or its plot. For example, «Robot in flowers cartoon style». The user then starts image generation based on the entered text description, and the interface system automatically creates a digital image based on this description and displays it. The user can run image generation as many times as he/she sees fit until he/she gets the desired image. The user can also change the text description of the image and restart the generation. FIG. 62.

In a further embodiment of the interface system, the interface system may offer the user a theme for the resulting artwork. The interface system in this scenario is used by the user as an assistant in creating an idea or plot for a future digital prototype of a painting. During the process of generating themes for drawing, the user opens the interface tool for generating drawing themes and enters a command to generate the themes. FIG. 63. For example, the user may request the system to "come up with five ideas for paintings Robots and Future and recommend one of them». Thus, the user starts the process of generation of drawing topics by entered a plain text description. The user then selects one or more topic from the generated drawing themes whichever best suits his request. The user can save the selected drawing topics using any method convenient for him. For example, by copying to the clipboard. FIG. 64. Next, the user proceeds to the stage of entering a description of the image and selects images based on selected topics. FIG. 65.

The presently disclosed system is particularly useful in creating large format drawings/paintings. "Large format drawing/painting" refers to the process of creating an image, the dimensions of which exceeds the size of the robot's work area. In this case, an additional solution for painting is required, for example, a device that moves the canvas or technology for manually moving the robot to the required positions. Creating large-sized images allows you to invest a deeper meaning into a work of art and thereby enhance its perception.

As part of user interaction with the interface system, the process of drawing large images using a robot can be performed in two ways: splitting a large image into several smaller images, or using additional devices specifically designed to assist in creating large images, e.g., a large canvas feeding system or a system for moving the robot along and around the drawing surface.

In the system where the large image is split into several smaller images, the subsequent drawing/painting by the robot is preferably performed on multiple artwork surfaces (for example, several canvases). This steps for this process are primarily the same as the scenarios described above. One difference is that, in the process of creating a digital prototype of a painting, the user indicates in the interface system that drawing will take place on several surfaces. The user then specifies the quantity of surfaces, on which the large image is to be created. The interface system then automatically splits the original image into the specified number parts and displays the result of the partition to the user with numbering of all images. Next, the user proceeds to the rendering process based on the basic scenario. At the end of the rendering process, the interface system displays to the user a digital prototype of the painting, divided into several parts indicating their serial numbers. Additionally, before starting drawing, the interface notifies the user which part (which serial number) of the digital prototype of the painting will be drawn at the moment. After finishing drawing one part of the large image, the interface notifies the user to replace the drawing surface to the next one to continue the rendering process. After finishing drawing the last part of the large image, the interface system notifies the user that the work is completed. It is important to note that this process of drawing/painting large images that are split into multiple smaller images does not require any additional hardware. FIG. 66.

When the process of drawing/painting of a large image is performed with using a specialized feeding system for the drawing surface, the user, in the process of creating a digital prototype of the painting, indicates in the interface system that the drawing will take place using a system for drawing large images. Further in the rendering process, the interface automatically converts the image into a set of strokes and other commands for the robot, ensuring the process of drawing a large image, taking into account the gradual feeding system of the drawing surface. Further actions are similar to the basic scenario.

It is possible to draw large images in horizontal and vertical planes. This provides the user with the flexibility to choose the most suitable option depending on his/her preferences and working conditions. Drawing on a surface positioned in a horizontal plane, for example, in combination with a drawing surface feeding system, ensures ease of handling and manipulation of the drawing surface, especially when working with large sizes. It also simplifies the process of calibrating the robot and provides more accurate and detailed drawing. However, this may require more work space. FIG. 67.

Drawing on a surface positioned in a vertical plane, such as when coupled with a system for moving a robot along a drawing surface, simulates a more traditional drawing process that may be more visually impactful to the user. It also allows for more efficient use of space, especially in confined spaces. FIG. 68.

Utilizing the large image drawing functionality of the present system, expands the user's capabilities in creating images using the robot, increases the autonomy of the robot's work, and allows for the creation of larger-scale works of art. Using the large image drawing functionality, the system can draw large images with minimal human participation in the process.

Another preferred functionality of the present system is enabling and implementing a "performance" as part of interaction with the interface system. As part of the basic and alternative scenarios described above, the "performance" functionality can be turned on at any time during the user's interaction with the interface system. "Performance" is understood as a set of various movements of the robot within its technical capabilities, attracting the attention of others, but not directly related to drawing. "Performance" can be represented by such robot actions as forward movement, backward movement, left movement, right movement, upward movement, downward movement, and various turns. Each part of the robot can be moved individually or several parts can move at the same time. Examples of performance can include an imitation of "stretching or kneading your hands," as if for relaxation in the process of hard work, or an imitation of the "deep thinking" or "bright idea" behavior. "Performance" is especially useful in academic settings or in some special circumstances. Random "performance" can be configured to be performed randomly while drawing, for example once or repeatedly with any configurable average interval between "performance" events. This provides an element of unpredictability, making the drawing process more dynamic and interesting. For a random "performance" during drawing, only a part of all the robot movements listed above can be used, so as not to significantly increase the total time for drawing the image. FIG. 69.

A special "performance", on the other hand, is a special performance that can be triggered by the press of a button or other signal of the user. This allows for a longer, more impactful spectacle that can be used to capture attention at a specific point in time. For example, it can be a combination of all of the above movements of the robot and of all its parts. FIG. 70.

During the process of turning on the "performance", the user first selects a desired robot from the list and opens the "performance" option of the interface system using any standard browser on their computer or any other utilized device. The user can then enable the robot to perform a random performance using a switch. For a random "performance," the user also specifies the frequency of its repetition. The user can also launch a special "performance" for the robot using a button or an alternative signal. A special "performance" starts immediately after pressing the button. FIG. 71. The user can stop the execution of a "performance" if necessary through the interface or wait for it to complete automatically.

The system of the present invention allows using various types and numbers of robots for implementation of basic and alternative drawing scenarios provided by the interface. When several robots of the same type are utilized, the interface allows the user to coordinate use of two or more robotic manipulators for parallel drawing of one image, which provides increased speed, accuracy and effectiveness during the drawing process. FIG. 72.

The system also allows the user to utilize different types of robots. The interface system supports the ability to draw using different types of robots, not just with a manipulative arm. For example, unmanned aerial vehicles (drones) and robotic mobile platforms (robot cars) can be utilized. Painting/drawing can be done in a variety of ways, including dropping dye onto a surface (e.g., sand onto concrete, paint onto canvas, spraying dye into the air) or using brushes or other painting equipment. FIG. 73.

Further, robots of different types can be used in combination. The interface system allows for a simultaneous drawing by several robots of different types. For example, a robotic mobile platform with paint on treads can create one part of the strokes, a drone can create another, and a robotic manipulator can create a third. FIGS. 74-75.

The above-described scenarios of drawing/painting can be implemented using a computer vision functionality. The computer vision functionality can be used to improve the accuracy and quality of the robot's drawing process. In this scenario, the robot performs a certain number of strokes according to the basic scenario, after which it uses a web camera installed at the desired position to record the current state of the work. The algorithm then generates the next set of strokes for drawing image, taking into account the information received webcam for this image. FIGS. 76-77. Application of computer vision allows the user to correct color and line errors in real time. It also allows the robot to create an image that more closely matches the digital prototype of the painting. Having this feature improves the accuracy of the final artwork, ensuring the image formed through the interface system matches the result of the rendering process. Using the computer vision in this way makes the drawing process more dynamic and adaptive, compensating for any deviations or errors in real time and increasing the overall accuracy of the robot's drawing process.

The user can also command the robot to create an image in a minimum number of steps. FIG. 78. In this scenario, the user can upload an image using the interface, or provide a command to the algorithm to generate and select the image. After loading or generating and selecting an image, the interface system will automatically select all necessary default settings, ensuring optimal adaptation to the image. After automatically selecting settings, the user can press the "draw" button or give a command with a sound signal, using a neuroheadset or other convenient method. The algorithm will create a digital prototype of the painting in real time, based on the features of the image and the selected settings. The robot will then begin to draw the image, creating an artistic composition based on the generated data. This mode provides the ability to interrupt, pause or change the drawing process at any time so that the user has full control over the created work of art.

Finally, the robot-human co-drawing functionality mode allows the user to interact and create images together with the robot. This mode complements the basic scenario and creates new possibilities for the creative process. The robot performs certain tasks in accordance with the listed scenarios and modes, while the user contributes to the process and adds his creativity. Options for a collaborative robot-human drawing process may include a collaborative two-step drawing. For example, a robot can start drawing by defining the general outline of the work, determining its shape and proportions, and then the person can add colors, textures and details to complement and refine the image. FIG. 79. Alternatively, a robot and a person can work on an image sequentially, over a certain period of time. For example, a robot might start by creating a basic background or composition, and then hand over the work to a human who adds detail, color, and expression. Finally, the robot and the human artist can work in parallel. For example, a robot and a human can draw simultaneously, complementing each other in the process, each of them starts working on some part of the image. This parallel drawing allows them to co-create the image, combining creative and algorithmic capabilities. FIG. 80.

In addition to the standard interface controls described above, the interface system can also be controlled via a voice control or via a neural headset. When using the voice control, all commands specified in the description can be given using the user's voice or its imitation. Also, voice imitation can be generated using a neural network or other algorithms. This may include, for example, uploading a photo, choosing a style, choosing brightness settings, stroke directions, cropping digital canvas, robot calibration and drawing supplies and so on. During the drawing process, the user can also give the commands "draw", "pause" and all the others available in the drawing interface using voice. This can be particularly useful for people with disabilities and can also provide added comfort when preparing to draw and paint. Voice commands can be given in various languages and dialects, which makes our invention accessible to a wide range of users. FIG. 81.

Further, all commands specified in the description can be issued using a neuroheadset. A neuroheadset is a device that is worn on the head and is used to read electrical signals from the brain. It may also be known by various names, including: neural interface, neural helmet, neural hoop, EEG headband, non-contact electroencephalograph (EEG), brain-computer interface headset, wireless electroencephalograph, and others. This allows the user to control interface based on the electrical activity of brain signals and converting them into a digital signal. This may be especially useful for people with disabilities or those who prefer a more intuitive or innovative way of interacting. FIG. 82.

One of the key features of the presented invention is scalability and parallel control capability. The developed interface allows one or more robots to simultaneously draw one or more images. That is, for example, one operator user can control drawing on several robots simultaneously, from one or more laptops. This is achieved thanks to a specially developed control system that allows you to coordinate the actions of several robots. FIG. 83.

It is important to clarify that the number of robots connected to the interface is not limited. In this case, the user can control only those robots that belong to him and are connected to the interface. This provides flexibility and scalability of the system, allowing the user to control robots located anywhere in the world. The operating mode is provided regardless of the location of the robots. Robots can be located either in one place or in different parts of the world. The user has the opportunity to control all of his robots simultaneously using the developed interface. Thus, the presented invention provides the ability to control several robots in parallel, which facilitates the creation of complex and large-scale projects.

The present invention is preferably utilized in combination with standard interface elements. These standard controls include the "Save", "Cancel", "Reset" buttons, the "Zoom Out", "Zoom In", "Select", "Mark" tools and others. These elements are applied according to the standard logic for their use in user interfaces. This ensures the convenience and familiarity of using the interface for the user.

The following section of the application briefly presents possible options for using the interface system and sequence of actions to control the robot artist. These embodiments demonstrate the flexibility and adaptability of the present invention, allowing its use in a variety of contexts and scenarios, including individual use, automated image generation, text-based image generation, and sharing.

In one preferred embodiment, the same user creates a digital prototype painting and then uses the interface to control the process of his/her drawing by a robot artist. This allows the user complete control of the process from start to finish, providing maximum flexibility and creative freedom.

In another preferred embodiment, the user simply gives a command to the interface (for example, "come up with a picture" or "come up with a plot for a picture about penguins and offer me 5 options"). The interface system then automatically creates a digital prototype painting, and then the user controls the process of drawing it by a robot artist, as in the first option.

In a further preferred embodiment, the user can create an image based on a text description. In this scenario, the user provides a text description of the desired image and its subject (for example, "a robot among flowers, in a cartoon style"). The interface automatically creates a digital prototype painting based on this description, and then the user controls the process of drawing it by the robot artist, as in the prior options.

In a further preferred embodiment, one user (for example, an artist) creates a digital prototype painting, and another user controls the process of drawing it by a robot artist. This can be implemented, for example, within a remote studio providing such services. This option allows you to combine the creative efforts of several people, increasing the possibilities of art and technology.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

We claim as follows:

1. A method of controlling an artwork-generating robot using a robot interface system, the method comprising:
    generating a digital prototype of an artwork using a rendering algorithm of the robot interface system;
    setting a digital canvas using the robot interface system;
    displaying the digital prototype of the artwork on a display of the robot interface system;
    calibrating the robot and a robotic environment to enable the robot to generate a robot-generated artwork corresponding to the digital prototype, said step of calibrating the robot being performed by using a calibrating tool of the robot interface system;
    converting the digital prototype into a physical robot-generated artwork using the image-generating robot; and
    using the robot interface system to actively intervene in said step of converting the digital prototype to adjust settings, to change robot's parameters, to pause to make adjustments to robot's operating parameters and to interact with the robot, all being performed in real time while the digital prototype is being converted into the robot-generated artwork,
    wherein said step of generating the digital prototype includes conveying a verbal description of a desired artwork to the robot interface system using an aural input device of the robot interface system and converting the conveyed verbal description of the desired artwork into the digital prototype of the artwork using the rendering algorithm.

2. The method of claim 1 wherein said step of generating the digital prototype includes uploading an external digital image using an uploading input device of the robot interface system and converting the uploaded digital image into the digital prototype of the artwork using the rendering algorithm.

3. The method of claim 1 wherein said step of generating the digital prototype includes user-drawing a digital image using a digital drawing device of the robot interface system and converting the drawn digital image into the digital prototype of the artwork using the rendering algorithm.

4. The method of claim 1 wherein said step of generating the digital prototype includes selectively applying pre-determined image settings of the rendering algorithm to the digital prototype to alter the digital prototype.

5. The method of claim 4 wherein said pre-determined image settings comprise at least one of brightness adjustment, contrast adjustment, change in color saturation, color shift, patterns, customized lenses and color harmonization.

6. The method of claim 1 wherein said step of generating the digital prototype includes uploading an interior design image using an uploading input device of the robot interface system and using the rendering algorithm to generate the digital prototype with features designed to fit into the uploaded interior design image.

7. The method of claim 1 wherein said step of generating the digital prototype includes uploading a musical piece using an aural input device and using the rendering algorithm to analyze the uploaded musical piece and to create the digital prototype that visually reflects the rhythm, melody and mood of the uploaded musical piece.

8. The method of claim 1, wherein said step of setting the digital canvas further comprises setting a size of the digital canvas, trimming the digital canvas and selecting a background color of the digital canvas.

9. The method of claim 1, wherein said step of setting the digital canvas further comprises choosing a palette type.

10. The method of claim 1, wherein said step of setting the digital canvas further comprises choosing colors for a palette.

11. The method of claim 1, wherein said step of setting the digital canvas further comprises choosing a drawing style.

12. The method of claim 1, wherein said step of calibrating the robot and the robotic environment includes the step of adjusting an angle and a pressure of an artistic brush of the robot.

13. The method of claim 1, wherein said step of calibrating the robot and the robotic environment includes the step of calibrating a drawing surface including identifying a location and dimensions of a surface on which the physical robot-generated artwork is to be generated.

14. The method of claim 1, wherein said step of calibrating the robot and the robotic environment includes the step of identifying a location of a palette with paints that will be used to generate the physical robot-generated artwork.

15. The method of claim 1, wherein said step of calibrating the robot and the robotic environment includes the step of identifying a location of a wiping system.

16. The method of claim 1, wherein said step of calibrating the robot and the robotic environment includes the step of identifying a location of additional brushes, communicating said location to said robot and causing said robot to access said additional brushes and to automatically exchange one brush for another.

17. The method of claim 1 wherein said step of generating the digital prototype includes using a neuroheadset worn by a user to read electrical signals from a brain of the user, converting said electrical signals into digital image signals using the robot interface system, and then converting said digital image signals into the digital prototype of the artwork using the rendering algorithm.

18. A system for controlling an artwork-generating robot, comprising:

a digital prototype tool configured to generate a digital prototype of an artwork using a rendering algorithm, said digital prototype tool comprising an aural input device configured to receive a verbal description of a desired artwork and to convey said verbal description to the rendering algorithm, said rendering algorithm being further configured to covert the conveyed verbal description of the desired artwork into the digital prototype of the artwork;

a canvas setting tool configured to manipulate a digital canvas;

a display configured to display the digital prototype of the artwork on said display;

a calibrating system for calibrating the artwork-generating robot and a robotic environment to enable the robot to generate a robot-generated artwork corresponding to the digital prototype;

a robotic manipulator system configured to convert the digital prototype into a physical robot-generated artwork using the artwork-generating robot; and an adjustment tool configured to actively intervene in the robot's operation in real time during conversion of the digital prototype to pause, to adjust settings and to interact with the robot while the digital prototype is being converted into the robot-generated artwork.

19. The system of claim 18 further comprising a neuroheadset to be worn by a user, said neuroheadset being configured to read electrical signals from a brain of the user and to convey said electrical signals to the rendering algorithm, said rendering algorithm being further configured to convert said electrical signals into digital image signals and then to further convert said digital image signals into the digital prototype of the artwork.

\* \* \* \* \*